(12) United States Patent
Han et al.

(10) Patent No.: US 9,584,244 B2
(45) Date of Patent: *Feb. 28, 2017

(54) METHOD AND APPARATUS FOR TRANSMITTING OR DETECTING A PRIMARY SYNCHRONIZATION SIGNAL

(71) Applicant: LG ELECTRONICS INC., Seoul (KR)

(72) Inventors: Seung Hee Han, Seoul (KR); Min Seok Noh, Seoul (KR); Yeong Hyeon Kwon, Seoul (KR); Hyun Woo Lee, Seoul (KR); Dong Cheol Kim, Seoul (KR); Jin Sam Kwak, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 82 days.

This patent is subject to a terminal disclaimer.

(21) Appl. No.: 14/617,629

(22) Filed: Feb. 9, 2015

(65) Prior Publication Data

US 2015/0180602 A1 Jun. 25, 2015

Related U.S. Application Data

(63) Continuation of application No. 14/196,970, filed on Mar. 4, 2014, now Pat. No. 8,989,327, which is a
(Continued)

(30) Foreign Application Priority Data

Mar. 14, 2007 (KR) ........................ 10-2007-0025175
May 17, 2007 (KR) ........................ 10-2007-0048353
Jun. 12, 2007 (KR) ........................ 10-2007-0057531

(51) Int. Cl.
*H04L 27/00* (2006.01)
*H04J 11/00* (2006.01)
(Continued)

(52) U.S. Cl.
CPC ........ *H04J 11/0073* (2013.01); *H04L 5/0007* (2013.01); *H04L 5/0048* (2013.01);
(Continued)

(58) Field of Classification Search
CPC . H04L 27/2655; H04L 1/1861; H04L 5/0094; H04L 27/2672; H04J 13/0062;
(Continued)

(56) References Cited

U.S. PATENT DOCUMENTS 6,185,244 B1   2/2001   Nystrom et al.
6,480,558 B1   11/2002  Ottosson et al.
(Continued)

FOREIGN PATENT DOCUMENTS

CN   1386386    12/2002
CN   1604509    4/2005
(Continued)

OTHER PUBLICATIONS

United States Patent and Trademark Office U.S. Appl. No. 13/926,781, Notice of Allowance dated Apr. 22, 2015, 8 pages.
(Continued)

*Primary Examiner* — Rahel Guarino
(74) *Attorney, Agent, or Firm* — Lee Hong Degerman Kang Waimey

(57) ABSTRACT

A method and apparatus for transmitting or detecting primary synchronization signal. The receiver receives primary synchronization signal from a transmitter, and detects the sequence used in the received primary synchronization signal by using three root indexes. Here, the primary synchronization signal is generated by using a Zadoff-Chu sequence having one of the three root indexes. The three root indexes comprise a first index and a second index, and a sum of the first index and the second index corresponds to the length of the Zadoff-Chu sequence.

10 Claims, 28 Drawing Sheets

Related U.S. Application Data continuation of application No. 13/948,947, filed on Jul. 23, 2013, now Pat. No. 8,948,294, which is a continuation of application No. 13/333,877, filed on Dec. 21, 2011, now Pat. No. 8,520,768, which is a continuation of application No. 11/960,556, filed on Dec. 19, 2007, now Pat. No. 8,130,863.

(60) Provisional application No. 60/870,786, filed on Dec. 19, 2006, provisional application No. 60/884,399, filed on Jan. 10, 2007, provisional application No. 60/885,387, filed on Jan. 17, 2007, provisional application No. 60/888,304, filed on Feb. 5, 2007, provisional application No. 60/968,556, filed on Aug. 28, 2007.

(51) Int. Cl.
  *H04L 5/00* (2006.01)
  *H04L 25/02* (2006.01)
  *H04W 56/00* (2009.01)
  *H04L 7/00* (2006.01)
  *H04L 27/26* (2006.01)

(52) U.S. Cl.
  CPC .......... *H04L 5/0066* (2013.01); *H04L 7/0087* (2013.01); *H04L 25/0226* (2013.01); *H04L 27/2613* (2013.01); *H04L 27/2614* (2013.01); *H04L 27/2615* (2013.01); *H04W 56/0015* (2013.01); *H04J 2011/0096* (2013.01); *H04L 25/0228* (2013.01); *H04L 27/2605* (2013.01); *H04L 27/2647* (2013.01); *H04L 27/2657* (2013.01)

(58) Field of Classification Search
  CPC ............... H04J 11/0073; H04J 13/0059; H04J 13/0066; H04W 56/00
  USPC ........ 375/354, 362, 316, 340, 365; 370/350, 370/210
  See application file for complete search history.

(56) References Cited

U.S. PATENT DOCUMENTS

| | | | |
|---|---|---|---|
| 6,728,297 B2 | 4/2004 | Rudolf | |
| 6,731,673 B1 | 5/2004 | Kotov et al. | |
| 6,760,361 B2 | 7/2004 | Nystrom et al. | |
| 6,922,388 B1 | 7/2005 | Laroia et al. | |
| 7,010,071 B1 | 3/2006 | Michel et al. | |
| 7,062,002 B1 | 6/2006 | Michel et al. | |
| 7,110,782 B2 | 9/2006 | Yamaguchi | |
| 7,158,505 B2 | 1/2007 | Dick et al. | |
| 7,443,829 B2 | 10/2008 | Rizvi et al. | |
| 7,532,590 B2 | 5/2009 | Ok et al. | |
| 7,599,335 B2 | 10/2009 | Zalio et al. | |
| 7,701,919 B2 | 4/2010 | Ah Lee | |
| 7,738,437 B2 | 6/2010 | Ma et al. | |
| 7,746,916 B2 | 6/2010 | Han et al. | |
| 7,808,886 B2 | 10/2010 | McCoy | |
| 7,808,967 B2 | 10/2010 | Han et al. | |
| 7,907,592 B2 | 3/2011 | Han et al. | |
| 7,916,714 B2 | 3/2011 | Han et al. | |
| 7,965,689 B2 | 6/2011 | Akita et al. | |
| 8,116,195 B2 | 2/2012 | Hou et al. | |
| 8,130,863 B2* | 3/2012 | Han | H04L 5/0007 375/260 |
| 8,223,625 B2 | 7/2012 | Malladi et al. | |
| 8,320,360 B2 | 11/2012 | Fukuta et al. | |
| 8,520,768 B2* | 8/2013 | Han | H04L 5/0007 370/329 |
| 8,989,327 B2* | 3/2015 | Han | H04L 5/0007 370/329 |
| 2002/0097705 A1 | 7/2002 | Sezgin et al. | |
| 2003/0031162 A1 | 2/2003 | Chitrapu et al. | |
| 2003/0039228 A1 | 2/2003 | Shiu et al. | |
| 2003/0045300 A1 | 3/2003 | New | |
| 2003/0095516 A1 | 5/2003 | Ok et al. | |
| 2004/0008616 A1 | 1/2004 | Jung et al. | |
| 2004/0085946 A1 | 5/2004 | Morita et al. | |
| 2004/0142712 A1 | 7/2004 | Rudolf | |
| 2004/0246998 A1 | 12/2004 | Ma et al. | |
| 2004/0248602 A1 | 12/2004 | Demir et al. | |
| 2005/0053049 A1 | 3/2005 | Blanz et al. | |
| 2005/0111522 A1 | 5/2005 | Sung et al. | |
| 2005/0221848 A1 | 10/2005 | Chitrapu et al. | |
| 2006/0050799 A1 | 3/2006 | Hou et al. | |
| 2006/0126491 A1 | 6/2006 | Ro et al. | |
| 2007/0099561 A1 | 5/2007 | Voss | |
| 2007/0133390 A1 | 6/2007 | Luo et al. | |
| 2007/0140106 A1 | 6/2007 | Tsai et al. | |
| 2007/0177682 A1 | 8/2007 | Han et al. | |
| 2007/0183306 A1 | 8/2007 | Akita et al. | |
| 2007/0183386 A1 | 8/2007 | Muharemovic et al. | |
| 2007/0230600 A1 | 10/2007 | Bertrand et al. | |
| 2007/0253465 A1 | 11/2007 | Muharemovic et al. | |
| 2008/0031186 A1 | 2/2008 | Onggosanusi et al. | |
| 2008/0049708 A1 | 2/2008 | Khan et al. | |
| 2008/0080439 A1 | 4/2008 | Aziz et al. | |
| 2008/0095108 A1* | 4/2008 | Malladi | H04B 1/713 370/329 |
| 2008/0101306 A1* | 5/2008 | Bertrand | H04L 27/2613 370/336 |
| 2008/0107086 A1 | 5/2008 | Fukuta et al. | |
| 2008/0240285 A1 | 10/2008 | Han et al. | |
| 2008/0273522 A1 | 11/2008 | Luo et al. | |
| 2009/0046702 A1 | 2/2009 | Luo et al. | |
| 2009/0122839 A1 | 5/2009 | Luo et al. | |
| 2009/0135802 A1 | 5/2009 | Haga et al. | |
| 2009/0219802 A1* | 9/2009 | Han | H04W 56/0015 370/210 |
| 2009/0219883 A1 | 9/2009 | Cho et al. | |
| 2010/0099406 A1 | 4/2010 | Anantharaman et al. | |
| 2010/0182966 A1 | 7/2010 | Kishiyama et al. | |
| 2010/0222050 A1 | 9/2010 | Tsuboi et al. | |
| 2010/0265920 A1 | 10/2010 | Blanz et al. | |
| 2011/0274102 A1 | 11/2011 | Kim et al. | |
| 2011/0305237 A1 | 12/2011 | Luo et al. | |
| 2012/0163348 A1 | 6/2012 | Han et al. | |
| 2014/0029602 A1 | 1/2014 | Han et al. | |
| 2014/0185724 A1 | 7/2014 | Han et al. | |

FOREIGN PATENT DOCUMENTS

| | | |
|---|---|---|
| CN | 1671081 | 9/2005 |
| CN | 1901715 | 1/2007 |
| EP | 0852430 | 7/1998 |
| EP | 1643660 | 4/2006 |
| EP | 2153572 | 2/2010 |
| JP | 2006101501 | 4/2006 |
| JP | 2006109430 | 4/2006 |
| JP | 2009516416 | 4/2009 |
| JP | 2009524299 | 6/2009 |
| JP | 2010526498 | 7/2010 |
| KR | 1020040032021 | 4/2004 |
| KR | 1020050011292 | 1/2005 |
| KR | 1020050018333 | 2/2005 |
| KR | 1020050091612 | 9/2005 |
| KR | 1020060023863 | 3/2006 |
| KR | 1020070050358 | 5/2007 |
| RU | 2280329 | 7/2006 |
| WO | 01/01596 | 1/2001 |
| WO | 01/10160 | 2/2001 |
| WO | 2006/015108 | 2/2006 |
| WO | 2006/129166 | 12/2006 |
| WO | 2007/055531 | 5/2007 |
| WO | 2007145357 | 12/2007 |
| WO | 2008/000069 | 1/2008 |
| WO | 2008/038790 | 4/2008 |
| WO | 2008056784 | 5/2008 |
| WO | 2008/134976 | 11/2008 |
| WO | 2009/011501 | 1/2009 |

(56) References Cited

FOREIGN PATENT DOCUMENTS

| WO | 2009/014355 | 1/2009 |
|---|---|---|
| WO | 2009008623 | 1/2009 |
| WO | 2009048907 | 4/2009 |

OTHER PUBLICATIONS

United States Patent and Trademark Office U.S. Appl. No. 13/926,781, Office Action dated Jan. 5, 2015, 10 pages.
NEC Group, "Package of PSC and SSC proposals for LTE cell search," R1-071497, RAN WG1 meeting 48bis, Mar. 2007, XP-050105430.
NEC Group, "Primary Synchronisation Codes for LTE cell search," R1-072109, RAN WG1 meeting 49, May 2007, XP-050105858.
3rd Generation Partnership Project (3GPP), "Technical Specification Group Radio Access Network; Evolved Universal Terrestrial Radio Access (E-UTRA); Physical Channels and Modulation (Release 8)", 3GPP TS 36.211 V 8.2.0, Mar. 2008.
Ericsson, "Comparison of zero-correlation sequence and zadoff-Chu sequences for E-UTRA RACH", TSG-RAN WG1 LTE Ad Hoc; Jun. 2006.
Chu, "Polyphase codes with good periodic correlation properties", IEEE transactions on information theory, Jul. 1972, pp. 531, 532.
Jamil, M., et al., "A comparison of unfiltered and filtered complex spreading sequences based on a periodic correlation properties," 1998 IEEE 5th Int'l Symposium on Spread Spectrum Techniques and Applications, Sep. 2, 1998, vol. 3, pp. 686-691, XP010307631.
Ericsson, "Secondary Synchronization Signal Design," R1-071584, 3GPP TSG-RAN WG1 #48-bis, Mar. 2007.
QUALCOMM Europe, "Details on SSG sequence design," R1-072093, 3GPP TSG-RAN WG1 #49, May 2007.
NTT DoCoMo et al., "S-SCH Structure for E-UTRA Downlink," R1-072414, 3GPP TSG RAN WG1 Meeting #49, May 2007.
Motorola, "Scrambling Method for Two S-SCH Short Code," R1-072661, 3GPP TSG RAN WG1 Meeting #49bis, Jun. 2007.
NTT DoCoMo et al., "Scrambling Method for S-SCH in E-Utra Downlink," R1-072940, 3GPP TSG RAN WG1 Meeting #49bis, Jun. 2007.
NTT DoCoMo et al., "S-SCH Structure for E-UTRA Downlink", 3GPP TSG RAN WG1 Meeting #49bis, R1-072941, Jun. 2007.
NTT DoCoMo et al., "S-SCH Structure for E-UTRA Downlink", 3GPP TSG RAN WG1 Meeting #48bis, R1-071628, Mar. 2007.
J. Nystrom et al., "Comparison of Cell Search Methods for Asynchronous Wideband CDMA Cellular System", IEEE, pp. 783-787, Oct. 1998.
M. Cinteza et al., "Initial Cell Search Procedure in WCDMA—An Improved Algorithm for FDD", IEEE, pp. 517-520, Jan. 2003.
S. Sriram et al., "Cyclically Permutable Codes for Rapid Acquisition in DS-CDMA Systems with Asynchronous Base Stations", IEEE Journal on Selected Areas in Communications, vol. 19, No. 1, Jan. 2001.
LG Electronics, "P-SCH sequence design for E-UTRA", R1-063164, 3GPP TSG RAN WG1 #47, Nov. 2006.
NTT DoCoMo et al., "SCH Sequence Configuration for E-UTRA Downlink", R1-063302, 3GPP TSG RAN WG1 Meeting #47, Nov. 2006.
Texas Instruments et al., "Way Forward for Secondary SCH Mapping and Scrambling", R1-074498, 3GPP TSG RAN WG1 50bis, Oct. 2007.
LG Electronics, "SSC mapping and scrambling method", R1-074502, 3GPP TSG RAN WG1 #50 bis, Oct. 2007, 13 pages (relevant sections: 1; 2.1; and 2.2).
European Patent Office Application Serial No. 14154981.6, Search Report dated Mar. 24, 2014, 5 pages.
The State Intellectual Property Office of the People's Republic of China Application Serial No. 201410058260.4, Office Action dated Jun. 23, 2016, 11 pages.

\* cited by examiner

FIG. 17
(a)
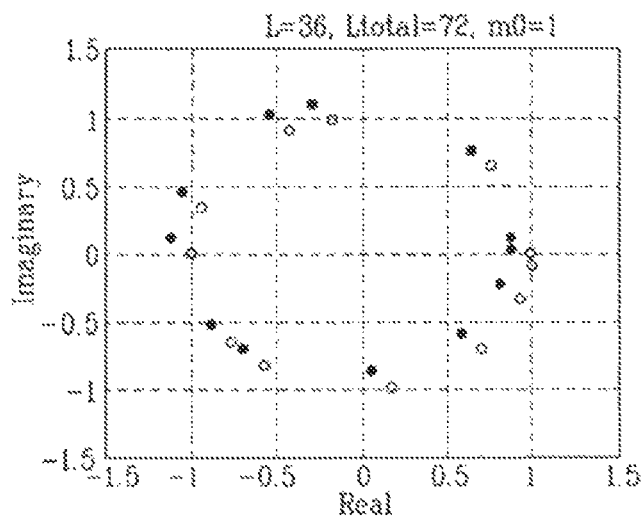
(b)
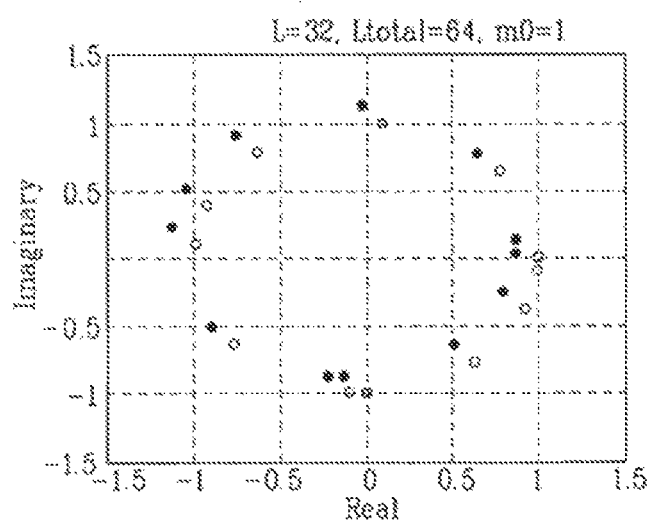
○ Original ZC
* Punctured ZC

FIG. 21
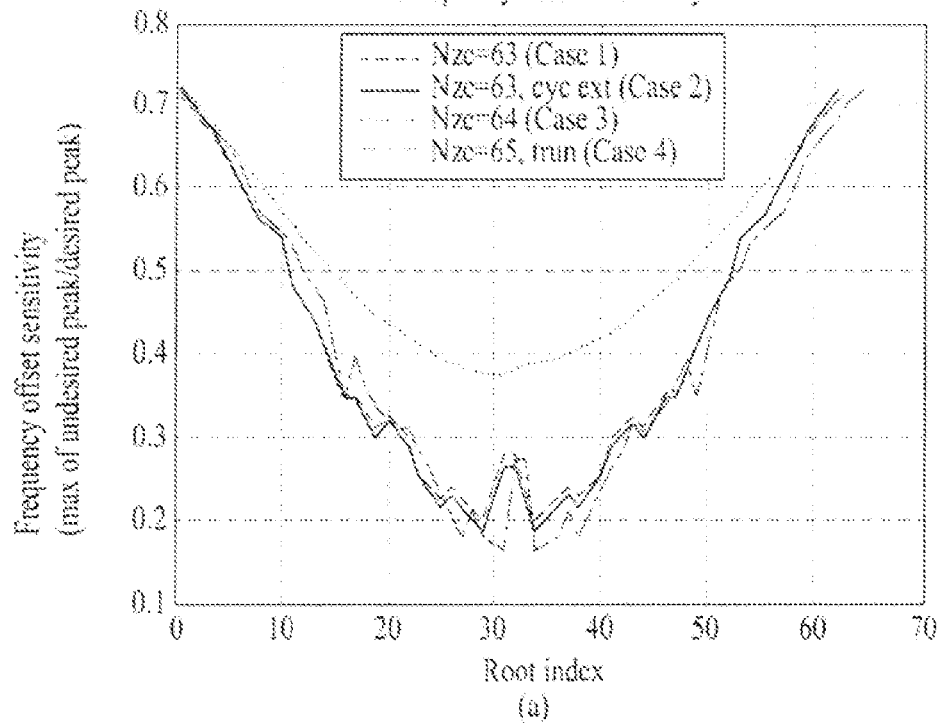
(a)
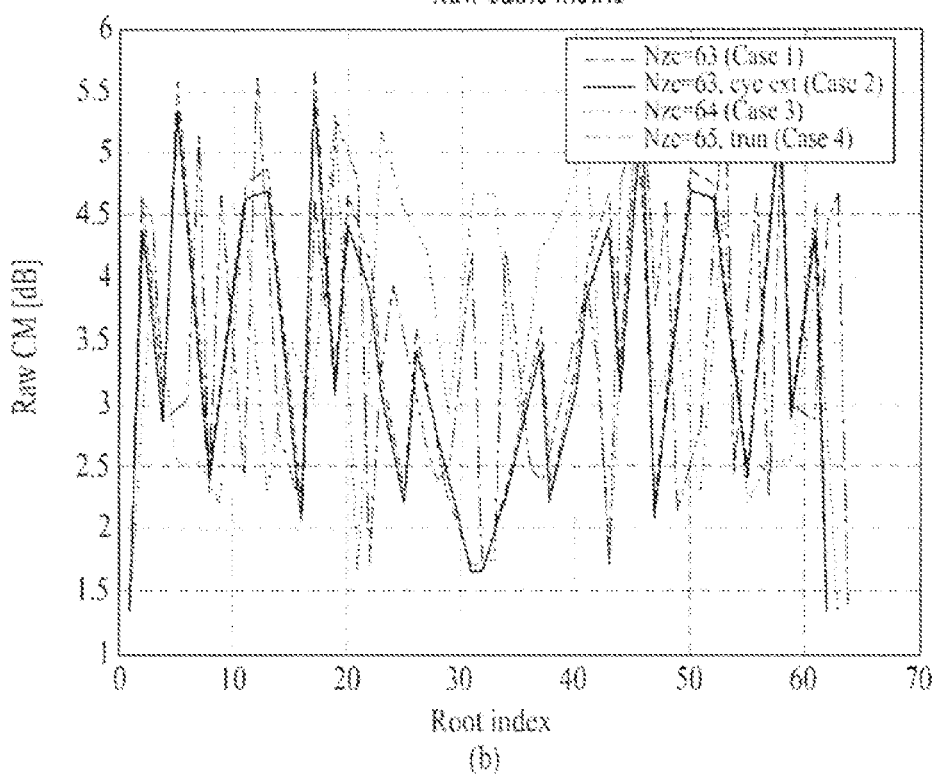
(b)

FIG. 22
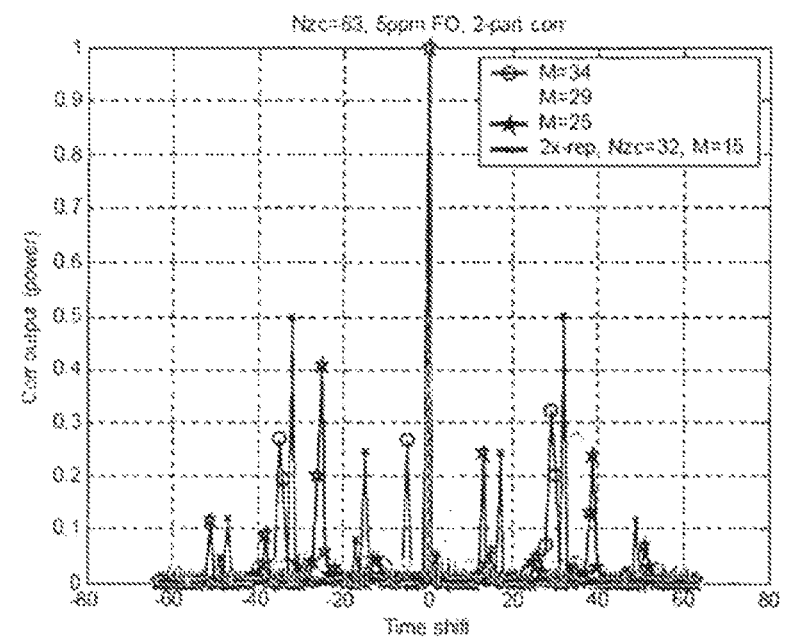
(a)
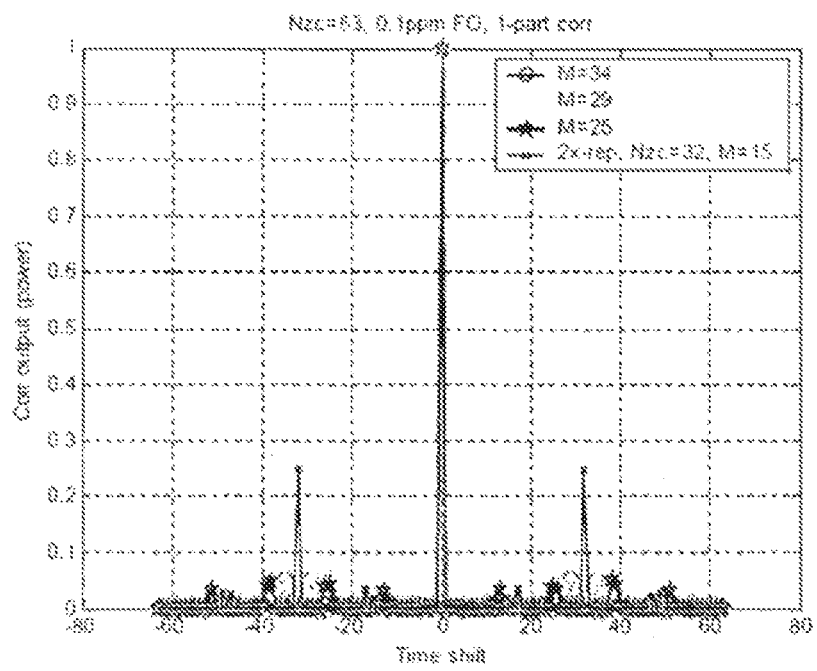
(b)

FIG. 23
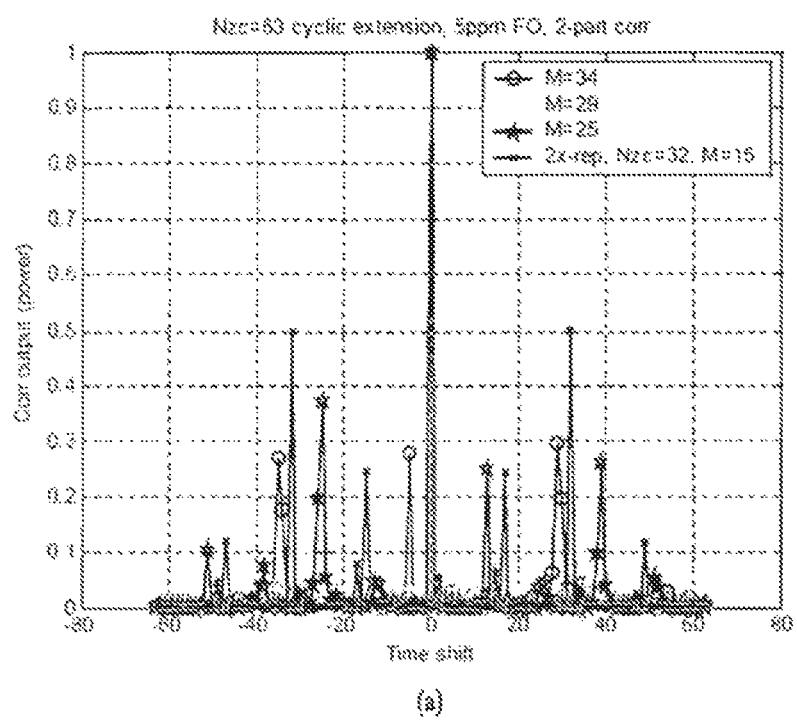
(a)
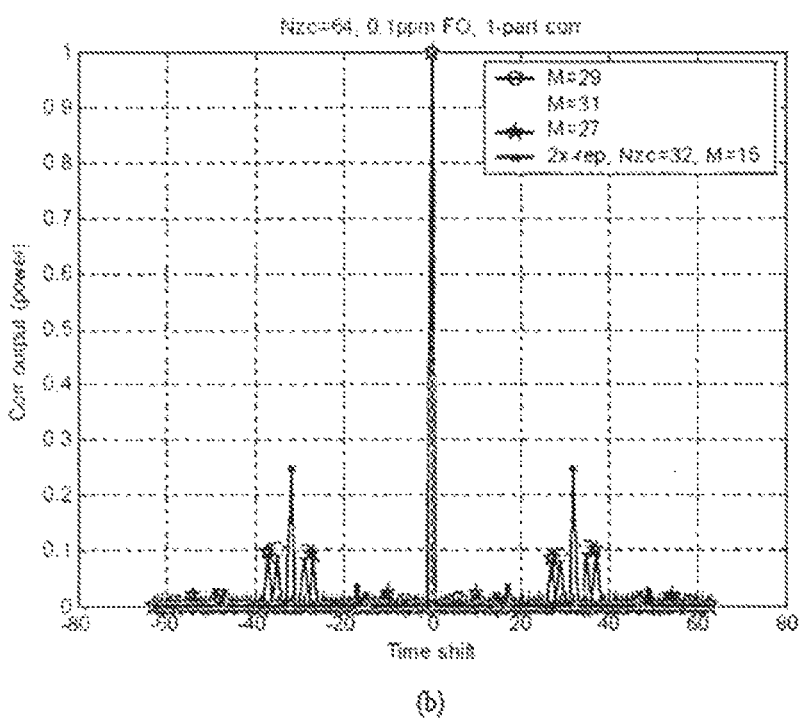
(b)

FIG. 24
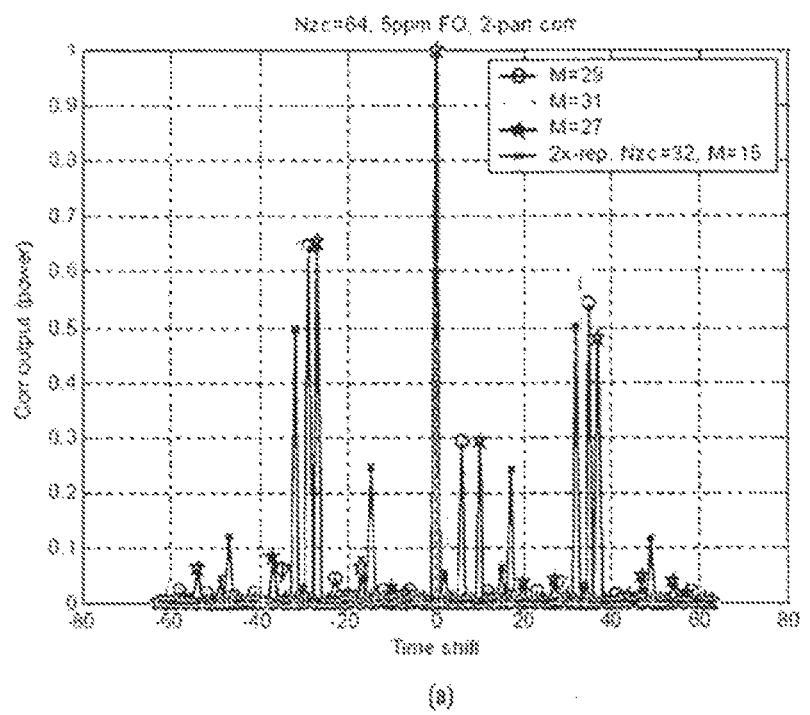
(a)
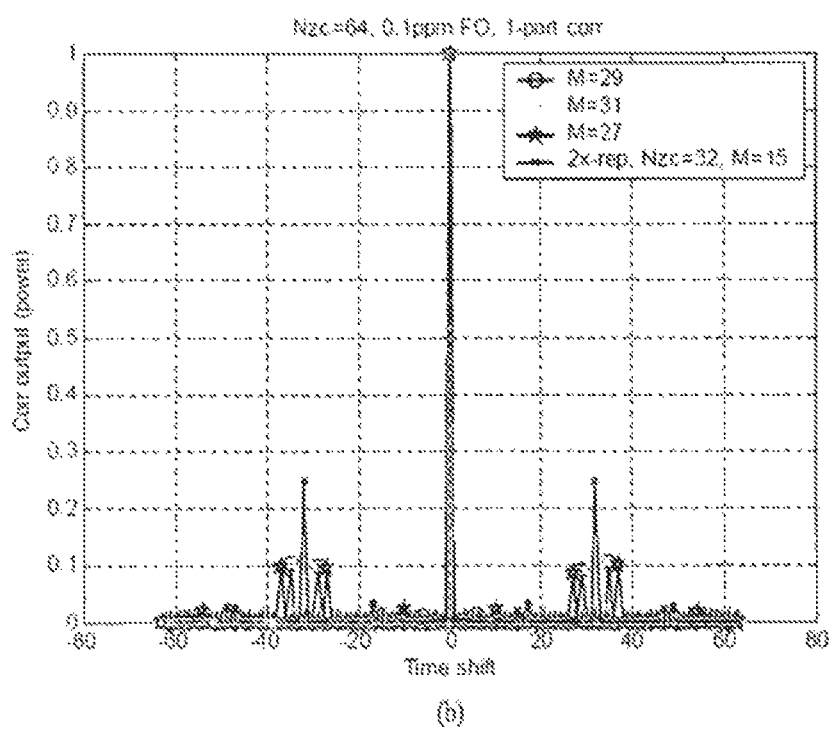
(b)

FIG. 26
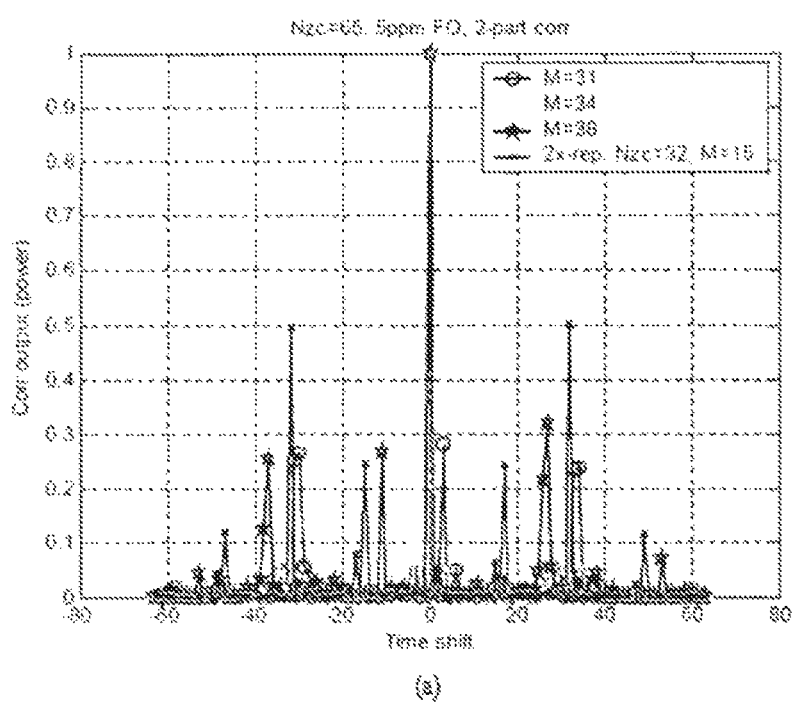
(a)
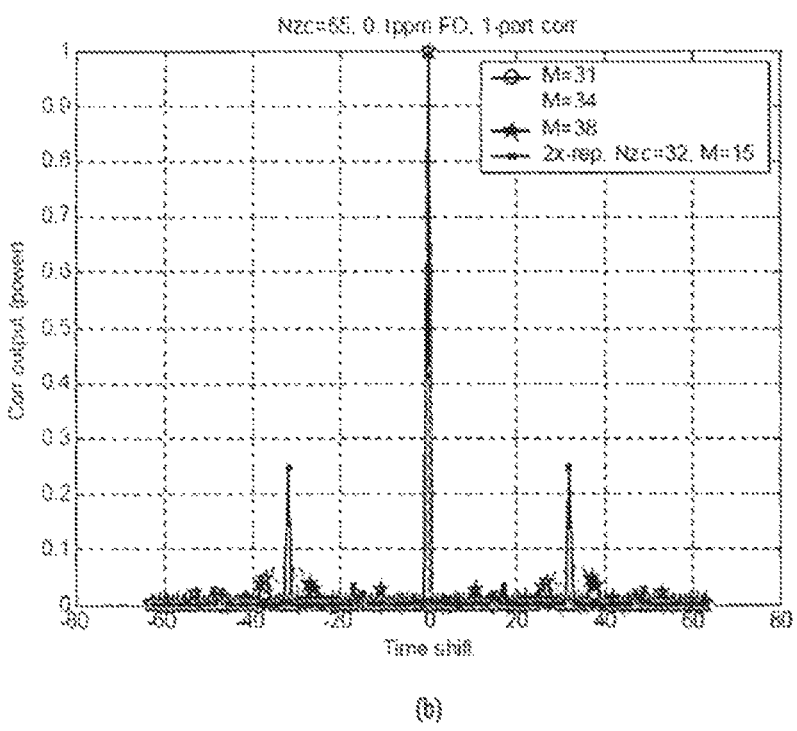
(b)

METHOD AND APPARATUS FOR TRANSMITTING OR DETECTING A PRIMARY SYNCHRONIZATION SIGNAL

CROSS-REFERENCE TO RELATED APPLICATIONS

This application is a continuation of U.S. application Ser. No. 14/196,970, filed on Mar. 4, 2014, now U.S. Pat. No. 8,989,327 which is a continuation of U.S. application Ser. No. 13/948,947, filed on Jul. 23, 2013, now U.S. Pat. No. 8,948,294, which is a continuation of U.S. application Ser. No. 13/333,877, filed on Dec. 21, 2011, now U.S. Pat. No. 8,520,768, which is a continuation of U.S. application Ser. No. 11/960,556, filed on Dec. 19, 2007, now U.S. Pat. No. 8,130,863, which claims the benefit of earlier filing date and right of priority to Korean Patent Application Nos. 10-2007-0025175, filed on Mar. 14, 2007, 10-2007-48353, filed on May 17, 2007, and 10-2007-0057531, filed on Jun. 12, 2007, and also claims the benefit of U.S. Provisional Application No. 60/870,786, filed on Dec. 19, 2006, 60/884,399, filed on Jan. 10, 2007, 60/885,387, filed on Jan. 17, 2007, 60/888,304, filed on Feb. 5, 2007, and 60/968,556, filed on Aug. 28, 2007, the contents of which are all hereby incorporated by reference herein in their entirety.

BACKGROUND OF THE INVENTION

Field of the Invention

The present invention relates to a signal transmission/reception method for use in a communication system based on an orthogonal frequency division multiplexing (OFDM) scheme, and more particularly to a sequence generation method for allowing a reception end to effectively detect a sequence used for a specific channel of mobile communication system, and a signal transmitting/receiving method using this sequence generation method.

Discussion of the Related Art

The OFDM, OFDMA, and SC-FDMA schemes for use in the present invention will hereinafter be described in detail.

In recent times, as the demand of high-speed data transmission rapidly increases, the OFDM scheme is more advantageous to this high-speed transmission, so that the OFDM scheme is used as a transmission scheme for use in a variety of high-speed communication systems.

The OFDM (Orthogonal Frequency Division Multiplexing) scheme will hereinafter be described.

OFDM Scheme

According to the basic principles of the OFDM scheme, the OFDM scheme divides a high-rate data stream into many slow-rate data streams, and simultaneously transmits the slow-rate data streams via multiple carriers. Each of the carriers is called a sub-carrier.

In the OFDM scheme, the orthogonality exists between multiple carriers. Accordingly, although frequency components of the carrier are overlapped with each other, the overlapped frequency components can be detected by a reception end.

More specifically, a high-rate data stream is converted to a parallel low-rate data stream by a serial to parallel (SP) converter. The individual sub-carriers are multiplied by the above parallel data streams, the individual data streams are added to the multiplied result, and the added result is transmitted to the reception end.

On the other hand, the OFDMA scheme is a multiple access method for allowing the OFDM system to allocate the sub-carriers in a total band to each of a plurality of users according to a transmission rate required by each user.

The conventional SC-FDMA (Single Carrier-FDMA) scheme will hereinafter be described. This SC-FDMA scheme is also called a DFS-S-OFDM scheme.

SC-FDMA Scheme

The SC-FDMA scheme will hereinafter be described in detail. The SC-FDMA scheme mainly applied to an uplink performs the spreading based on the DFT matrix in a frequency domain before generating the OFDM signal, modulates the spreading result according to the conventional OFDM scheme, and transmits the modulated result.

Some variables are defined to explain the SC-FDMA scheme. "N" is indicative of the number of sub-carriers transmitting the OFDM signal. "Nb" is indicative of the number of sub-carriers for a predetermined user. "F" is indicative of a Discrete Fourier Transform (DFT) matrix, "s" is indicative of a data symbol vector, "x" is indicative of a data dispersion vector in the frequency domain, and "y" is indicative of an OFDM symbol vector transmitted in the time domain.

Before the SC-FDMA scheme transmits the data symbol (s), the data symbol (s) is dispersed, as represented by the following equation 1:

$$x = F_{N_b \times N_b} s \qquad \text{[Equation 1]}$$

In Equation 1, $F_{N_b \times N_b}$ is indicative of a $N_b$-sized DFT matrix to disperse the data symbol (s).

The sub-carrier mapping process is performed on the dispersed vector (x) according to a predetermined sub-carrier allocation technique. The mapping resultant signal is converted into a time-domain signal by the IDFT module, so that a desired signal to be transmitted to the reception end is acquired. In this case, the transmission signal converted into time-domain signal by to the transmission end can be represented by the following equation 2:

$$y = F_{N \times N}^{-1} x \qquad \text{[Equation 2]}$$

In Equation 2, $F_{N \times N}^{-1}$ is indicative of the N-sized IDFT matrix for converting a frequency-domain signal into a time-domain signal.

Then, a cyclic prefix is inserted into the signal (y) created by the above-mentioned method, so that the resultant signal is transmitted. This method capable of generating the transmission signal and transmitting the same to the reception end is called an SC-FDMA method. The size of the DFT matrix can be controlled in various ways to implement a specific purpose.

The above-mentioned concepts have been disclosed on the basis of the DFT or IDFT operation. For the convenience of description, the following description will be disclosed without discriminating between the DFT (Discrete Fourier Transform) scheme and the FFT (Fast Fourier Transform) scheme.

If the number of input values of the DFT operation is represented by the modular exponentiation of 2, it is well known to those skilled in the art that the FFT operation can be replaced with the DFT operation. In the following description, the FFT operation may also be considered to be the DFT operation or other equivalent operation without any change.

Typically, the OFDM system forms a single frame using a plurality of OFDM symbols, so that it transmits the single frame composed of several OFDM symbols in frame units. The OFDM system firstly transmits the preamble at intervals of several frames or each frame. In this case, the number of OFDM symbols of the preamble is different according to the system types.

For example, the IEEE 802.16 system based on the OFDMA scheme firstly transmits the preamble composed of a single OFDM symbol at intervals of each downlink frame. The preamble is applied to a communication terminal, so that the communication terminal can be synchronized with the communication system, can search for a necessary cell, and can perform channel estimation.

FIG. 1 shows a downlink sub-frame structure of the IEEE 802.16 system. As shown in FIG. 1, the preamble composed of the single OFDM symbol is located ahead of each frame, so that it is transmitted earlier than each frame. The preamble is also used to search for the cell, perform the channel estimation, and be synchronized in time and frequency.

FIG. 2 shows the set of the sub-carriers which transmit the preamble from the 0-th sector in the IEEE 802.16 system. Some parts of both sides of a given bandwidth are used as the guard band. If the number of sectors is 3, each sector inserts the sequence at intervals of 3 sub-carriers, and "0" is inserted into the remaining sub-carriers, so that the resultant sub-carriers are transmitted to a destination.

The conventional sequence for use in the preamble will hereinafter be described. The sequence for use in the preamble is shown in the following table 1.

TABLE 1

| Index | ID cell | Sector | Sequence (hexadecimal) |
|---|---|---|---|
| 0 | 0 | 0 | A6F294537B285E1844677D133E4D53CCB1F18 2DE00489E53E6B6E77065C7EE7D0ADBEAF |
| 1 | 1 | 0 | 668321CBBE7F462E6C2A07E8BBDA2C7F7946 D5F69E35AC8ACF7D64AB4A33C467001F3B2 |
| 2 | 2 | 0 | 1C75D30B2DF72CEC9117A0BD8EAF8E050246 1FC07456AC906ADE03E9B5AB5E1D3F98C6E |
| ... | ... | ... | ... |

The sequence is defined by the sector number and the IDcell parameter value. Each defined sequence is converted into a binary signal in ascending numerical order, and the binary signal is mapped to the sub-carrier by the BPSK modulation.

In other words, the hexadecimal progression is converted into a binary progression (Wk), the binary progression (Wk) is mapped in the range from the MSB (Most Significant Bit) to the LSB (Least Significant Bit). Namely, the value of 0 is mapped to another value of +1, and the value of 1 is mapped to another value of −1. For example, the "Wk" value of the hexadecimal value "C12" at the 0-th segment having the index of 0 is "110000010010 . . . ". The converted binary code value is −1, −1, +1, +1, +1, +1, +1, −1, +1, +1, −1, +1 . . . .

The sequence according to the conventional art maintains the correlation characteristics among various sequence types capable of being composed of binary codes. The sequence according to the conventional art can maintain a low-level PAPR (Peak-to-Average Power Ratio) when data is converted into another data of a time domain, and is found by the computer simulation. If the system structure is changed to another, or the sequence is applied to another system, the conventional art must search for a new sequence.

Recently, there is proposed a new sequence for use in the 3GPP LTE (3$^{rd}$ Generation Partnership Project Long Term Evolution hereinafter "LTE") technology, and a detailed description thereof will hereinafter be described.

A variety of sequences have been proposed for the LTE system. The sequences for use in the LTE system will hereinafter be described.

In order to allow the terminal to communicate with the Node-B (i.e., base station), the terminal must be synchronized with the Node-B over a synchronous channel (SCH), and must search for the cell.

The above-mentioned operation, in which the terminal is synchronized with the Node-B and an ID of a cell including the terminal is acquired, is called a cell search process. Generally, the cell search is classified into an initial cell search and a neighbor cell search. The initial cell search process is executed when the terminal is initially powered on. The neighbor cell search is executed when a connection-mode or idle-mode terminal searches for a neighbor Node-B.

The SCH (Synchronous Channel) may have a hierarchical structure. For example, the SCH may use a primary SCH (P-SCH) and a secondary SCH (S-SCH).

The P-SCH and the S-SCH may be contained in a radio frame by a variety of methods.

FIGS. 3 and 4 show a variety of methods capable of involving the P-SCH and S-SCH in the radio frame. Under a variety of situations, the LTE system may configure the SCH according to the structure of FIG. 3 or 4.

In FIG. 3, the P-SCH is contained in the last OFDM symbol of a first sub-frame, and the S-SCH is contained in the last OFDM symbol of a second sub-frame (in FIG. 3, duration of a sub-frame is supposed to have 0.5 ms. But the length of the sub-frame can be differently configured according to the system).

In FIG. 4, the P-SCH is contained in the last OFDM symbol of a first sub-frame, and the S-SCH is contained in a second OFDM symbol from the last OFDM symbol of the first sub-frame (in FIG. 4, also, duration of a sub-frame is supposed to have 0.5 ms).

The LTE system can acquire the time/frequency synchronization over the P-SCH. Also, the S-SCH may include a cell group ID, frame synchronous information, and antenna configuration information, etc.

The P-SCH configuration method proposed by the conventional 3GPP LTE system will hereinafter be described.

The P-SCH is transmitted over the band of 1.08 MHz on the basis of a carrier frequency, and corresponds to 72 sub-carriers. In this case, the interval among the individual sub-carriers is 15 kHz, because the LTE system defines 12 sub-carriers as a single resource block (RB). In this case, the 72 sub-carriers are equal to 6 RBs.

The P-SCH is widely used in a communication system (e.g., an OFDM or SC-FDMA system) capable of employing several orthogonal sub-carriers, so that it must satisfy the following first to fifth conditions.

According to the first condition, in order to allow a reception end to detect a superior performance, the above-mentioned P-SCH must have superior auto-correlation and cross-correlation characteristics in a time domain associated with constituent sequences of the P-SCH.

According to the second condition, the above-mentioned P-SCH must allow a low complexity associated with the synchronization detection.

According to the third condition, it is "preferable" that the above-mentioned P-SCH may have the Nx repetition structure to implement a superior frequency offset estimation performance.

According to the fourth condition, the P-SCH having a low PAPR (Peak-to-Average Power Ratio) or a low CM is preferable.

According to the fifth condition, provided that the P-SCH is used as a channel estimation channel, the frequency response of the P-SCH may have a constant value. In other words, from the viewpoint of the channel estimation, it is well known in the art that a flat response in a frequency domain has the best channel estimation performance.

Although a variety of sequences have been proposed by the conventional art, the conventional art cannot sufficiently satisfy the above-mentioned conditions.

SUMMARY OF THE INVENTION

Accordingly, the present invention is directed to a sequence generation method for efficient detection, and a method for transmitting/receiving signals using the same that substantially obviate one or more problems due to limitations and disadvantages of the related art.

An object of the present invention is to provide a method for providing a sequence having superior correlation characteristics.

Another object of the present invention is to provide a method for generating a sequence in a transmission end, and transmitting the sequence, so that a reception end can easily detect the sequence.

Yet another object of the present invention is to provide a method for effectively detecting the above-mentioned generated/transmitted signal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a signal transmission method comprising: selecting one of root indexes contained in root-index set which enable a first sequence and a second sequence from among multiple sequences having each of the root indexes in the root-index set to satisfy a conjugate symmetry property; generating a sequence in a frequency domain or a time domain according to the selected root index; mapping the generated sequence to a frequency-domain resource element; and converting the frequency-domain-mapped sequence into a time-domain transmission signal, and transmitting the time-domain transmission signal.

Preferably, the multiple sequences are indicative of Zadoff-Chu sequences, and the root-index set satisfying the conjugate symmetry property allows the sum of root indexes of each of the first and second sequences to correspond to a length of the Zadoff-Chu sequences.

Preferably, the Zadoff-Chu sequences have an odd number length, and an equation for generating the Zadoff-Chu sequences is denoted by the following equation:

$$\exp\left(-i\frac{M\pi n(n+1)}{N}\right)$$

wherein the length of the Zadoff-Chu sequences is "N", "M" is a root index of the Zadoff-Chu sequence, and "n" is index of each constituent components of one specific Zadoff-Chu sequence.

Preferably, the root-index set, in which the sum of individual root indexes of the first and second sequences corresponds to the length of Zadoff-Chu sequences, is set to make the sum of the individual root indexes of the first and second sequences to be set to the value "N".

Preferably, the length of the Zadoff-Chu sequence is 63, and the root index of the first sequence is set to 34, and the root index of the second sequence is set to 29.

Preferably, the number of the multiple sequences is three, and the root index of a third sequence from among the multiple sequences in the root-index set is selected in consideration of an influence of a frequency offset.

Preferably, in the root-index set, the root index of the first sequence is set to 34, the root index of the second sequence is set to 29, and the root index of the third sequence is set to 25.

Preferably, the multiple sequences are used as P-SCH (Primary-SCH) transmission sequences.

Preferably, the multiple sequences are used as uplink preamble transmission sequences.

In another aspect of the present invention, there is provided a signal transmission method comprising: selecting one of root indexes contained in root-index set which enable the sum of individual root indexes of a first sequence and a second sequence from among multiple sequences having each of root indexes in the root-index set to correspond to a length of the multiple sequences; generating the sequence in a frequency domain or a time domain according to the selected root index; mapping the generated sequence to a frequency-domain resource element; and converting the frequency-domain-mapped sequence into a time-domain transmission signal, and transmitting the time-domain transmission signal.

Preferably, the multiple sequences are indicative of Zadoff-Chu sequences having an odd number length, and an equation for generating the Zadoff-Chu sequences is denoted by the following equation:

$$\exp\left(-i\frac{M\pi n(n+1)}{N}\right)$$

wherein the length of the Zadoff-Chu sequences is "N", the root-index set, in which the sum of individual root indexes of the first and second sequences corresponds to the length of multiple sequences, is set to make the sum of the individual root indexes of the first and second sequences to be set to the value "N", where "M" is a root index of the Zadoff-Chu sequence, and "n" is index of each constituent components of one specific Zadoff-Chu sequence.

In yet another aspect of the present invention, there is provided a method for calculating a cross-correlation value between a received (Rx) signal and each of multiple sequences comprising a first sequence and a second sequence, the method comprising: achieving a plurality of intermediate values generated when a cross-correlation value between the Rx signal and a first sequence from among the multiple sequences is calculated; and calculating each of the cross-correlation values between the Rx signal and the first sequence from among the multiple sequences and between the Rx signal and a second sequence from among the multiple sequences by addition or subtraction of the intermediate values, wherein a root index for the first sequence and a root index for the second sequence are set so that the first sequence and the second sequence satisfy a conjugate symmetry property.

Preferably, the first sequence and the second sequence, which satisfy the conjugate symmetry property, satisfy a conjugate-complex relationship from each other.

Preferably, the intermediate values include: a first result value indicating a cross-correlation value between a real part of the Rx signal and an real part of the first sequence; a second result value indicating a cross-correlation value between an imaginary part of the Rx signal and an imaginary part of the first sequence; a third result value indicating a cross-correlation value between an imaginary part of the Rx signal and a real part of the first sequence; and a fourth result value indicating a cross-correlation value between a real part of the Rx signal and an imaginary part of the first sequence.

Preferably, the cross-correlation value between the Rx signal and the first sequence is calculated so that the sum of the first result value and the second result value to be a real part, and the deference between the third result value and the fourth result value to be an imaginary part.

Preferably, the cross-correlation value between the Rx signal and the second sequence is calculated so that the difference between the first result value and the second result value to be a real part, and the sum of the third result value and the fourth result value to be an imaginary part.

In yet another aspect of the present invention, there is provided a signal transmission method using a Constant Amplitude Zero Auto-Correlation (CAZAC) sequence comprising: selecting a predetermined root index, and generating the CAZAC sequence in a frequency domain or a time domain according to the selected root index; continuously mapping the generated CAZAC sequence to a frequency resource element; and converting the frequency-domain-mapped sequence into a time-domain transmission signal, and transmitting the time-domain transmission signal, wherein the time-domain transmission signal is transmitted in a condition that a specific component corresponding to a part of a frequency "0" from the CAZAC sequence is omitted, so that the resultant time-domain transmission signal has no component corresponding to the frequency "0".

Preferably, the time-domain transmission signal is transmitted after puncturing of the component corresponding to the part of the frequency "0" from the CAZAC sequence.

Preferably, the CAZAC sequence is a Zadoff-Chu sequence with an odd number length, an equation for generating the Zadoff-Chu sequence is denoted by the following equation:

$$\exp\left(-i\frac{M\pi n(n+1)}{N}\right)$$

wherein the length of the Zadoff-Chu sequence is "N", "M" is a root index of the Zadoff-Chu sequence, and "n" is index of each constituent components of one specific Zadoff-Chu sequence.

Preferably, the length of the Zadoff-Chu sequence is 63, and, in the Zadoff-Chu sequence, constituent components corresponding to the "n" value of "0~30" (i.e., n=0~30) are continuously mapped to frequency resource elements from a frequency resource element with a frequency resource element index of "−31" to a frequency resource element with a frequency resource element index of "−1", and constituent components corresponding to the "n" value of "32~62" (i.e., n=32~62) are continuously mapped to frequency resource elements from a frequency resource element with a frequency resource element index of "1" to a frequency resource element with a frequency resource element index of "31".

Preferably, the Zadoff-Chu sequence is used as a P-SCH (Primary-SCH) transmission sequence.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 17 shows the comparison in constellation map between a sequence having no DC component and the other sequence having the DC component according to the present invention;

FIG. 21 is a graph illustrating a frequency-offset sensitivity and a CM under a variety of conditions according to the present invention;

FIGS. 22~25 are graphs illustrating auto-correlation profiles of the individual sets when a root-index set is selected according to the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

For the convenience of description and better understanding of the present invention, the following detailed description will disclose a variety of embodiments and modifications of the present invention. In some cases, in order to prevent ambiguous concepts of the present invention from occurring, conventional devices or apparatuses well known to those skilled in the art will be omitted and denoted in the form of a block diagram on the basis of the important functions of the present invention.

It should be noted that the present invention generates and transmits a sequence so that a reception end can effectively receive or detect a corresponding sequence. For this purpose, the present invention provides a variety of methods for generating/transmitting a sequence for use in a specific channel, for example, a method for generating a sequence in a time or frequency domain, a method for mapping a sequence generated in the time or frequency domain to a frequency-domain sequence, a method for converting a frequency-domain sequence into a time-domain sequence, a data processing method for removing or avoiding to have a DC component, and a method for generating a sequence having iterative- or repetitive-characteristics in a time domain, etc.

Basic Embodiment

The sequence generated by the present invention may be applied to a variety of channels.

For example, the sequence may be applied to an uplink preamble transmission signal (e.g., a random access channel (RACH)) or a downlink synchronization channel, etc. And, the sequence may be applied to a data channel or a channel for a control signal, and may also be applied to the synchronization channel which enables time or frequency synchronization process.

For the convenience of description, although the present invention will describe a method for generating a sequence for synchronization channels (e.g., the P-SCH channel), it should be noted that the scope of the present invention is not limited to only the following examples, and can also be applied to other examples.

For example, in the case of transmitting specific information over a corresponding channel without establishing time synchronization, instantaneous correlation output data of the above-mentioned time synchronization concept is used to acquire corresponding information. Provided that zero-delayed correlation output function is executed, the aforementioned specific information follows the same procedure.

Figure 5:
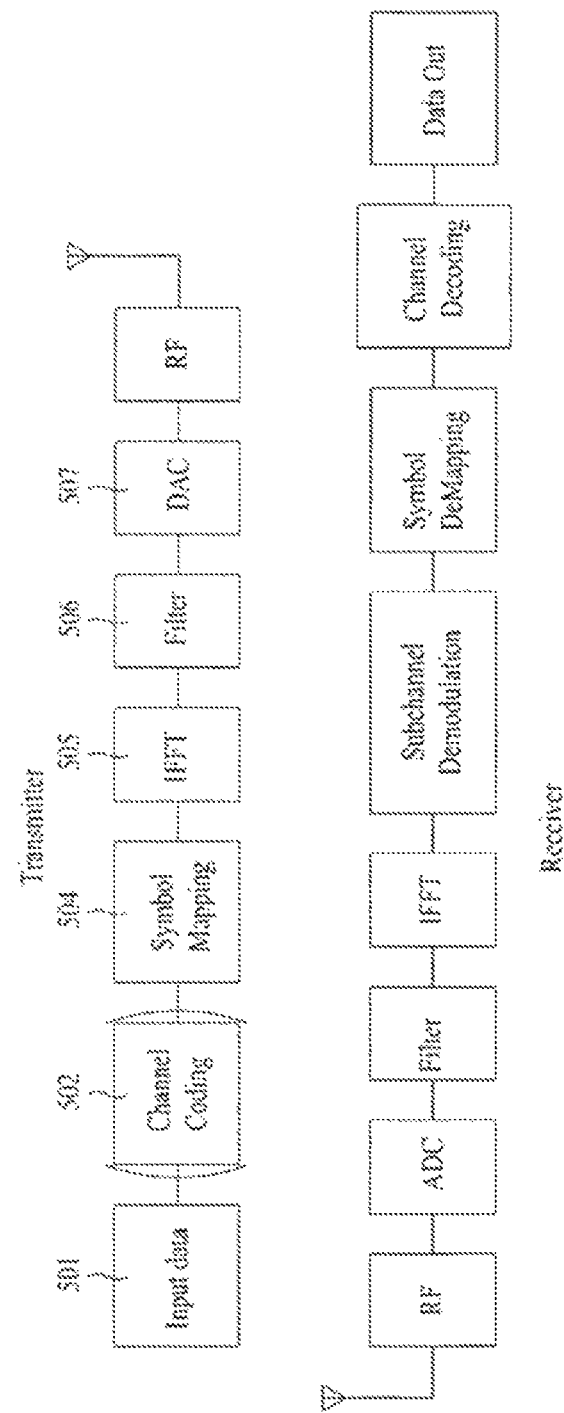
FIG. 5 is a block diagram illustrating transmission/reception ends for implementing one embodiment of the present invention.

FIG. 5 is a block diagram illustrating transmission/reception ends for implementing one embodiment of the present invention.

The transmission end will hereinafter be described with reference to FIG. 5. Upon receiving input data 501, the transmission end performs a channel coding 502 for adding redundant bits (also called redundancy bits) to the input data 501, so that it can prevent the input data 501 from being distorted in a channel.

The channel coding unit 502 may be conducted by a turbo-code or LDPC code, etc. The channel coding unit 502 may be omitted from a process for transmitting a synchronization channel or uplink preamble. So, the channel coding unit 502 is not necessary component to the embodiment of this invention providing sequence generation method for used in synchronization channel or method for transmitting uplink preamble.

Thereafter, the resultant data enters symbol mapping unit 504 which can be implemented with QPSK or 16QAM, etc. Then, the symbol-mapped signals are loaded on time-domain carriers via the IFFT 505, and the output signals of the IFFT 505 are transmitted to a radio-frequency (RF) channel via the filter 506 and the DAC (Digital-to-Analog Converter) 507. Operations of the reception end are performed in reverse order of those of the transmission end.

FIG. 5 is not one example structure of the transmission end to implement the sequence generation/transmission method which will be described below.

Figure 6:
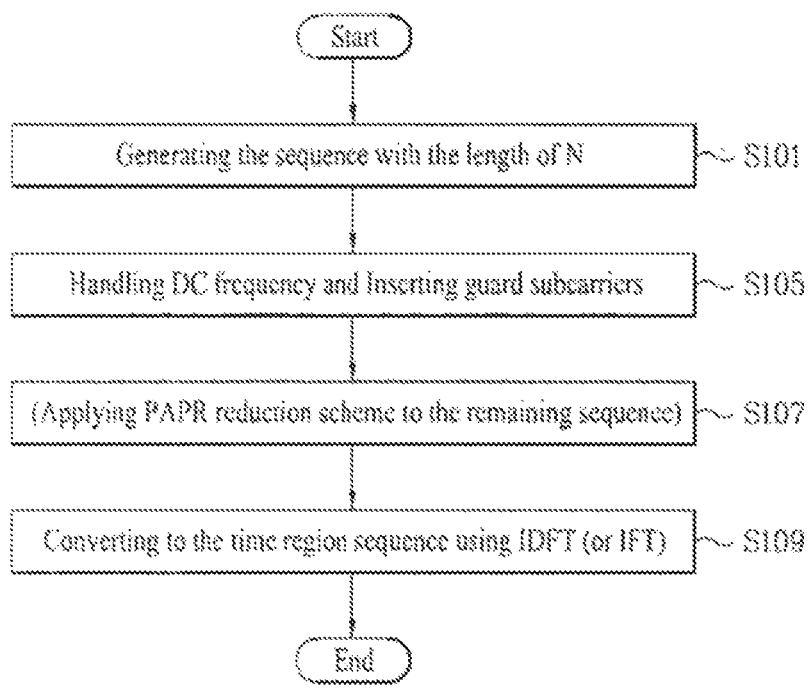
FIG. 6 is a flow chart illustrating a method for maintaining rational correlation characteristics and a method for designing a low-PAPR sequence according to the present invention.

FIG. 6 is a flow chart for illustrating basic concept of generating/transmitting sequence according to one embodiment of the present invention.

Referring to FIG. 6, the sequence generation method generates a sequence with the length of N in a time or frequency domain at step S101. In the step S101, one embodiment of this invention propose to select root index in the root index set which enable at least two sequence having the indexes in that index set meet "the conjugate symmetry property". By using the sequence having the index satisfying the conjugate symmetry property, the reception end can easily detect the received signal by one correlation operation. The conjugate symmetry property and other characteristics of this embodiment will be described later.

On the other hand, if the sequence is generated in the time domain, the sequence generation method performs the N-point FFT operation, so that the sequence is mapped to a frequency-domain resource element. But, it should be noted that the present invention does not limit to a sequence generation in time domain, and can be implemented for generating sequence in frequency domain. So, for the embodiment for generating sequence in frequency domain, the FFT or DFT step can be omitted.

Meanwhile, according to the requirements of a communication system, the sequence generation method may perform handling DC (Direct Current) component and inserting guard sub-carriers at step S105. In the step S105, handling DC component is for preventing the generated sequence from having DC component in the frequency domain. It can be done by directly puncturing the DC component from the sequence, or any other equivalent operation.

If required, the PAPR attenuation technique may be applied to the resultant sequence at step S107, and a corresponding sequence is converted into a time-domain sequence by the IDFT or IFT (Inverse Fourier Transform) operation at step S109. As described above, it is obvious to those skilled in the art that the DFT or FFT may be selectively executed according to the N value.

The sequence generated and/or transmitted by the above scheme can be an uplink preamble, downlink synchronization channel signal, or any other equivalent signal.

The sequence generation method and the signal transmission method according to the present invention will hereinafter be described in more detail.

If the sequence with the length of N is generated at step S101, the sequence may select a specific index among index sets having multiple indexes for discriminating among sequences, so that it may be generated by the selected index.

In this case, as stated above, one embodiment of the present invention provides a method for generating sequence by selecting indexes in the index set, in which at least two of the indexes satisfy the conjugate symmetry property. In this case, the conjugate symmetry property indicates that a sequence corresponding to a specific index is equal to a conjugate complex of another sequence corresponding to another sequence, and a detailed description thereof will hereinafter be described with reference to the following detailed sequence.

In the case of using at least one sequence among multiple sequences, each of which includes an index satisfying the conjugate symmetry property, the reception end can considerably reduce the number of calculations of cross-correlations, so that it can easily detect a desired signal.

The present invention provides a method for omitting a component corresponding to DC sub-carriers, as shown in S105, and transmitting the resultant signal.

Individual steps of FIG. 6 will hereinafter be described in detail.

Firstly, the step S101 for forming/generating the sequence with the length of N will hereinafter be described.

According to one embodiment of the present invention, the present invention provides not only a method for making the sequence to express superior correlation characteristics but also a method for generating a sequence capable of maintaining a predetermined amplitude. For this purpose, this embodiment generates a sequence with a specific length in a time or frequency domain.

Preferred conditions required for the sequence used for this embodiment will hereinafter be described.

As described above, in order to increase the efficiency of an amplifier of the transmission end, it is preferable for the transmission end to transmit the sequence for reducing the PAPR. The sequence according to this embodiment may have a predetermined-amplitude value in the time domain. It is preferable that the signal amplitude of the sequence may be slightly changed in not only the time domain but also the frequency domain.

When most communication methods have allocated a predetermined frequency band to a specific transmission/reception end, the communication methods have limited a maximum value of the power capable of being used at the allocated frequency band. In other words, a general communication method includes a specific spectrum mask. Therefore, if the signal amplitude is irregular in the frequency domain although the constant-amplitude sequence is transmitted in the time domain, the signal may unexpectedly exceed the spectrum mask after the sequence has been boosted in the frequency domain.

If the channel value is pre-recognized under the frequency domain, it is preferable that the system may perform the power allocation in different ways according to the good or bad status of the channel. However, since the system has difficulty in pre-recognizing the channel due to characteristics of the preamble usage, the power of the used sub-carrier is generally constant.

In association with the above-mentioned frequency-flat characteristics, in the case of using a corresponding sequence as a specific channel to perform the channel estimation (e.g., if the P-SCH is used in the LTE system), there is decided the optimum case in which a reference signal for the channel estimation may have the frequency-flat characteristics.

Besides the above-mentioned PAPR characteristics, the sequence according to this embodiment may have superior correlation characteristics to easily detect or discriminate signals. The superior cross-correlation characteristics indicate the presence of superior auto-correlation characteristics and the presence of superior cross-correlation characteristics.

It is preferable that the sequence may be generated by the transmission end so that the reception end can easily acquire the synchronization. The above-mentioned synchronization may indicate the frequency synchronization and the time synchronization. Generally, if a specific pattern is repeated within a single OFDM symbol in the time domain, the reception end can easily acquire the frequency synchronization and the time synchronization.

Therefore, the sequence according to this embodiment may be established so that a specific pattern is repeated within a single OFDM symbol in the time domain, but it is not essential. Hereinafter, the non-limiting example for generating sequence having repeated structure will be described. For example, during the sequence generation step, the system can insert a preamble sequence equipped with two identical patterns within a single OFDM symbol generated by the N-point FFT module. There is no limitation in a method for constructing a sequence of a specific length by repeating the same pattern in the time domain. The following examples can be made available.

If the N-point FFT or DFT encounters the serious problem, the sequence of the length N/2 is created and repeated two times, then, a preamble sequence with the total length N can be configured. If the sequence with the length N/4 is generated and repeated two times, and the repeated sequence is inserted, a preamble sequence with the total length N/2 can be configured. The N/2 preamble sequence may have the length of N/2 in the frequency domain. In this case, the sequence interval is adjusted in the frequency domain, so that the sequence with the length of N may be generated.

In the meantime, as stated above, the present invention may also use a non-repetitive sequence in the time domain. In this case, the above-mentioned repetitive operation may be omitted as necessary. In other words, the present invention may also generate the N-length sequence in the time domain or directly in frequency domain without repetition of the N-length sequence. The sequence for use in this step may be the CAZAC sequence, the Golay sequence, or the binary sequence, etc.

According to this embodiment, there are a variety of sequences capable of being selected in consideration of the above-mentioned conditions. As an exemplary embodiment, the present invention proposes employing the CAZAC sequence. In more detail, although a method for forming the sequence with the length of 1024 in the time domain of the CAZAC sequence, and inserting the same sequence will hereinafter be described, it should be noted that the length of the CAZAC sequence may not be limited to this exemplary method.

According to the CAZAC sequence generated by this embodiment, the root-index set for discriminating among available CAZAC sequences is pre-generated, and a specific root-index from among the generated root-index sets is selected and the sequence according to the selected index is generated. In this case, it is preferable that the root-index selected for the sequence generation may be selected among the root-index set satisfying the conjugate symmetry property.

In order to satisfy the above-mentioned conjugate symmetry property in the CAZAC sequence, the sum of two root-indexes from among the index set can have different conditions according to specific information indicating whether the sequence length is denoted by an even or odd number length. If the corresponding sequence length is denoted by the odd length, and the sum of two root indexes corresponds to a period of an equation generating the corresponding sequence (in some case, the sequence length), the above-mentioned conjugate symmetry property can be satisfied.

However, the above-mentioned equation for generating the corresponding sequence may be changed from a basic-formatted equation to another equation to implement a specific purpose. In this case, the condition for satisfying the above-mentioned conjugate symmetry property may be changed to another condition. Indeed, the sum of both root-indexes must correspond to the period of an equation capable of generally generating a corresponding sequence. In association with this requirement, a detailed description of the sequence generation method according to the present invention will hereinafter be described along with other embodiments applied to a specific sequence.

The sequence according to the present invention may be generated in the time and/or frequency domain(s) according to the same principle. For the convenience of description, the following embodiment will be disclosed on the basis of a specific example which generates the sequence in a time domain and converts the generated sequence into a frequency-domain sequence, because the example which generates the sequence directly in a frequency domain can be easily understood because it is only omitting some steps of the embodiment for generating sequence in time domain. However, it should be noted that the scope of the present invention may not be limited to this example, and can also be applied to other examples as necessary.

The following description will disclose a specific example shown in the following equation 3.

$$a_n = \exp\left(-j\frac{M\pi n^2}{N}\right), \text{ when } N \text{ is even}$$
$$a_n = \exp\left(-j\frac{M\pi n(n+1)}{N}\right), \text{ when } N \text{ is odd}$$
[Equation 3]

In this example shown in Equation 3, "M" is set to "1" (where "M" is a natural number which is relatively prime to "N"), and a CAZAC (Constant Amplitude Zero Auto Correlation) sequence with the length of 1024 is generated and inserted. This CAZAC sequence has been disclosed in "Polyphase Codes with Good Periodic Correlation Properties" of Information Theory IEEE Transaction on, Vol. 18, Issue 4, pp. 531-532, on July 1972, proposed by David C. Chu.

In Equation 3, "n" is 0, 1, 2, . . . , N−1. Therefore, "N" corresponds to the sequence length or "equivalent sequence length". The reason why N can be denoted as equivalent sequence length is that, as stated above, the generated sequence can have different length from N in specific case. For example, the sequence may be generated by any alternative equation for preventing the sequence to have the DC component. Avoiding the sequence to have the DC component can be implemented by performing directly puncturing the DC component in the frequency domain, but, alternatively, the sequence can be generated by omitting one "n" value which corresponds to the DC component. In this case, the resultant sequence length can be "N−1", not "N". But, this is a special case, and normally "N" corresponds to the sequence length. And even in that special case, "N" corresponds to the substantial sequence length or sequence generation period.

Meanwhile, if the sequence length is pre-determined, the present invention may use any one of two equations shown in Equation 3 according to specific information indicating whether the corresponding sequence has an even number length or an odd number length.

As described above, a specific pattern available for this embodiment can be repeated, so that the CAZAC sequence may repeat the specific pattern by adjusting the N value. In other words, in Equation 3, under the condition that the "M" value is set to "1" and the "N" value is set to "512", the CAZAC sequence is generated and repeated two times, so that the sequence with the length of 1024 may be generated.

Figure 7:
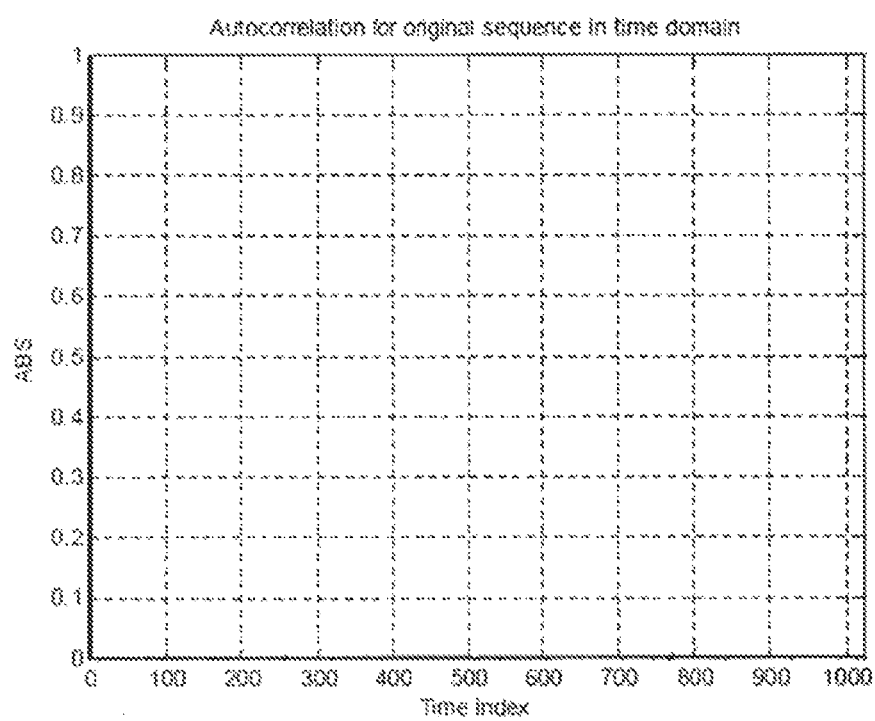
FIG. 7 shows auto-correlation characteristics of a CAZAC sequence according to the present invention.

FIG. 7 shows auto-correlation characteristics of the CAZAC sequence according to the present invention.

As described above, the sequence according to this embodiment may have superior correlation characteristics. It can be recognized that the auto-correlation characteristics of the time domain in association with the CAZAC sequence may have ideal auto-correlation characteristics, as shown in the FIG. 7. In conclusion, it can be recognized that the above-mentioned CAZAC sequence is an exemplary one of sequences satisfying various conditions required for this embodiment.

As an optional Step according to this embodiment, the step of mapping the time domain generated sequence to the frequency domain will hereinafter be described in detail.

According to a method for converting the time-domain sequence into the frequency-domains sequence according to a predetermined standard of the OFDM system, the N-point FFT process may be executed on the N-length sequence generated in the time domain as represented by the following equation 4, so that the N-length sequence can be converted into a frequency-domain sequence.

$$A_k = \sum_{n=0}^{N-1} a_n e^{-j2\pi kn/N}$$
[Equation 4]

In Equation 4, "k" is 0, 1, 2, . . . , N−1.

As described above, the time-domain sequence generated in the time domain can be converted into the frequency-domain sequence "$A_k$", as represented by the Equation 4. Also, for the embodiment for generating sequence in frequency domain, the frequency domain generated sequence need to be mapped to the frequency resource element by equivalent operation.

In the case of using the CAZAC sequence in this embodiment, it is preferable that the present invention may continuously map the generated sequence to a frequency-domain resource element, so that the system can maintain the CAZAC-sequence property which maintains predetermined-amplitude characteristics in the time domain (or in the frequency domain) when the sequence is mapped into the frequency domain resource.

In some embodiments of the present invention, the 2×-repetition sequence in the time domain is used, so that the resultant sequence is mapped to the frequency domain. In this case, each sequence component in the frequency domain is mapped to every two sub-carriers. It is assumed that the term "Continuous Mapping" in the present invention indicates that the sequence is mapped to a specific-number-th sub-carrier contained continuously in the frequency domain, and it includes mapping the sequence to every two sub-carriers continuously.

Step S105 for handling the DC sub-carrier and inserting the guard sub-carrier according to one embodiment of the present invention will hereinafter be described with reference to FIG. 6.

Generally, a specific OFDM communication method may request the handling of the DC sub-carrier and the insertion of a constant guard sub-carrier. If the DC sub-carrier and the guard sub-carrier must be inserted to satisfy the predetermined standard of the specific OFDM communication method, the above step S105 may be executed.

The above-mentioned handling DC frequency sub-carrier indicates that data "0" is inserted into the sub-carrier which has the frequency "0" in the frequency domain to solve the DC offset problem encountered in the RF unit of the transmission/reception unit. This operation is equivalent to puncturing the DC component.

Not only the above-mentioned method for inserting the data "0" into the sub-carrier having the frequency "0", but also other methods capable of acquiring the same effect can be used as necessary.

For example, the component to be mapped to the DC sub-carrier may be omitted in the sequence generation step S101, so that the resultant sequence having no mapping component may be generated. Thereafter, during the step S109 for converting the resultant sequence into the time-domain sequence, the sequence component corresponding to the DC sub-carrier may be omitted.

Therefore, provided that the component corresponding to the DC component having the frequency "0" in the frequency domain is removed from the signal transmitted to the time domain, and the sequence having no DC component is transmitted to a destination, a variety of methods can be made available.

Also, the guard sub-carrier insertion indicates that the guard sub-carriers may be inserted to reduce an Adjacent Channel Interference (ACI).

According to the present invention, when a corresponding signal is mapped to the sub-carrier of the frequency domain, the locations of sub-carriers of the corresponding signal may be arranged in reverse order as necessary. For example, the signal is circular-shifted as long as a distance of at least one sub-carrier, and then its mapping process is conducted.

The present invention may also include the random mapping process, however, it is preferable that the location in the frequency domain may not be changed to another location. The embodiment of the present invention will disclose that a specific case in which the frequency-domain location of the generated signal is not changed to another location.

Next, as an optional step, step S107 for applying the PAPR attenuation technique to the resultant sequence generated by the aforementioned steps according to the present invention will hereinafter be described in detail.

As described above, the time-domain signal is modified into another signal by the handling the DC and inserting the guard sub-carriers, so that the PAPR may increase.

This embodiment may perform again the PAPR attenuation technique to reduce the increased PAPR, however, this process is not always necessary for the present invention. In this way, during the PAPR attenuation technique, it is preferable that the embodiment may minimize the variation in amplitude level of the frequency-domain sequence codes, and at the same time may apply the PAPR attenuation technique to the frequency-domain sequence codes.

The resultant frequency-domain sequences are specific values pre-recognized by the transmission/reception end, so that they can also be used as reference signals for other usages (e.g., channel estimation).

According to the embodiment shown in FIG. 6, the step S109 for converting the above-mentioned sequence into the time-domain sequence by the IFFT operation will hereinafter be described.

The above step S109 is used to generate the final time-domain preamble sequence, and is conducted as represented by the following equation 5. In this case, the generated sequence may be used to perform the synchronization, detect signals, or discriminate among the signals.

$$a_n = \frac{1}{N}\sum_{n=0}^{N-1} A_k e^{j2\pi kn/N} \qquad \text{[Equation 5]}$$

It is preferable that a DC component is omitted from the frequency domain of the resultant signal converted into the time-domain signal at step S109. By doing so, time/frequency duality of CAZAC sequence can be maintained.

The above-mentioned embodiment has disclosed the above-mentioned method for generating the sequence in the time domain and converting the time-domain sequence into the frequency-domain sequence, however, it should be noted that the scope of the inventive sequence is not limited to only the above-mentioned sequence of the time-domain, and can also be applied to other examples. In other words, it is well known to those skilled in the art that the CAZAC sequence generated in the frequency domain (e.g., Zadoff-Chu sequence) may be directly mapped to the frequency-domain resource element.

Embodiment Based on Frank Sequence

A method for applying any one of the above-mentioned CAZAC sequences to the P-SCH of the 3GPP LTE system (hereinafter referred to as "LTE" according to the present invention will hereinafter be described.

In more detail, after repeating the frank sequence from among the CAZAC sequences in the time domain, this embodiment of the present invention may generate the P-SCH by processing data in the frequency domain, and a detailed description thereof will hereinafter be described.

The frank sequence is a representative example of the above-mentioned CAZAC sequences, and includes a constant amplitude (i.e., a constant envelop) in the time and frequency domains. The frank sequence has ideal auto-correlation characteristics, and a representative frank sequence has been disclosed in "Phase Shift Pulse Codes with Good Periodic Correlation Properties", IRE Trans. Inform. Theory, Vol. IT-8, pp. 381~382, on 1962, proposed by R. L. Frank and S. A. Zadoff.

In the meantime, if the P-SCH and the S-SCH are multiplexed according to the FDM scheme in the LTE system, a method for constructing the P-SCH using the frank sequence has been previously discussed by associated developers.

However, the inventive method proposed by the present invention multiplexes the P-SCH and the S-SCH according to the TDM scheme, and so that it implements an improved P-SCH superior to the conventional P-SCH.

Next, the comparison between the conventional P-SCH construction method and the inventive P-SCH construction method will hereinafter be described in detail.

The frank sequence can be represented by the following equation 6:

$$a_k = e^{\frac{-j2\pi r l_k}{m}}, \quad [\text{Equation 6}]$$
$$(k = 0, 1, \ldots, N - 1)$$

In Equation 6, $l_k$ is shown in the following equation 7:

$$l_k = \left[\frac{k}{m}\right] \cdot (k \bmod m + 1) \quad [\text{Equation 7}]$$

In Equations 6 and 7, "N" is indicative of the length of the frank sequence and must satisfy the condition of $N=m^2$. And, "r" is a natural number, which is relative prime to "m" and is less than the value of "m".

For example, if N=4, the sequences shown in Equation 6 have the constellation map such as the QPSK. If N=16, the above-mentioned sequences shown in Equation 6 have the constellation map such as the QPSK. If N16 and r=1, the generation of the frank sequence in the time domain is shown in the following Table 2, and the sequences converted into the frequency domain data are shown in the following Table 3:

TABLE 2

| | In phase | Quadrature |
|---|---|---|
| 0 | 0 | 1 |
| 1 | −1 | 0 |
| 2 | 0 | −1 |
| 3 | 1 | 0 |
| 4 | −1 | 0 |
| 5 | 1 | 0 |
| 6 | −1 | 0 |
| 7 | 1 | 0 |
| 8 | 0 | −1 |
| 9 | −1 | 0 |
| 10 | 0 | 1 |
| 11 | 1 | 0 |
| 12 | 1 | 0 |
| 13 | 1 | 0 |
| 14 | 1 | 0 |
| 15 | 1 | 0 |

TABLE 3

| | In phase | Quadrature |
|---|---|---|
| 0 | 1 | 0 |
| 1 | 0 | 1 |
| 2 | −sqrt(½) | sqrt(½) |
| 3 | −sqrt(½) | sqrt(½) |
| 4 | 0 | 1 |
| 5 | 0 | 1 |
| 6 | sqrt(½) | sqrt(½) |

TABLE 3-continued

| | In phase | Quadrature |
|---|---|---|
| 7 | sqrt(½) | −sqrt(½) |
| 8 | −1 | 0 |
| 9 | 0 | 1 |
| 10 | sqrt(½) | −sqrt(½) |
| 11 | −sqrt(½) | sqrt(½) |
| 12 | 0 | −1 |
| 13 | 0 | 1 |
| 14 | −sqrt(½) | −sqrt(½) |
| 15 | sqrt(½) | −sqrt(½) |

The result shown in Table 2 is equal to the QPSK modulation result, and the result of Table 3 has a constant amplitude.

For example, in the case of using the result of Table 3 on the condition that the number of actually-used sub-carriers is 16, the system is able to use the 16 sub-carriers, irrespective of the use or disuse of a scalable bandwidth.

When the timing acquisition is conducted according to the cross-correlation method in the time domain, if objective data is modulated into another data by the BPSK or M-PSK scheme, the complexity of calculating a correlation value becomes lowered. In this case, the BPSK or M-PSK scheme implements the phase rotation on the constellation map to involve desired information. In other words, the present invention calculates the correlation value based on a simple complex addition using a simple sign converter, instead of the complex operation, so that the complexity of calculation becomes lowered.

And, the frank sequence is indicative of the CAZAC sequence, so that it has superior correlation characteristics in all of the time and frequency domains.

The frank sequence has a constant value in all of the time and frequency domains, so that it has a low PAPR. If the frank sequence is used to perform channel estimation, the optimum condition is provided.

For example, if the signal vector "r" received from the time domain under N=16 and r=1 is represented by r=[r(0) r(1) . . . r(15)], the equation for calculating the correlation value between the signal vector "r" (r=[r(0) r(1) . . . r(15)]) and the well-known signal "a" (a=[a(0) a(1) . . . a(15)]$^H$) and the signal vector can be represented by the following equation 8:

$$R(d) = r \cdot a \quad [\text{Equation 8}]$$

In Equation 8, "a" is shown in the above Table 2.

If the R(d) value is directly calculated by the Equation 8, a total of 15 complex multiplications and a total of 15 complex additions are required to calculate a single value "R(d)".

However, due to unique properties of the frank sequence "a", the present invention may change a code of a real or imaginary part of a Rx signal to be multiplied to another code, and may perform the addition using the changed code to calculate the correlation value. Therefore, the present invention may finish the above-mentioned calculation using only the 15 complex additions other than the complex multiplication.

Typically, the complexity of a single complex multiplication operation is higher than that of the single complex addition operation by about 8 times.

The pre-proposed method configures the P-SCH using advantages of the frank sequence. In other words, there is proposed the FDM-based P-SCH mapped to 64 sub-carriers using the frank sequence with the length of 16.

Figure 8:
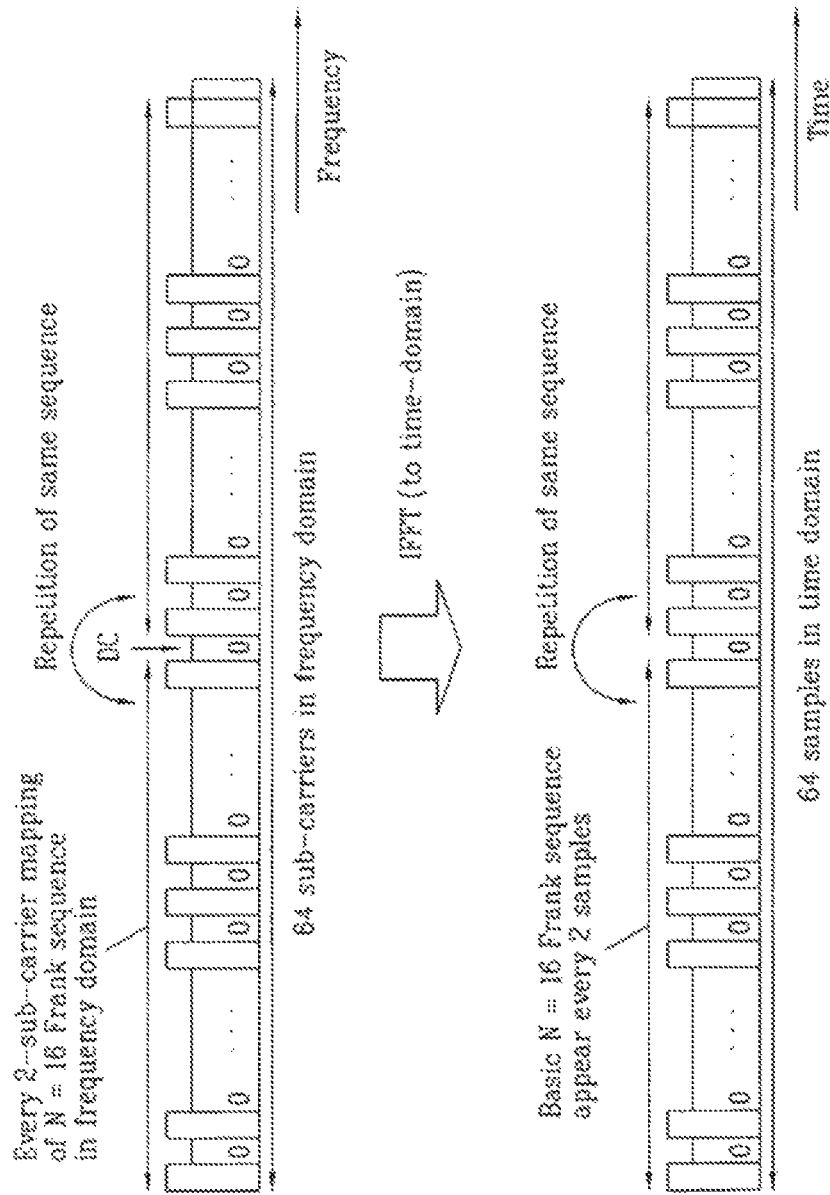
FIG. 8 is a conceptual diagram illustrating a method for constructing the P-SCH according to the present invention.

FIG. 8 is a conceptual diagram illustrating a method for constructing the P-SCH according to the present invention.

Referring to FIG. 8, the frank sequence with the length 16 is inserted into the frequency domain at intervals of 2 frequency indexes. In other words, the sequence of Table 3 is inserted in the frequency domain at intervals of two frequency indexes. In this case, the interval of two frequency indexes indicates that the m-th sequence is inserted into the k-th sub-carrier, no sequence is inserted into the (k+1)-th sub-carrier, and the (m+1)-th sequence is inserted into the (k+2)-th sub-carrier.

If the above-mentioned sequence inserted into the frequency domain at intervals of two frequency indexes is copied in the frequency domain and is then extended, the other sequence of FIG. 8 mapped to a total of 64 sub-carriers can be acquired. The sequence of FIG. 8 is inserted into the time domain at intervals of two samples, and is then repeated two times.

The present invention can improve the above-mentioned P-SCH construction method in the following aspects.

Firstly, the sequence based on the pre-proposed P-SCH construction method includes a specific value having the value "0" in the time domain, so that the PAPR characteristics are greatly deteriorated. The present invention can improve the deterioration of the PAPR characteristics.

The pre-proposed method inserts the sequence into the odd-th sub-carrier, instead of the even-th sub-carrier, to solve the problem caused by the DC carrier (i.e., the 0-th carrier). Namely, the pre-proposed method inserts data into the sub-carrier having the odd frequency-index.

In the case of observing the resultant sequence generated by the above-mentioned scheme in the time domain, the QPSK format under the time domain (i.e., the frank-sequence advantage) is unavoidably changed to another format, resulting in the occurrence of a fatal problem. Namely, the complexity of the complex operation increases, resulting in inconvenience of use. The present invention aims to solve the above-mentioned problem.

Figure 9:
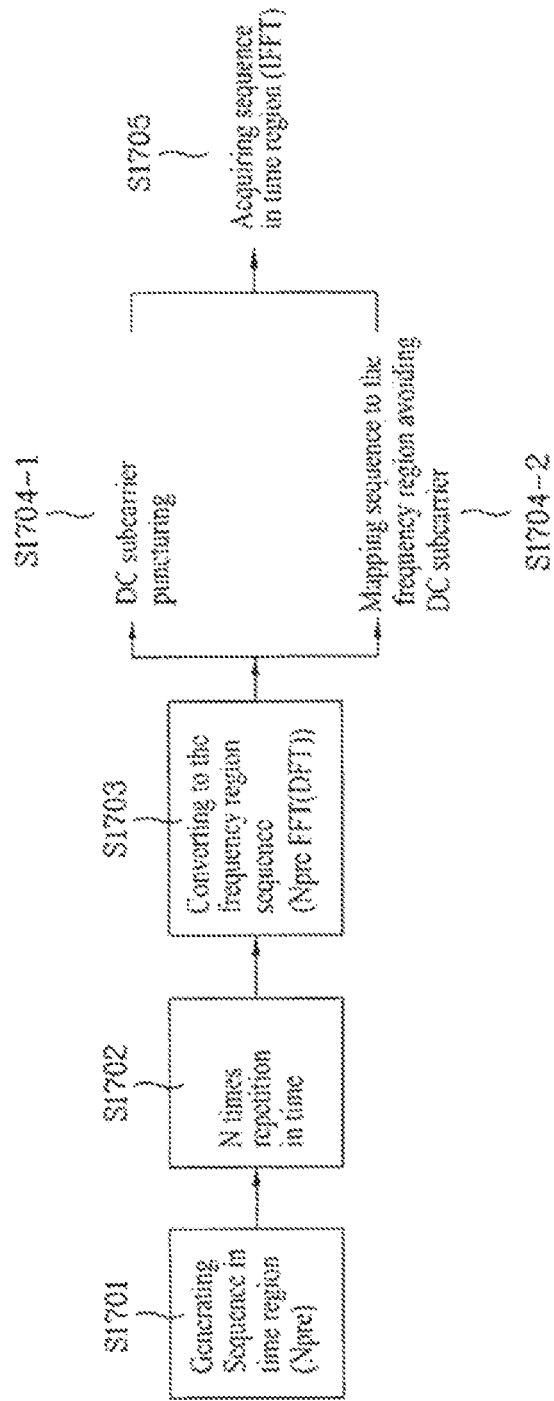
FIG. 9 is a flow chart illustrating a method for generating the P-SCH according to the present invention.

FIG. 9 is a flow chart illustrating a method for generating the P-SCH according to the present invention.

Steps S1701~S1705 of FIG. 9 will hereinafter be described with reference to other annexed drawings.

Figure 10:
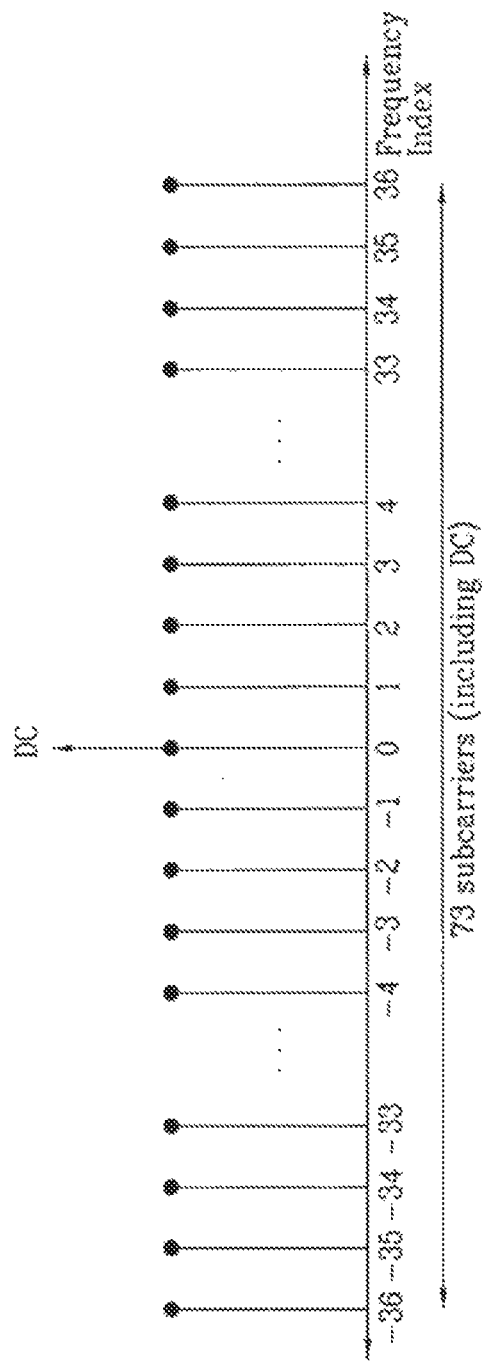
FIG. 10 is a conceptual diagram illustrating exemplary sub-carriers, each of which is mapped to the P-SCH based on the LTE standard, according to the present invention.

FIG. 10 is a conceptual diagram illustrating exemplary sub-carriers, each of which is mapped to the P-SCH based on the LTE standard.

The P-SCH based on the LTE standard is mapped to 73 sub-carriers (including the DC carrier) on the basis of the DC carrier.

This embodiment provides the 2×-repetition sequence structure in the time domain (i.e., the sequence is repeated two times in the time domain), so that it can generate 73 sub-carriers (including the DC carrier) requested by the LTE standard. Namely, the present invention provides the sequence having the 2×-repetition structure in the time domain.

After the DC sub-carriers have been processed, the system uses the frank sequence with the length of 71 (not shown in FIG. 10) from among the frank sequence with the length of 72).

In this case, it is preferable that the 2×-repetition sequence in the time domain may be set to the frank sequence. Preferably, the length of the frank sequence is set to 36, and the variable "r" of Equation 6 is set to "1". If the length of the frank sequence is set to 36, this frank sequence may have the constellation map such as the 6-PSK.

The reason why the length of the frank sequence is set to 36 is to construct an objective sequence to be mapped to the 73 sub-carriers. In other words, if the sequence is generated by two repetitions of the 36-length sequence, the resultant sequence can satisfy the LTE standard.

Needless to say, if the repetition format is not desired, the present invention may select another sequence with the length of 64 in association with the LTE system. If the P-SCH is generated by four repetitions of the sequence, the frank sequence with the length of 16 may also be used.

Step S1701 of FIG. 9 will hereinafter be described in detail.

Referring to FIG. 9, the frank sequence with the length of $N_{pre}=36$ is generated. In this case, "$N_{pre}$" is indicative of the length of an initial sequence generating the P-SCH. In this case, it is preferable that the variable "r" in Equation 6 is set to "1".

Figure 11:
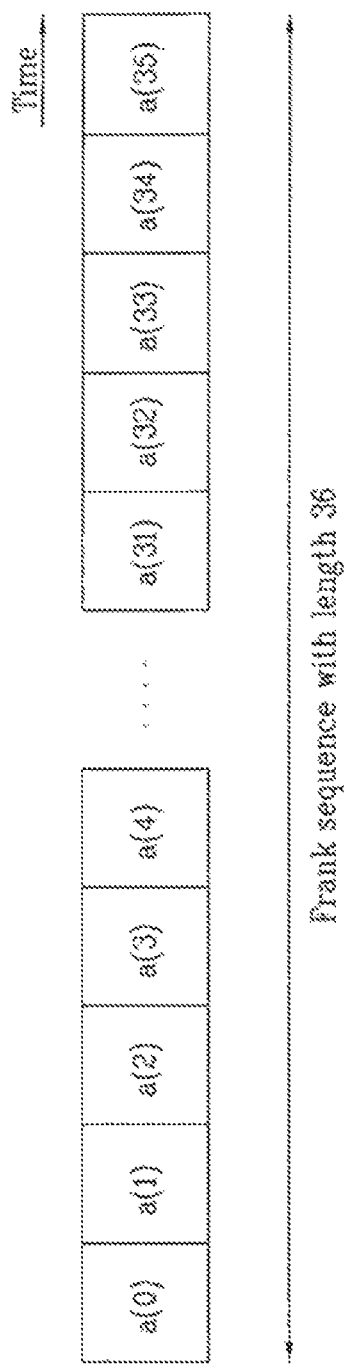
FIG. 11 is a block diagram illustrating a frank sequence with the length of 36 in a time domain according to the present invention.

FIG. 11 is a block diagram illustrating a frank sequence with the length of 36 in a time domain according to the present invention.

The sequence of FIG. 11 can be represented by a(i), i=0, 1, . . . , 35. The following Table 4 shows real-part values and imaginary-part values of the above value "a(i)".

TABLE 4

|   | Real | Imaginary |
|---|------|-----------|
| 0 | 1 | 0 |
| 1 | −cos(pi/3) | −sin(pi/3) |
| 2 | −1 | 0 |
| 3 | −cos(pi/3) | sin(pi/3) |
| 4 | cos(pi/3) | sin(pi/3) |
| 5 | 1 | 0 |
| 6 | cos(pi/3) | −sin(pi/3) |
| 7 | −cos(pi/3) | sin(pi/3) |
| 8 | 1 | 0 |

Next, Step S1702 will hereinafter be described in detail.

In the case of using the frank sequence with the length of 36, this sequence is repeated two times in the time domain, so that the resultant sequence is generated.

Figure 12:
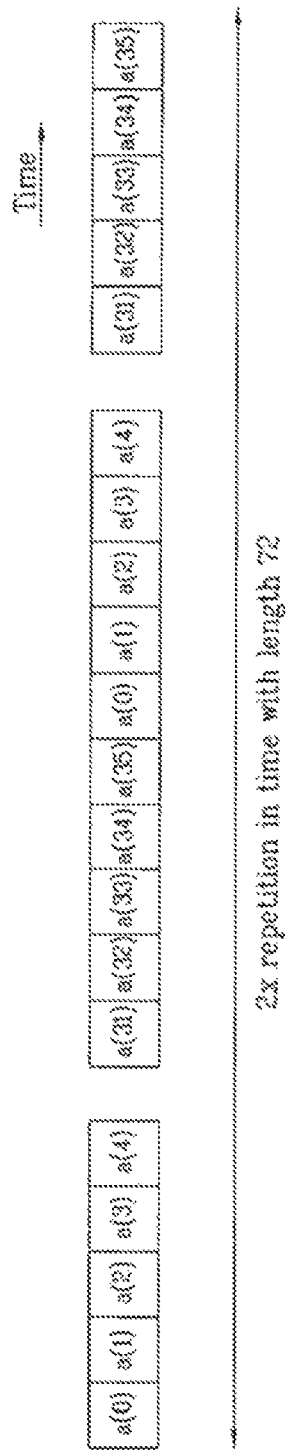
FIG. 12 is a block diagram illustrating the 2× repetition structure in a time domain so that the resultant sequence with the length of 72 is formed according to the present invention.

FIG. 12 is a block diagram illustrating the 2×-repetition sequence in the time domain so that the resultant sequence with the length of 72 is formed according to the present invention.

Some parts of the 2×-repetition signals of FIG. 12 are shown in the following table 5:

TABLE 5

|   | Real | Imaginary |
|---|------|-----------|
| 0 | 1 | 0 |
| 1 | −cos(pi/3) | −sin(pi/3) |
| 2 | −1 | 0 |
| 3 | −cos(pi/3) | sin(pi/3) |
| 4 | cos(pi/3) | sin(pi/3) |
| 5 | 1 | 0 |
| 6 | cos(pi/3) | −sin(pi/3) |
| 7 | −cos(pi/3) | sin(pi/3) |
| 8 | 1 | 0 |

The sequence values shown in Table 5 are indicative of time-domain values.

Next, Step S1703 will hereinafter be described in detail.

Figure 13:
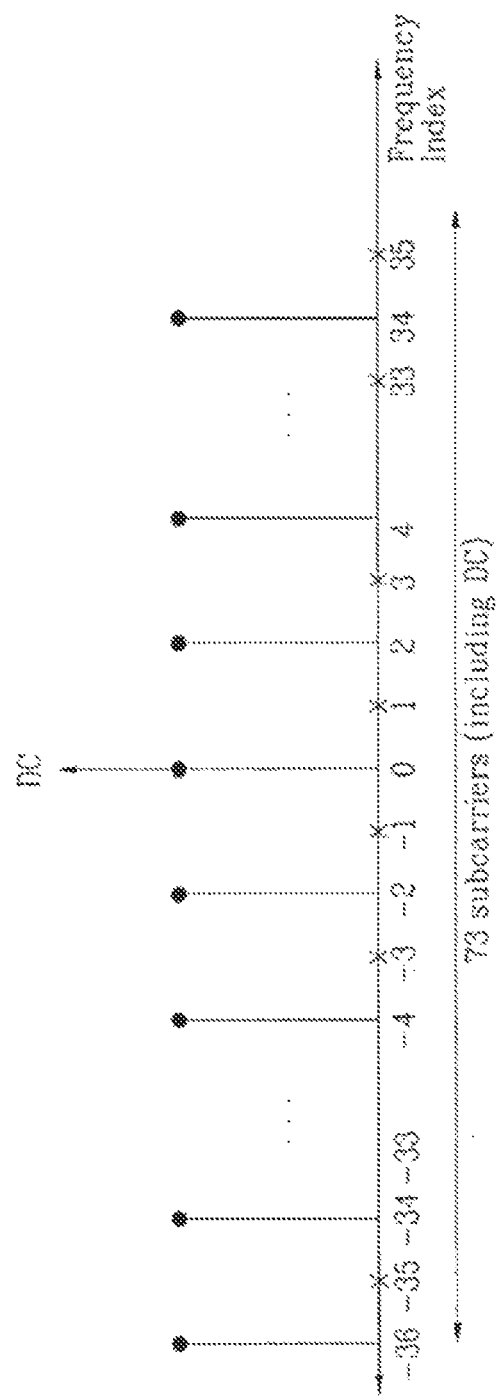
FIG. 13 shows the result of the step S1703 of FIG. 9 according to the present invention.

The frank sequence with the length of 72 (i.e., the 2×-repetition sequence in the time domain) generated at step S1702 is converted into a frequency-domain signal by the 72-point FFT or DFT conversion. In this case, from the viewpoint of the frequency domain, the 2× repetition is conducted in the time domain, so that it is considered that the alternated insertion from the even-th frequency index in the frequency domain has been conducted. Namely, the sequence is inserted into the even-th frequency index as shown in FIG. 13. FIG. 13 shows the result of the above step S1703 of FIG. 9.

Some parts of the sequence inserted into the even-th frequency index can be represented by the following Table 6:

TABLE 6

| | Real | Imaginary |
|---|---|---|
| 0 | Sqrt(2)*1 | 0 |
| 1 | 0 | 0 |
| 2 | Sqrt(2)*cos(pi/9) | Sqrt(2)*sin(pi/9) |
| 3 | 0 | 0 |
| 4 | Sqrt(2)*cos(3*pi/9) | Sqrt(2)*sin(3*pi/9) |
| 5 | 0 | 0 |
| 6 | −Sqrt(2)*cos(3*pi/9) | Sqrt(2)* sin(3*pi/9) |
| 7 | 0 | 0 |
| 8 | −Sqrt(2)* cos(pi/9) | −Sqrt(2)* sin(pi/9) |
| 9 | 0 | 0 |

Next, Step S1704 will hereinafter be described in detail.

This step S1704 is adapted to solve the problem caused by the DC sub-carriers. If the DC sub-carrier part of the communication standard to be used is not used (e.g., if the value of 0 is to be transmitted over the DC sub-carrier), it is preferable that the step S1704 may be performed.

The present invention provides two methods for solving the above-mentioned DC sub-carrier problem. For the convenience of description and better understanding of the present invention, the step S1704-1 will be firstly described in detail, and the step S1704-2 will be then described in detail.

The step S1704-1 is adapted to perform puncturing of a corresponding sequence located at the DC sub-carrier. In other words, the term "Puncturing" indicates that the corresponding sequence is nullification-processed with the value of "0".

Figure 14:
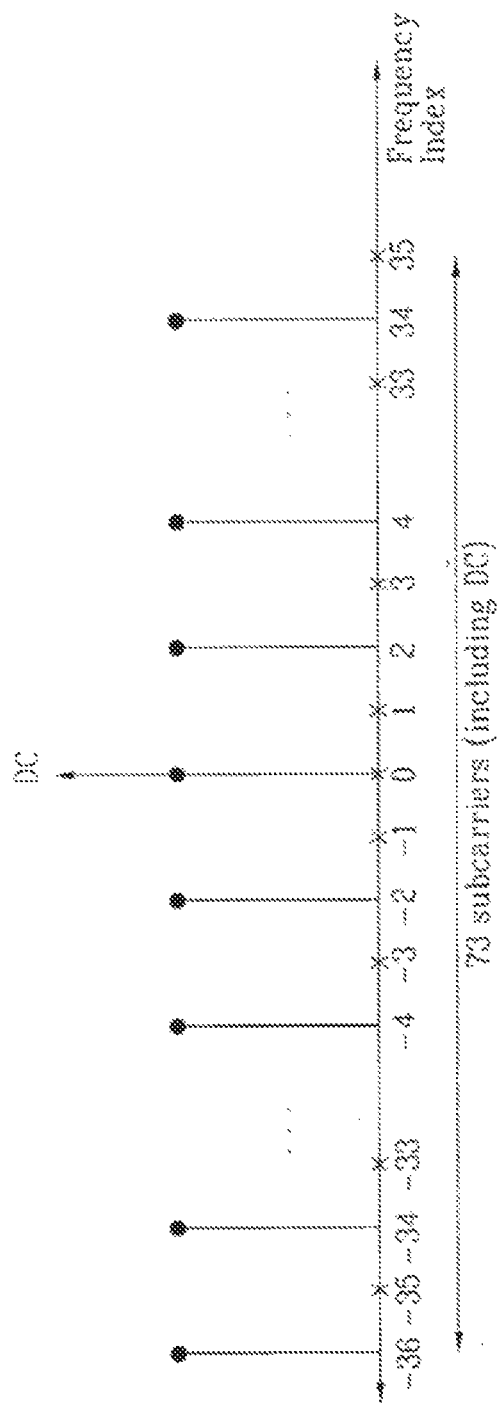
FIG. 14 shows the result of the step S1704-1 of FIG. 9 according to the present invention.

FIG. 14 shows the result of the step S1704-1.

If the step S1704-1 is conducted on the result of FIG. 13, the result of FIG. 14 can be acquired.

Some parts of the result of FIG. 14 can be represented by the following Table 7:

TABLE 7

| | Real | Imaginary |
|---|---|---|
| 0 | 0 | 0 |
| 1 | 0 | 0 |
| 2 | Sqrt(2)*cos(pi/9) | Sqrt(2)*sin(pi/9) |
| 3 | 0 | 0 |
| 4 | Sqrt(2)*cos(3*pi/9) | Sqrt(2)*sin(3*pi/9) |
| 5 | 0 | 0 |
| 6 | −Sqrt(2)*cos(3*pi/9) | Sqrt(2)* sin(3*pi/9) |
| 7 | 0 | 0 |
| 8 | −Sqrt(2)* cos(pi/9) | −Sqrt(2)* sin(pi/9) |

Next, Step S1704-2 will hereinafter be described.

The step S1704-2 is adapted to perform mapping of the corresponding sequence except for the DC sub-carrier.

The 2×-repetition sequence is made at the above step S1702. Therefore, the result of the step S1703 is configured in the form of a specific sequence, which is inserted into the frequency domain at intervals of two frequency indexes. In other words, it should be noted that the sequence is inserted into the even-th frequency index.

In this case, the present invention performs the step S1704-2, so that the generated sequence is CS (Circular Shift)-processed to the right or left side.

Figure 15:
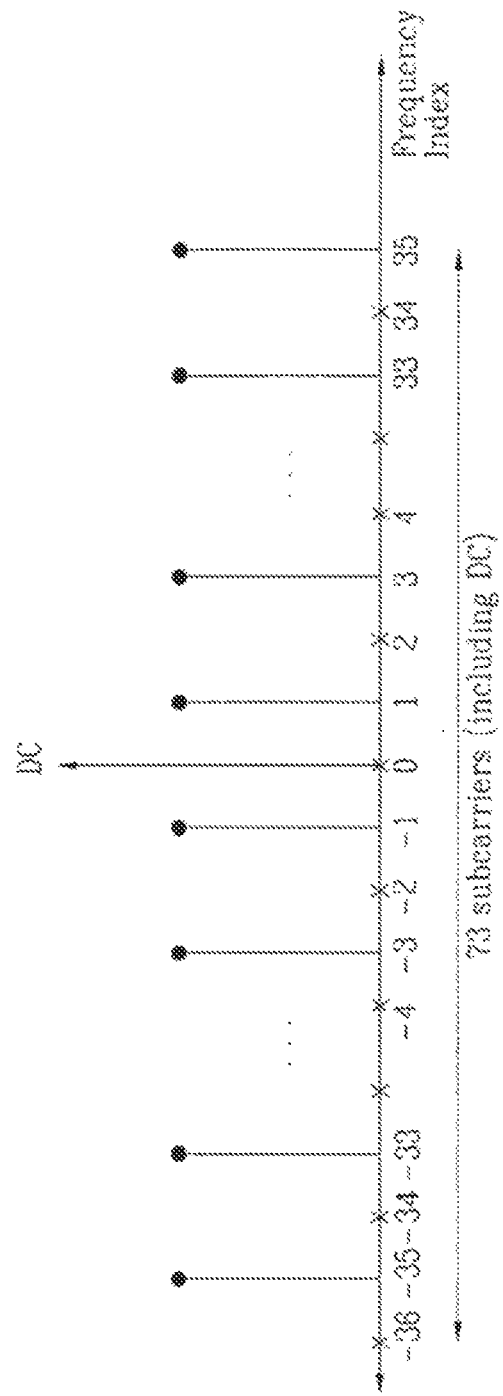
FIG. 15 shows the result of the circular shift to the right of the result of FIG. 13 according to the present invention.

FIG. 15 shows the CS-result to the right side of the result of FIG. 13 according to the present invention. Some parts of the result of FIG. 15 can be represented by the following Table 8:

TABLE 8

| | Real | Imaginary |
|---|---|---|
| 0 | 0 | 0 |
| 1 | Sqrt(2)*1 | 0 |
| 2 | 0 | 0 |
| 3 | Sqrt(2)*cos(pi/9) | Sqrt(2)*sin(pi/9) |
| 4 | 0 | 0 |
| 5 | Sqrt(2)*cos(3*pi/9) | Sqrt(2)*sin(3*pi/9) |
| 6 | 0 | 0 |
| 7 | −Sqrt(2)*cos(3*pi/9) | Sqrt(2)* sin(3*pi/9) |
| 8 | 0 | 0 |

If the above step S1704-1 is compared with the other step S1704-2, it can be recognized that the step S1704-1 is more preferable than the step S1704-2.

The step S1704-1 may easily calculate the correlation value using the known signals of Table 5. A detailed method for calculating the correlation value will hereinafter be described.

Since the sequence is inserted into the odd-th index at step S1704-2, the time-domain sequence value is changed to another, so that the present invention has difficulty in calculating the correlation value using the simple calculation due to the changed sequence value.

Needless to say, the reception end moves the carrier frequency from a current location to another location by the sub-carrier spacing between sub-carriers, and may receive the resultant signal. However, the first sub-carrier is used as the DC component, so that it may unavoidably encounter the DC offset. As a result, the step S1704-1 is superior to the step S1704-2 in the light of the DC offset problem. Needless to say, the multiplication of a specific complex number is performed in the time domain after the above-mentioned reception action, and the frequency shift may then be conducted. However, if the multiplication of the specific complex number is adapted to calculate the simple correlation value, the efficiency may be excessively deteriorated.

Next, Step S1705 will hereinafter be described. The step S1705 is used as an additional step for a specific case in which the reception end does not perform the down-sampling and is applied to the 128-point FFT process.

The above step S1705 may be effectively used when the reception end does not support the down-sampling function.

For example, the sub-carrier spacing between the sub-carriers of the LTE system is 15 kHz. If the 128-point FFT (or the 128-point DFT) is applied to the LTE system, 128 sample values occur in the time domain, and the 128 sample values may have the sampling frequency of 1.92 MHz. The reception end filters the Rx signal (i.e., the received signal) at the frequency of 1.08 MHz, and may select any one of the following operations (i.e., first and second operations).

According to the first operation, the reception end uses the sampling frequency of 1.92 MHz without any change. According to the second operation, the reception end performs the down-sampling using the sampling frequency of 1.08 MHz, and uses the down-sampling result.

The step S1705 is used as an additional step for a specific case in which the reception end does not perform the down-sampling process and employs the sampling frequency of 1.92 MHz without any change.

If the up-sampling process is required, the step S1705 performs the up-sampling of the sequence generated at the frequency 1.08 MHz (corresponding to 72 samples), so that the sequence with the frequency 1.08 MHz is up-sampling-processed to another frequency of 1.92 MHz. The digital sampling method basically inserts the value of "0" into 56 sub-carriers (56=128-72), and performs the 128-point IFFT process on the above zero-padding result.

A detailed sampling technique has been well known to those skilled in the art, so that a detailed description thereof will be omitted. For reference, the sequence of Table 7 or 8 should be used in a corresponding band (i.e., the band of 1.08 MHz) during the transmission process.

Operations of the reception end having received the P-SCH sequence will hereinafter be described in detail. The cross-correlation method for use in the reception end will hereinafter be described.

The above-mentioned example shows the 2x-repetition structure in the time domain. So, a predetermined range of the Rx signal is decided according to the auto-correlation scheme, and then the cross-correlation scheme is applied to the decided range, so that the fine synchronization acquisition process can be conducted.

The method for determining a predetermined range of the Rx signal repeated by the auto-correlation scheme is identical with the conventional method for use in the conventional art. So, a method for reducing the number of calculations according to the cross-correlation scheme will hereinafter be described.

The timing acquisition method based on the cross-correlation scheme can be represented by the following equation 9:

$$\hat{d} = \underset{d}{\operatorname{argmax}}\{R(d) \mid 0 \le d \le N_f - 1\} \quad \text{[Equation 9]}$$

$$R(d) = \left( \frac{\left| \sum_{m=0}^{M-1} \left| \sum_{n=mL}^{(m+1)L-1} p^*(n) r(d+n) \right|^2 \right|}{\sum_{n=0}^{N_{ff}/2-1} |r(d+n)|^2} \right) +$$

$$\left( \frac{\left| \sum_{m=0}^{M-1} \left| \sum_{n=mL}^{(m+1)L-1} p^*\left(\frac{N_{ff}}{2}+n\right) r\left(\frac{N_{ff}}{2}+d+n\right) \right|^2 \right|}{\sum_{n=0}^{N_{ff}/2-1} \left| r\left(\frac{N_{ff}}{2}+d+n\right) \right|^2} \right)$$

$$\left( \frac{N_{ff}}{2} = ML \right)$$

In Equation 9, p(n) is indicative of the known P-SCH sequence value in the time domain, r(n) is indicative of the Rx signal, M is indicative of the "M" value for the partial correlation method, $N_{ff}$ is the FFT magnitude, and $\hat{d}$ is indicative of the detected timing acquisition location.

If the P-SCH has no repetition format, and a maximum value of the frequency offset at the frequency band of 2 GHz is 5 ppm, the system may have the sufficient performances under M=1 of Equation 9. Therefore, there is no need for the present invention to apply the partial correlation method to the repeated interval.

Based on Equation 9, the LTE system performs the down-sampling (i.e., 72 samples) of the Rx signal using the sampling frequency of 1.08 MHz, and the P-SCH has two symbols within the term of 10 ms.

So, if the time synchronization is acquired by the averaging of the 5 ms term, the calculation complexity for the timing acquisition can be represented by the following equation 10:

(72 complex multiplications+72 complex additions+2 complex power-calculations)*9600      [Equation 10]

In order to explain the method for calculating the correlation value according to the present invention, the frank sequence shown in Table 4 will be described as an example.

If the Rx signal is denoted by r=[r(0) r(1) r(2), ..., r(35)], the method for calculating the Rx signal and the correlation value of Table 4 can be conducted by the following parallel process.

Firstly, the real value can be conducted as represented by the following equation 11, and the imaginary value can be conducted as represented by the following equation 12:

Real value: Real[r(0)]−Real[r(2)]+Real[r(5)]+Real[r(8)]+Real[r(11)]+Real[r(13)]−Real[r(14)]+Real[r(15)]−Real[r(16)]+Real[r(17)]−Real[r(18)]+Real[r(20)]+Real[r(23)]−Real[r(26)]+Real[r(29)]+Real[r(31)]+Real[r(32)]+Real[r(33)]+Real[r(34)]+Real[r(35)]+cos(pi/3)*{−Real[r(1)]−Real[r(3)]+Real[r(4)]+Real[r(6)]−Real[r(7)]−Real[r(9)]−Real[r(10)]−Real[r(12)]−Real[r(19)]−Real[r(21)]−Real[r(22)]−Real[r(24)]−Real[r(25)]−Real[r(27)]+Real[r(28)]+Real[r(30)]}+sin(pi/3)*{−Imag[r(1)]+Imag[r(3)]+Imag[r(4)]−Imag[r(6)]+Imag[r(7)]−Imag[r(9)]+Imag[r(10)]−Imag[r(12)]−Imag[r(19)]+Imag[r(21)]−Imag[r(22)]+Imag[r(24)]+Imag[r(25)]−Imag[r(27)]−Imag[r(28)]+Imag[r(30)]}    [Equation 11]

Imaginary value: Imag[r(0)]−Imag[r(2)]+Imag[r(5)]+Imag[r(8)]+Imag[r(11)]+Imag[r(13)]−Imag[r(14)]+Imag[r(15)]−Imag[r(16)]+Imag[r(17)]−Imag[r(18)]+Imag[r(20)]+Imag[r(23)]−Imag[r(26)]+Imag[r(29)]+Imag[r(31)]+Imag[r(32)]+Imag[r(33)]+Imag[r(34)]+Imag[r(35)]+cos(pi/3)*{−Imag[r(1)]−Imag[r(3)]+Imag[r(4)]+Imag[r(6)]−Imag[r(7)]−Imag[r(9)]−Imag[r(10)]−Imag[r(12)]−Imag[r(19)]−Imag[r(21)]−Imag[r(22)]−Imag[r(24)]−Imag[r(25)]−Imag[r(27)]+Imag[r(28)]+Imag[r(30)]}−sin(pi/3)*{−Real[r(1)]+Real[r(3)]+Real[r(4)]−Real[r(6)]+Real[r(7)]−Real[r(9)]+Real[r(10)]−Real[r(12)]−Real[r(19)]+Real[r(21)]−Real[r(22)]+Real[r(24)]+Real[r(25)]−Real[r(27)]−Real[r(28)]+Real[r(30)]}    [Equation 12]

In the case of expressing the complexity of Equations 11 and 12, the following equation 13 can be acquired:

((52*2) real additions+(2*2) real multiplications)*9600=(104 real additions+4 real multiplications)*9600     [Equation 13]

In the case of comparing the Equation 13 with the Equation 10, there is a large difference in complexity between the Equation 13 and the Equation 10.

Also, since the value "cos(pi/3)" is "½" (i.e., cos(pi/3)=½), this value "cos(pi/3)=½" corresponds to the 1-bit shift of the hardware implementation, so that this value can be negligible in light of the number of calculations. In this case, the number of calculations can be represented by the following equation 14:

((51*2) real additions+(1*2) real multiplications)*9600=(102 real additions+2 real multiplications)*9600     [Equation 14]

Also, the value of "sin(pi/3)" is equal to sqrt(3)/2 or 0.8660 (i.e., sin(pi/3)=sqrt(3)/2=0.8660), so that the number of calculations approximates 0.75(=½+¼). In this case, the approximated result can be implemented with the bit shift.

So, if the number of calculations is ignored, the complexity becomes lowered as represented by the following equation 15:

$$((51*2) \text{ real additions} + (1*2) \text{ real additions}) * 9600 = \quad \text{[Equation 15]}$$
$$(102 \text{ real additions}) * 9600$$

In the meantime, the positive mark (+) or the negative mark (−) can be easily implemented by the code inverter, so that these marks are not contained in the number of calculations.

The above-mentioned example is repeated two times in the time domain, so that the P-SCH is configured. However, the detailed numerals have been disclosed for only illustrative purposes of the present invention, so that the scope of the present invention is not limited to the above-mentioned detailed numerals and can also be applied to other examples.

For example, the initial sequence may be set to the frank sequence with the length of 16. In other words, the frank sequence with the length of 16 is generated at step S1701. The frank sequence with the length of 16 is repeated four times in the time domain at step S1702. The frank sequence is converted into the frequency-domain sequence by the 64 FFT at step S1703. In this case, the sequence is inserted in the frequency domain at intervals of four frequency indexes.

At step 1704, the present invention may perform the puncturing process at the DC-carrier location, or may perform the sequence insertion simultaneously while avoiding the DC carrier. Thereafter, the sequence is converted into the time-domain signal, and the step S1705 may be executed as necessary.

In the case of using the above-mentioned basic embodiments of the present invention and applying the embodiments to the frank sequence, it is preferable that all the generated sequences may be generated using the selected index under the condition the above-mentioned conjugate symmetry property is satisfied.

In the case of selecting the sequence by selecting an index from among the index set satisfying the conjugate symmetry property, the number of calculations can be greatly reduced in the reception end which detects the signal using the cross-correlation.

The following description relates to a specific case in which a communication system based on the above-mentioned correlation technique generates/uses the sequence as described above.

Aspect for Use in Communication System Based on Correlation Technique

For the convenience of description, the following description will be based on the frequency-synchronization sequence or the time-synchronization sequence (e.g., the Primary Synchronization Code (PSC) for the P-SCH), the sequences proposed by individual embodiments of the present invention may be applied to an uplink preamble transmission channel (e.g., RACH), any other downlink synchronous channel, a signaling, a control channel, and ACK/NACK communication fields.

Typically, a correlation metric component of the calculation procedure for acquiring the time synchronization includes a delay component, as represented by (R(d)).

However, if the time synchronization is not acquired, the correlation metric caused by the delay component is not required.

If the concept of the present invention is applied to a time-synchronous channel, the delay component (d) must be considered. Otherwise, if the concept of the present invention is applied to other channel irrelevant to the time synchronization, there is no need to consider the delay component (d).

Next, considering the above-mentioned delay component (d), there are proposed a variety of equations. However, it is obvious to those skilled in the art that the proposed equations can be equally applied to the other case having no delay component (i.e., d=0). So, the case having no delay component will be omitted for the convenience of description.

Next, a method for generating/using at least one sequence from among multiple sequences will hereinafter be described, so that the generated sequence is used as the frequency- and time-synchronization sequence. Namely, the above-mentioned sequence generation method does not use a common sequence with a single cell, but selects a specific sequence from among multiple predetermined sequences and uses the selected sequence.

The sequence for the frequency and time synchronization within the cell may be called a primary sequence code (PSC).

For example, if the P-SCH is designed using a single common sequence within a single cell, it is determined that the cell common PSC is applied to this P-SCH. Otherwise, if the P-SCH is designed using one of multiple sequences within a single cell, it is determined that a specific PSC is selected from among multiple PSCs.

The present invention provides a method for generating sequence from among multiple available sequences so that the reception end can calculate correlation values between received signal and each of the multiple sequences using only one correlation operation.

If the P-SCH is designed using the frank sequence of Equation 6, the sequence with the length of 16 and the other sequence with the length of 36 may be used. In this case, if the length N is "16", the variable "m" of Equation 6 is "4", so that two kinds of frank sequences are used. Also, if the length N is "36", the variable "m" of Equation 6 is "6", so that two kinds of sequences are used. In this case, the present invention may not support three or more PSCs, resulting in the occurrence of a serious problem.

The present invention provides a method for generating the synchronization-channel sequence available for a variety of communication systems, but this method can support a variety of synchronization channels under the single cell.

There is no limitation in types of the above-mentioned various communication systems. For the convenience of description, the present invention will be described on the basis of the LTE system.

This embodiment will explain the Zadoff-Chu sequence by referring to the following equation 16, so that it can propose a method for generating a plurality of PSCs. The Zadoff-Chu sequence has already been disclosed in Equation 3.

$$a^m(k) = \begin{cases} \exp\left(-\dfrac{jm\pi k^2}{L}\right), & \text{when } L \text{ is even} \\ \exp\left(-\dfrac{jm\pi k(k+1)}{L}\right), & \text{when } L \text{ is odd} \end{cases} \quad \text{[Equation 16]}$$

$$k = 0, 1, \ldots, L-1$$

In Equation 16, "m" is a natural number of less than "L" and is relatively prime to "L". For example, if L=8, "m" is set to 1, 3, 5, and 7.

This embodiment provides a method for generating a sequence from among a plurality of available sequences using the Zadoff-Chu sequence. Preferably, the synchronous channel generated by the sequence according to the present invention may follow the structure of FIG. 10.

Figure 16:
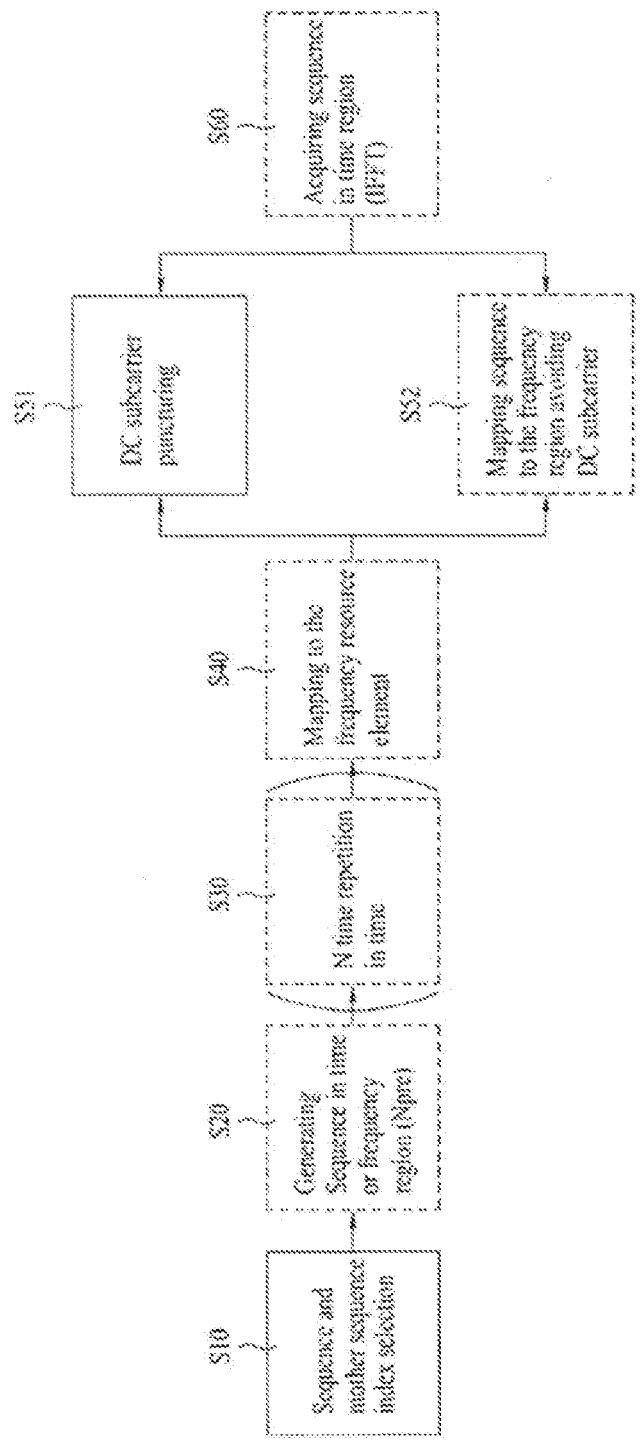
FIG. 16 is a conceptual diagram illustrating a sequence generation method according to the present invention.

The sequence according to this embodiment may be generated by the procedure of FIG. 16. FIG. 16 is a conceptual diagram illustrating an exemplary sequence generation method according to the present invention.

Referring to FIG. 16, the sequence generation method effectively selects a sequence index from among a plurality of sequence indexes (or the index set) to generate a sequence at step S10. If sequence index is selected, the sequence generation method generates the sequence in the time or frequency domain according to the selected index at step S20. In this case, the sequence may be repeated N times in the time domain at step S30, but this step can be omitted.

The generated sequence may be mapped to the frequency resource element at step S40. A data process for removing the DC component from the frequency domain may be executed at step S51 or S52.

If the data process for removing the DC component is executed, the data process for converting the sequence into the time-domain sequence is conducted at step S60.

According to this embodiment of the present invention, a variety of methods other than the above-mentioned methods may also be used to remove the DC component. According to the present invention, under the condition that a specific component corresponding to the part having the frequency "0" may be omitted from the frequency domain of a corresponding sequence during the time-domain transmission, the present invention may use an arbitrary method for satisfying the above-mentioned condition.

Next, individual steps will hereinafter be described in detail.

The step S10 for effectively selecting a sequence index from among the plurality of sequence indexes (or the index set) will be described in detail. In the step S10, the sequence index set may comprise the one mother sequence index or the root index, and the remaining sequence indexes. In more detail, if the reception end aims the timing acquisition, it is preferable that the one root index and the remaining sequence indexed satisfy the condition that the cross-correlation value can be calculated with less number of calculations by the reception end. So, this embodiment propose the root index set to have the one root sequence index and the remaining sequence indexes meet the above condition.

Meanwhile, the number of PSCs available in the cell may be determined in various ways. For example, a specific case in which the P-SCH is configured using one of 4 PSCs will hereinafter be described. If 3 PSCs are required only, and 4 PSCs are available, then 3 PSCs from among the 4 PSCs may also be used as necessary.

This embodiment may prepare 3 root indexes to employ the 3 PSCs, so that the index to be generated from among the prepared root indexes may be selected.

Next, the method for generating the sequence using the Zadoff-Chu sequence with the length "36" or "32" will hereinafter be described. In this case, a method for generating the P-SCH by repeating the sequence two times will hereinafter be described.

The Zadoff-Chu sequence with the length 36 or 32 may be generated by Equation 16.

If the length (L) is 36 as denoted by Equation 16, the value "m" indicating the sequence index is 1, 5, 7, 11, 13, 17, 19, 23, 25, 29, 31, 33, and 35. If the length (L) is 32, the value "m" indicating the sequence index is 1, 3, 5, 7, 9, 11, 13, 15, 17, 19, 21, 23, 25, 27, 29, and 31.

If the length (L) is 36, one of the values 1, 5, 7, 11, 13, 17, 19, 23, 25, 29, 31, 33, and 35 is determined to be a mother sequence index. If the length (L) is 32, one of the values 1, 3, 5, 7, 9, 11, 13, 15, 17, 19, 21, 23, 25, 27, 29, and 31 is set to the mother sequence index. For the convenience of description, the mother sequence index is denoted by "$m_o$", and the remaining sequence indexes are denoted by "$m_i$".

In order to satisfy the conjugate symmetry property between the mother sequence index "$m_o$" and the remaining sequence index "$m_i$", it is preferable that the relationship of Equation 17 may be established.

$$m_o + m_i = \tfrac{1}{2} \times P_L \times n$$

or $$m_o - m_i = \pm \tfrac{1}{2} \times P_L \times n \qquad \text{[Equation 17]}$$

n=1, 2, 3, . . .

In Equation 17, "$P_L$" is indicative of a value corresponding to a single period equal to 2*pi in a polyphase sequence. Typically, the value of a denominator of the phase component in the sequence generation equation corresponds to the value equal to a single period.

In other words, in the case of the polyphase sequence, the above-mentioned conjugate symmetry property is relevant to an integer multiple of the half of the sequence generation period in the sequence generation equation.

If the "k" value corresponding to the part having the frequency "0" is omitted from several "k" values shown in Equation 16, and then the sequence is generated, the period of the generated sequence is shorter than a normal period by the value "1", and the sequence length (L') is shorter than the sequence length (L) by the value "1". As a result, during the sequence generation, the part having the frequency "0" is omitted from the frequency domain, and then the sequence is generated.

In order to select the root index maintaining the conjugate symmetry property while the above-mentioned process is conducted, the sum of indexes or the difference between the indexes may correspond to an integer multiple of L/2 in association with the L value instead of the L' value. Therefore, provided that the sum of root indexes corresponds to an integer value associated with the half of the period or sequence length, this means that a sequence generation period or the sequence length (L) provided when a normal sequence generation equation is used.

In the meantime, the following equations 18 and 19 show the application examples of Equation 17.

$$m_o + m_i = \tfrac{1}{2} \times \sqrt{L} \times n$$

or $$m_o - m_i = \pm \tfrac{1}{2} \times \sqrt{L} \times n \qquad \text{[Equation 18]}$$

n=1, 2, 3, . . .

As shown in Equation 16, the value corresponding to a single period in the Zadoff-Chu sequence is equal to the sequence length L. Therefore, the generation period of Equation 18 is equal to "L". If the same method is applied to the frank sequence, Equation 20 can be acquired. In the meantime, the value corresponding to a single period is set to $\sqrt{L}$.

As shown in Equation 18, if the mother sequence index ($m_o$) and the remaining sequence index ($m_i$) are decided, the reception end can easily calculate the cross-correlation value.

For example, if a single value "$m_o$" and three values ($m_1$, $m_2$, and $m_3$) are selected and then the sequence is generated, the reception end must calculate the cross-correlation value using four sequences. Namely, after receiving an unknown signal, the reception end calculates each of the cross-correlation values among the $m_o$, $m_1$, $m_2$, and $m_3$ sequences stored in the reception end, and must determine whether the unknown signal is the $m_o$ sequence, the $m_1$ sequence, the $m_2$ sequence, or the $m_3$ sequence using the calculated cross-correlation values.

However, if at least one of the sequences satisfying the conjugate symmetry property is received, the present invention calculates the cross-correlation amplitude of the selected one of the sequences $m_o\sim m_3$, so that the cross-correlation amplitudes f the remaining sequences are determined. The detailed operations of the reception end will be described later with reference to other embodiments.

For example, if the sequence length L is 32, the mother sequence index may be set to "1". In this case, if "1" is substituted into the $m_0$ value of a first expression of Equation 18, and "32" is substituted into the "L" value, the $m_1$ value is equal to "15". If "1" is substituted into the $m_0$ value of a second expression of Equation 18, and "32" is substituted into the "L" value, the $m_2$ value is equal to "17". If the $m_1$ and L values are substituted into the first expression of Equation 18, the $m_3$ value is equal to "31". In this case, the $m_0$, $m_1$, $m_2$, and $m_3$ value may be determined to be a single index group.

In brief, if a single mother sequence index is decided, its associated index group may also be decided.

If the length is set to 32, the values $m_0=3$, $m_1=13$, $m_2=19$, and $m_3=29$ may be determined to be a single index group. Needless to say, other sets can also be made available. If 8 sequences are used, the present invention needs to select only two groups using the same method.

If the sequence length L is 36, the values $m_0=1$, $m_1=17$, $m_2=19$, and $m_3=35$ may be determined to be a single index group. Also, the values $m_0=5$, $m_1=13$, $m_2=23$, and $m_3=31$ may be determined to be a single index group.

If the L value is denoted by a prime number (i.e., L=37), the values $m_0=1$ and $m_1=36$ are determined to be a single group or the other values $m_0=3$ and $m_1=16$ may be determined to be a single group.

If the L value is an odd number, Equation 18 can be simplified as represented by the following Equation 19:

$$m_o+m_i=L \quad \text{[Equation 19]}$$

If sequences corresponding to the sequence indexes selected by Equation 19 are used, all the correlation operations can be completed by a single correlation operation in the same manner as in Equation 19.

Equation 19 corresponds to the subset of Equations 17 and 18.

The selected sequences according to the present invention may be Zadoff-Chu sequences, all the CAZAC sequences, or polyphase sequences composed of an exponential function. For example, the selected sequences may be frank sequences. However, if the selected sequences are determined to be the frank sequences, Equations 18 and 19 are modified into the following equation 21.

The following equations 20 and 21 may also correspond to the subset of Equation 17.

$$m_o+m_i=\tfrac{1}{2}\times\sqrt{L}\times n$$

or $$m_o-m_i=\pm\tfrac{1}{2}\times L\times n \quad \text{[Equation 20]}$$

$n=1, 2, 3, \ldots$ $$m_o+m_i=\sqrt{L} \quad \text{[Equation 21]}$$

The sequences selected by this embodiment may be truncated Zadoff-Chu sequences as necessary. In the case of generating the Zadoff-Chu sequence, the sequence length is set to a prime number, many more sequences can be acquired. In this case, some bits are truncated, so that the truncated Zadoff-Chu sequence may be configured. For example, if the length L is discarded after the sequence with the length 36 is generated, the sequence with the length 36 can be generated.

As can be seen from Equation 19, two sequence index groups processed once may be generated. For example, if the Zadoff-Chu sequence with the length 37 is provided, the index group or the index set may be set to either one of (1-36), (2-35), (3-34), (4-33), (5-32), (6-31), (7-30), (8-29), (9-28), (10-27), (11-26), (12-25), (13-24), (14-23), (15-22), (16-21), (17-20), and (18-19).

Since the equation 19 is a specialized format of Equation 18, the sequence indexes satisfying Equation 19 correspond to the other sequence indexes satisfying Equation 18.

As described above, all the sequence indexes may be selected according to Equation 17, or may also be selected by other methods. For example, some sequence indexes are selected by Equation 17, and either one of the selected sequence indexes is CS (Circular Shift)—processed by a predetermined amplitude, so that a new sequence may be selected according to the CS-processed result.

For example, the sequence indexes "1" and "31", each of which has the length 32, are selected. In this case, the sequence corresponding to the sequence index "1" or "31" may be CS-processed by the half of the sequence length, so that a new sequence can be selected according to the CS-processed result. In other words, the sequence with the length 32 corresponding to the sequence index "1" or "31" is CS-processed by "16", so that a new third sequence can be selected according to the 16-CS-processed result.

It should be noted that the above-mentioned numerical values have been disclosed for only illustrative purposes, so that the concept of the present invention is not limited to only the above-mentioned numerical values, and can also be applied to other examples as necessary.

For the convenience of description, an exemplary case in which the sequence length L is set to 32 or 36 will hereinafter be described.

If the length is set to 32, an exemplary case in which the values $m_0=1$, $m_1=15$, $m_2=17$, and $m_3=31$ are set to a single index group will be described. If the length is set to 36, an exemplary case in which the values $m_0=1$, $m_1=17$, $m_2=19$, and $m_3=35$ are set to a single index group will be described.

Step S20 of FIG. 16 for generating a sequence in a time domain or a frequency domain according to the selected sequence will hereinafter be described.

In the case of using Equation 16, a sequence of a single index group which has the length of 36 and the values $m_0=1$, $m_1=17$, $m_2=97$, and $m_3=35$ can be generated. The following Table 9 shows examples of the generated sequences.

TABLE 9

| $m_0 = 1$ | Real | Imag | $m_1 = 17$ | Real | Imag | $m_2 = 19$ | Real | Imag | $m_3 = 35$ | Real | Imag |
|---|---|---|---|---|---|---|---|---|---|---|---|
| 0 | 1 | 0 | 0 | 1 | 0 | 0 | 1 | 0 | 0 | 1 | 0 |
| 1 | 0.99619 | −0.087156 | 1 | 0.087156 | −0.99619 | 1 | −0.08716 | −0.99619 | 1 | −0.99619 | −0.087156 |
| 2 | 0.93969 | −0.34202 | 2 | 0.93969 | 0.34202 | 2 | 0.93969 | −0.34202 | 2 | 0.93969 | 0.34202 |
| 3 | 0.70711 | −0.70711 | 3 | 0.70711 | −0.70711 | 3 | −0.70711 | −0.70711 | 3 | −0.70711 | −0.70711 |
| 4 | 0.17365 | −0.98481 | 4 | 0.17365 | 0.98481 | 4 | 0.17365 | −0.98481 | 4 | 0.17365 | 0.98481 |
| 5 | −0.57358 | −0.81915 | 5 | 0.81915 | 0.57358 | 5 | −0.81915 | 0.57358 | 5 | 0.57358 | −0.81915 |
| 6 | −1 | 0 | 6 | −1 | 0 | 6 | −1 | 0 | 6 | −1 | 0 |
| 7 | −0.42262 | 0.90631 | 7 | −0.90631 | 0.42262 | 7 | 0.90631 | 0.42262 | 7 | 0.42262 | 0.90631 |
| 8 | 0.76604 | 0.64279 | 8 | 0.76604 | −0.64279 | 8 | 0.76604 | 0.64279 | 8 | 0.76604 | −0.64279 |
| 9 | 0.70711 | −0.70711 | 9 | 0.70711 | −0.70711 | 9 | −0.70711 | −0.70711 | 9 | −0.70711 | −0.70711 |
| 10 | −0.76604 | −0.64279 | 10 | −0.76604 | 0.64279 | 10 | −0.76604 | −0.64279 | 10 | −0.76604 | 0.64279 |
| 11 | −0.42262 | 0.90631 | 11 | −0.90631 | 0.42262 | 11 | 0.90631 | 0.42262 | 11 | 0.42262 | 0.90631 |
| 12 | 1 | 0 | 12 | 1 | 0 | 12 | 1 | 0 | 12 | 1 | 0 |
| 13 | −0.57358 | −0.81915 | 13 | 0.81915 | 0.57358 | 13 | −0.81915 | 0.57358 | 13 | 0.57358 | −0.81915 |
| 14 | −0.17365 | 0.98481 | 14 | −0.17365 | −0.98481 | 14 | −0.17365 | 0.98481 | 14 | −0.17365 | −0.98481 |
| 15 | 0.70711 | −0.70711 | 15 | 0.70711 | −0.70711 | 15 | −0.70711 | −0.70711 | 15 | −0.70711 | −0.70711 |
| 16 | −0.93969 | 0.34202 | 16 | −0.93969 | −0.34202 | 16 | −0.93969 | 0.34202 | 16 | −0.93969 | −0.34202 |
| 17 | 0.99619 | −0.087156 | 17 | 0.087156 | −0.99619 | 17 | −0.08716 | −0.99619 | 17 | −0.99619 | −0.087156 |
| 18 | −1 | 0 | 18 | −1 | 0 | 18 | −1 | 0 | 18 | −1 | 0 |
| 19 | 0.99619 | −0.087156 | 19 | 0.087156 | −0.99619 | 19 | −0.08716 | −0.99619 | 19 | −0.99619 | −0.087156 |
| 20 | −0.93969 | 0.34202 | 20 | −0.93969 | −0.34202 | 20 | −0.93969 | 0.34202 | 20 | −0.93969 | −0.34202 |
| 21 | 0.70711 | −0.70711 | 21 | 0.70711 | −0.70711 | 21 | −0.70711 | −0.70711 | 21 | −0.70711 | −0.70711 |
| 22 | −0.17365 | 0.98481 | 22 | −0.17365 | −0.98481 | 22 | −0.17365 | 0.98481 | 22 | −0.17365 | −0.98481 |
| 23 | −0.57358 | −0.81915 | 23 | 0.81915 | 0.57358 | 23 | −0.81915 | 0.57358 | 23 | 0.57358 | −0.81915 |
| 24 | 1 | 0 | 24 | 1 | 0 | 24 | 1 | 0 | 24 | 1 | 0 |
| 25 | −0.42262 | 0.90631 | 25 | −0.90631 | 0.42262 | 25 | 0.90631 | 0.42262 | 25 | 0.42262 | 0.90631 |
| 26 | −0.76604 | −0.64279 | 26 | −0.76604 | 0.64279 | 26 | −0.76604 | −0.64279 | 26 | −0.76604 | 0.64279 |
| 27 | 0.70711 | −0.70711 | 27 | 0.70711 | −0.70711 | 27 | −0.70711 | −0.70711 | 27 | −0.70711 | −0.70711 |
| 28 | 0.76604 | 0.64279 | 28 | 0.76604 | −0.64279 | 28 | 0.76604 | 0.64279 | 28 | 0.76604 | −0.64279 |
| 29 | −0.42262 | 0.90631 | 29 | −0.90631 | 0.42262 | 29 | 0.90631 | 0.42262 | 29 | 0.42262 | 0.90631 |
| 30 | −1 | 0 | 30 | −1 | 0 | 30 | −1 | 0 | 30 | −1 | 0 |
| 31 | −0.57358 | −0.81915 | 31 | 0.81915 | 0.57358 | 31 | −0.81915 | 0.57358 | 31 | 0.57358 | −0.81915 |
| 32 | 0.17365 | −0.98481 | 32 | 0.17365 | 0.98481 | 32 | 0.17365 | −0.98481 | 32 | 0.17365 | 0.98481 |
| 33 | 0.70711 | −0.70711 | 33 | 0.70711 | −0.70711 | 33 | −0.70711 | −0.70711 | 33 | −0.70711 | −0.70711 |
| 34 | 0.93969 | −0.34202 | 34 | 0.93969 | 0.34202 | 34 | 0.93969 | −0.34202 | 34 | 0.93969 | 0.34202 |
| 35 | 0.99619 | −0.087156 | 35 | 0.087156 | −0.99619 | 35 | −0.08716 | −0.99619 | 35 | −0.99619 | −0.087156 |

The result of Table 9 relates to four sequences. Either one of the four sequences may be configured in the form of FIG. 11. However, FIG. 11 relates to the frank sequence, and the result of Table 9 relates to the Zadoff-Chu sequence.

In the case of using Equation 16, the sequence result associated with a single index group which has the length of 32 and the values $m_0=1$, $m_1=15$, $m_2=17$, and $m_3=31$ can be generated. The following Table 10 shows examples of the generated sequences.

TABLE 10

| $m_0 = 1$ | Real | Imag | $m_1 = 15$ | Real | Imag | $m_2 = 17$ | Real | Imag | $m_3 = 31$ | Real | Imag |
|---|---|---|---|---|---|---|---|---|---|---|---|
| 0 | 1 | 0 | 0 | 1 | 0 | 0 | 1 | 0 | 0 | 1 | 0 |
| 1 | 0.99518 | −0.098017 | 1 | 0.098017 | −0.99518 | 1 | −0.098017 | −0.99518 | 1 | −0.99518 | −0.098017 |
| 2 | 0.92388 | −0.38268 | 2 | 0.92388 | 0.38268 | 2 | 0.92388 | −0.38268 | 2 | 0.92388 | 0.38268 |
| 3 | 0.63439 | −0.77301 | 3 | 0.77301 | −0.63439 | 3 | −0.77301 | −0.63439 | 3 | −0.63439 | −0.77301 |
| 4 | 0 | −1 | 4 | 0 | 1 | 4 | 0 | −1 | 4 | 0 | 1 |
| 5 | −0.77301 | −0.63439 | 5 | 0.63439 | 0.77301 | 5 | −0.63439 | 0.77301 | 5 | 0.77301 | −0.63439 |
| 6 | −0.92388 | 0.38268 | 6 | −0.92388 | −0.38268 | 6 | −0.92388 | 0.38268 | 6 | −0.92388 | −0.38268 |
| 7 | 0.098017 | 0.99518 | 7 | −0.99518 | −0.098017 | 7 | 0.99518 | −0.098017 | 7 | −0.098017 | 0.99518 |
| 8 | 1 | 0 | 8 | 1 | 0 | 8 | 1 | 0 | 8 | 1 | 0 |
| 9 | −0.098017 | −0.99518 | 9 | 0.99518 | 0.098017 | 9 | −0.99518 | 0.098017 | 9 | 0.098017 | −0.99518 |
| 10 | −0.92388 | 0.38268 | 10 | −0.92388 | −0.38268 | 10 | −0.92388 | 0.38268 | 10 | −0.92388 | −0.38268 |
| 11 | 0.77301 | 0.63439 | 11 | −0.63439 | −0.77301 | 11 | 0.63439 | −0.77301 | 11 | −0.77301 | 0.63439 |
| 12 | 0 | −1 | 12 | 0 | 1 | 12 | 0 | −1 | 12 | 0 | 1 |
| 13 | −0.63439 | 0.77301 | 13 | −0.77301 | 0.63439 | 13 | 0.77301 | 0.63439 | 13 | 0.63439 | 0.77301 |
| 14 | 0.92388 | −0.38268 | 14 | 0.92388 | 0.38268 | 14 | 0.92388 | −0.38268 | 14 | 0.92388 | 0.38268 |
| 15 | −0.99518 | 0.098017 | 15 | −0.098017 | 0.99518 | 15 | 0.098017 | 0.99518 | 15 | 0.99518 | 0.098017 |
| 16 | 1 | 0 | 16 | 1 | 0 | 16 | 1 | 0 | 16 | 1 | 0 |
| 17 | −0.99518 | 0.098017 | 17 | −0.098017 | 0.99518 | 17 | 0.098017 | 0.99518 | 17 | 0.99518 | 0.098017 |
| 18 | 0.92388 | −0.38268 | 18 | 0.92388 | 0.38268 | 18 | 0.92388 | −0.38268 | 18 | 0.92388 | 0.38268 |
| 19 | −0.63439 | 0.77301 | 19 | −0.77301 | 0.63439 | 19 | 0.77301 | 0.63439 | 19 | 0.63439 | 0.77301 |
| 20 | 0 | −1 | 20 | 0 | 1 | 20 | 0 | −1 | 20 | 0 | 1 |
| 21 | 0.77301 | 0.63439 | 21 | −0.63439 | −0.77301 | 21 | 0.63439 | −0.77301 | 21 | −0.77301 | 0.63439 |
| 22 | −0.92388 | 0.38268 | 22 | −0.92388 | −0.38268 | 22 | −0.92388 | 0.38268 | 22 | −0.92388 | −0.38268 |
| 23 | −0.098017 | −0.99518 | 23 | 0.99518 | 0.098017 | 23 | −0.99518 | 0.098017 | 23 | 0.098017 | −0.99518 |
| 24 | 1 | 0 | 24 | 1 | 0 | 24 | 1 | 0 | 24 | 1 | 0 |
| 25 | 0.098017 | 0.99518 | 25 | −0.99518 | −0.098017 | 25 | 0.99518 | −0.098017 | 25 | −0.098017 | 0.99518 |
| 26 | −0.92388 | 0.38268 | 26 | −0.92388 | −0.38268 | 26 | −0.92388 | 0.38268 | 26 | −0.92388 | −0.38268 |
| 27 | −0.77301 | −0.63439 | 27 | 0.63439 | 0.77301 | 27 | −0.63439 | 0.77301 | 27 | 0.77301 | −0.63439 |

TABLE 10-continued

| $m_0 = 1$ | Real | Imag | $m_1 = 15$ | Real | Imag | $m_2 = 17$ | Real | Imag | $m_3 = 31$ | Real | Imag |
|---|---|---|---|---|---|---|---|---|---|---|---|
| 28 | 0 | −1 | 28 | 0 | 1 | 28 | 0 | −1 | 28 | 0 | 1 |
| 29 | 0.63439 | −0.77301 | 29 | 0.77301 | −0.63439 | 29 | −0.77301 | −0.63439 | 29 | −0.63439 | −0.77301 |
| 30 | 0.92388 | −0.38268 | 30 | 0.92388 | 0.38268 | 30 | 0.92388 | −0.38268 | 30 | 0.92388 | 0.38268 |
| 31 | 0.99518 | −0.098017 | 31 | 0.098017 | −0.99518 | 31 | −0.098017 | −0.99518 | 31 | −0.99518 | −0.098017 |

Step S30 for repeating the sequence N times in the time domain in FIG. 16 will hereinafter be described.

Step S30 may be omitted for the convenience of description, and the "N" value may be freely determined.

The result of FIG. 9, i.e., the 2×-repetition structure in the time domain, will hereinafter be described with reference to Tables 11 and 12. The following Tables 11 and 12 show the repetition result of Table 9.

TABLE 11

| $m_0 = 1$ | Real | Imag | $m_1 = 17$ | Real | Imag | $m_2 = 19$ | Real | Imag | $m_3 = 35$ | Real | Imag |
|---|---|---|---|---|---|---|---|---|---|---|---|
| 0 | 1 | 0 | 0 | 1 | 0 | 0 | 1 | 0 | 0 | 1 | 0 |
| 1 | 0.99619 | −0.087156 | 1 | 0.087156 | −0.99619 | 1 | −0.08716 | −0.99619 | 1 | −0.99619 | −0.087156 |
| 2 | 0.93969 | −0.34202 | 2 | 0.93969 | 0.34202 | 2 | 0.93969 | −0.34202 | 2 | 0.93969 | 0.34202 |
| 3 | 0.70711 | −0.70711 | 3 | 0.70711 | −0.70711 | 3 | −0.70711 | −0.70711 | 3 | −0.70711 | −0.70711 |
| 4 | 0.17365 | −0.98481 | 4 | 0.17365 | 0.98481 | 4 | 0.17365 | −0.98481 | 4 | 0.17365 | 0.98481 |
| 5 | −0.57358 | −0.81915 | 5 | 0.81915 | 0.57358 | 5 | −0.81915 | 0.57358 | 5 | 0.57358 | −0.81915 |
| 6 | −1 | 0 | 6 | −1 | 0 | 6 | −1 | 0 | 6 | −1 | 0 |
| 7 | −0.42262 | 0.90631 | 7 | −0.90631 | 0.42262 | 7 | 0.90631 | 0.42262 | 7 | 0.42262 | 0.90631 |
| 8 | 0.76604 | 0.64279 | 8 | 0.76604 | −0.64279 | 8 | 0.76604 | 0.64279 | 8 | 0.76604 | −0.64279 |
| 9 | 0.70711 | −0.70711 | 9 | 0.70711 | −0.70711 | 9 | −0.70711 | −0.70711 | 9 | −0.70711 | −0.70711 |
| 10 | −0.76604 | −0.64279 | 10 | −0.76604 | 0.64279 | 10 | −0.76604 | −0.64279 | 10 | −0.76604 | 0.64279 |
| 11 | −0.42262 | 0.90631 | 11 | −0.90631 | 0.42262 | 11 | 0.90631 | 0.42262 | 11 | 0.42262 | 0.90631 |
| 12 | 1 | 0 | 12 | 1 | 0 | 12 | 1 | 0 | 12 | 1 | 0 |
| 13 | −0.57358 | −0.81915 | 13 | 0.81915 | 0.57358 | 13 | −0.81915 | 0.57358 | 13 | 0.57358 | −0.81915 |
| 14 | −0.17365 | 0.98481 | 14 | −0.17365 | −0.98481 | 14 | −0.17365 | 0.98481 | 14 | −0.17365 | −0.98481 |
| 15 | 0.70711 | −0.70711 | 15 | 0.70711 | −0.70711 | 15 | −0.70711 | −0.70711 | 15 | −0.70711 | −0.70711 |
| 16 | −0.93969 | 0.34202 | 16 | −0.93969 | −0.34202 | 16 | −0.93969 | 0.34202 | 16 | −0.93969 | −0.34202 |
| 17 | 0.99619 | −0.087156 | 17 | 0.087156 | −0.99619 | 17 | −0.08716 | −0.99619 | 17 | −0.99619 | −0.087156 |
| 18 | −1 | 0 | 18 | −1 | 0 | 18 | −1 | 0 | 18 | −1 | 0 |
| 19 | 0.99619 | −0.087156 | 19 | 0.087156 | −0.99619 | 19 | −0.08716 | −0.99619 | 19 | −0.99619 | −0.087156 |
| 20 | −0.93969 | 0.34202 | 20 | −0.93969 | −0.34202 | 20 | −0.93969 | 0.34202 | 20 | −0.93969 | −0.34202 |
| 21 | 0.70711 | −0.70711 | 21 | 0.70711 | −0.70711 | 21 | −0.70711 | −0.70711 | 21 | −0.70711 | −0.70711 |
| 22 | −0.17365 | 0.98481 | 22 | −0.17365 | −0.98481 | 22 | −0.17365 | 0.98481 | 22 | −0.17365 | −0.98481 |
| 23 | −0.57358 | −0.81915 | 23 | 0.81915 | 0.57358 | 23 | −0.81915 | 0.57358 | 23 | 0.57358 | −0.81915 |
| 24 | 1 | 0 | 24 | 1 | 0 | 24 | 1 | 0 | 24 | 1 | 0 |
| 25 | −0.42262 | 0.90631 | 25 | −0.90631 | 0.42262 | 25 | 0.90631 | 0.42262 | 25 | 0.42262 | 0.90631 |
| 26 | −0.76604 | −0.64279 | 26 | −0.76604 | 0.64279 | 26 | −0.76604 | −0.64279 | 26 | −0.76604 | 0.64279 |
| 27 | 0.70711 | −0.70711 | 27 | 0.70711 | −0.70711 | 27 | −0.70711 | −0.70711 | 27 | −0.70711 | −0.70711 |
| 28 | 0.76604 | 0.64279 | 28 | 0.76604 | −0.64279 | 28 | 0.76604 | 0.64279 | 28 | 0.76604 | −0.64279 |
| 29 | −0.42262 | 0.90631 | 29 | −0.90631 | 0.42262 | 29 | 0.90631 | 0.42262 | 29 | 0.42262 | 0.90631 |
| 30 | −1 | 0 | 30 | −1 | 0 | 30 | −1 | 0 | 30 | −1 | 0 |
| 31 | −0.57358 | −0.81915 | 31 | 0.81915 | 0.57358 | 31 | −0.81915 | 0.57358 | 31 | 0.57358 | −0.81915 |
| 32 | 0.17365 | −0.98481 | 32 | 0.17365 | 0.98481 | 32 | 0.17365 | −0.98481 | 32 | 0.17365 | 0.98481 |
| 33 | 0.70711 | −0.70711 | 33 | 0.70711 | −0.70711 | 33 | −0.70711 | −0.70711 | 33 | −0.70711 | −0.70711 |
| 34 | 0.93969 | −0.34202 | 34 | 0.93969 | 0.34202 | 34 | 0.93969 | −0.34202 | 34 | 0.93969 | 0.34202 |
| 35 | 0.99619 | −0.087156 | 35 | 0.087156 | −0.99619 | 35 | −0.08716 | −0.99619 | 35 | −0.99619 | −0.087156 |

TABLE 12

| $m_0 = 1$ | Real | Imag | $m_1 = 17$ | Real | Imag | $m_2 = 19$ | Real | Imag | $m_3 = 35$ | Real | Imag |
|---|---|---|---|---|---|---|---|---|---|---|---|
| 36 | 1 | 0 | 36 | 1 | 0 | 36 | 1 | 0 | 36 | 1 | 0 |
| 37 | 0.99619 | −0.087156 | 37 | 0.087156 | −0.99619 | 37 | −0.08716 | −0.99619 | 37 | −0.99619 | −0.087156 |
| 38 | 0.93969 | −0.34202 | 38 | 0.93969 | 0.34202 | 38 | 0.93969 | −0.34202 | 38 | 0.93969 | 0.34202 |
| 39 | 0.70711 | −0.70711 | 39 | 0.70711 | −0.70711 | 39 | −0.70711 | −0.70711 | 39 | −0.70711 | −0.70711 |
| 40 | 0.17365 | −0.98481 | 40 | 0.17365 | 0.98481 | 40 | 0.17365 | −0.98481 | 40 | 0.17365 | 0.98481 |
| 41 | −0.57358 | −0.81915 | 41 | 0.81915 | 0.57358 | 41 | −0.81915 | 0.57358 | 41 | 0.57358 | −0.81915 |
| 42 | −1 | 0 | 42 | −1 | 0 | 42 | −1 | 0 | 42 | −1 | 0 |
| 43 | −0.42262 | 0.90631 | 43 | −0.90631 | 0.42262 | 43 | 0.90631 | 0.42262 | 43 | 0.42262 | 0.90631 |
| 44 | 0.76604 | 0.64279 | 44 | 0.76604 | −0.64279 | 44 | 0.76604 | 0.64279 | 44 | 0.76604 | −0.64279 |
| 45 | 0.70711 | −0.70711 | 45 | 0.70711 | −0.70711 | 45 | −0.70711 | −0.70711 | 45 | −0.70711 | −0.70711 |
| 46 | −0.76604 | −0.64279 | 46 | −0.76604 | 0.64279 | 46 | −0.76604 | −0.64279 | 46 | −0.76604 | 0.64279 |
| 47 | −0.42262 | 0.90631 | 47 | −0.90631 | 0.42262 | 47 | 0.90631 | 0.42262 | 47 | 0.42262 | 0.90631 |
| 48 | 1 | 0 | 48 | 1 | 0 | 48 | 1 | 0 | 48 | 1 | 0 |
| 49 | −0.57358 | −0.81915 | 49 | 0.81915 | 0.57358 | 49 | −0.81915 | 0.57358 | 49 | 0.57358 | −0.81915 |
| 50 | −0.17365 | 0.98481 | 50 | −0.17365 | −0.98481 | 50 | −0.17365 | 0.98481 | 50 | −0.17365 | −0.98481 |
| 51 | 0.70711 | −0.70711 | 51 | 0.70711 | −0.70711 | 51 | −0.70711 | −0.70711 | 51 | −0.70711 | −0.70711 |

TABLE 12-continued

| $m_0 = 1$ | Real | Imag | $m_1 = 17$ | Real | Imag | $m_2 = 19$ | Real | Imag | $m_3 = 35$ | Real | Imag |
|---|---|---|---|---|---|---|---|---|---|---|---|
| 52 | −0.93969 | 0.34202 | 52 | −0.93969 | −0.34202 | 52 | −0.93969 | 0.34202 | 52 | −0.93969 | −0.34202 |
| 53 | 0.99619 | −0.087156 | 53 | 0.087156 | −0.99619 | 53 | −0.08716 | −0.99619 | 53 | −0.99619 | −0.087156 |
| 54 | −1 | 0 | 54 | −1 | 0 | 54 | −1 | 0 | 54 | −1 | 0 |
| 55 | 0.99619 | −0.087156 | 55 | 0.087156 | −0.99619 | 55 | −0.08716 | −0.99619 | 55 | −0.99619 | −0.087156 |
| 56 | −0.93969 | 0.34202 | 56 | −0.93969 | −0.34202 | 56 | −0.93969 | 0.34202 | 56 | −0.93969 | −0.34202 |
| 57 | 0.70711 | −0.70711 | 57 | 0.70711 | −0.70711 | 57 | −0.70711 | −0.70711 | 57 | −0.70711 | −0.70711 |
| 58 | −0.17365 | 0.98481 | 58 | −0.17365 | −0.98481 | 58 | −0.17365 | 0.98481 | 58 | −0.17365 | −0.98481 |
| 59 | −0.57358 | −0.81915 | 59 | 0.81915 | 0.57358 | 59 | −0.81915 | 0.57358 | 59 | 0.57358 | −0.81915 |
| 60 | 1 | 0 | 60 | 1 | 0 | 60 | 1 | 0 | 60 | 1 | 0 |
| 61 | −0.42262 | 0.90631 | 61 | −0.90631 | 0.42262 | 61 | 0.90631 | 0.42262 | 61 | 0.42262 | 0.90631 |
| 62 | −0.76604 | −0.64279 | 62 | −0.76604 | 0.64279 | 62 | −0.76604 | −0.64279 | 62 | −0.76604 | 0.64279 |
| 63 | 0.70711 | −0.70711 | 63 | 0.70711 | −0.70711 | 63 | −0.70711 | −0.70711 | 63 | −0.70711 | −0.70711 |
| 64 | 0.76604 | 0.64279 | 64 | 0.76604 | −0.64279 | 64 | 0.76604 | 0.64279 | 64 | 0.76604 | −0.64279 |
| 65 | −0.42262 | 0.90631 | 65 | −0.90631 | 0.42262 | 65 | 0.90631 | 0.42262 | 65 | 0.42262 | 0.90631 |
| 66 | −1 | 0 | 66 | −1 | 0 | 66 | −1 | 0 | 66 | −1 | 0 |
| 67 | −0.57358 | −0.81915 | 67 | 0.81915 | 0.57358 | 67 | −0.81915 | 0.57358 | 67 | 0.57358 | −0.81915 |
| 68 | 0.17365 | −0.98481 | 68 | 0.17365 | 0.98481 | 68 | 0.17365 | −0.98481 | 68 | 0.17365 | 0.98481 |
| 69 | 0.70711 | −0.70711 | 69 | 0.70711 | −0.70711 | 69 | −0.70711 | −0.70711 | 69 | −0.70711 | −0.70711 |
| 70 | 0.93969 | −0.34202 | 70 | 0.93969 | 0.34202 | 70 | 0.93969 | −0.34202 | 70 | 0.93969 | 0.34202 |
| 71 | 0.99619 | −0.087156 | 71 | 0.087156 | −0.99619 | 71 | −0.08716 | −0.99619 | 71 | −0.99619 | −0.087156 |

An example acquired when the result of Table 10 is repeated two times in the time domain will hereinafter be described with reference to Tables 13 and 14. As can be seen from Tables 13 and 14, the result of Table 10 is repeated once more.

TABLE 13

| $m_0 = 1$ | Real | Imag | $m_1 = 15$ | Real | Imag | $m_2 = 17$ | Real | Imag | $m_3 = 31$ | Real | Imag |
|---|---|---|---|---|---|---|---|---|---|---|---|
| 0 | 1 | 0 | 0 | 1 | 0 | 0 | 1 | 0 | 0 | 1 | 0 |
| 1 | 0.99518 | −0.098017 | 1 | 0.098017 | −0.99518 | 1 | −0.098017 | −0.99518 | 1 | −0.99518 | −0.098017 |
| 2 | 0.92388 | −0.38268 | 2 | 0.92388 | 0.38268 | 2 | 0.92388 | −0.38268 | 2 | 0.92388 | 0.38268 |
| 3 | 0.63439 | −0.77301 | 3 | 0.77301 | −0.63439 | 3 | −0.77301 | −0.63439 | 3 | −0.63439 | −0.77301 |
| 4 | 0 | −1 | 4 | 0 | 1 | 4 | 0 | −1 | 4 | 0 | 1 |
| 5 | −0.77301 | −0.63439 | 5 | 0.63439 | 0.77301 | 5 | −0.63439 | 0.77301 | 5 | 0.77301 | −0.63439 |
| 6 | −0.92388 | 0.38268 | 6 | −0.92388 | −0.38268 | 6 | −0.92388 | 0.38268 | 6 | −0.92388 | −0.38268 |
| 7 | 0.098017 | 0.99518 | 7 | −0.99518 | −0.098017 | 7 | 0.99518 | −0.098017 | 7 | −0.098017 | 0.99518 |
| 8 | 1 | 0 | 8 | 1 | 0 | 8 | 1 | 0 | 8 | 1 | 0 |
| 9 | −0.098017 | −0.99518 | 9 | 0.99518 | 0.098017 | 9 | −0.99518 | 0.098017 | 9 | 0.098017 | −0.99518 |
| 10 | −0.92388 | 0.38268 | 10 | −0.92388 | −0.38268 | 10 | −0.92388 | 0.38268 | 10 | −0.92388 | −0.38268 |
| 11 | 0.77301 | 0.63439 | 11 | −0.63439 | −0.77301 | 11 | 0.63439 | −0.77301 | 11 | −0.77301 | 0.63439 |
| 12 | 0 | −1 | 12 | 0 | 1 | 12 | 0 | −1 | 12 | 0 | 1 |
| 13 | −0.63439 | 0.77301 | 13 | −0.77301 | 0.63439 | 13 | 0.77301 | 0.63439 | 13 | 0.63439 | 0.77301 |
| 14 | 0.92388 | −0.38268 | 14 | 0.92388 | 0.38268 | 14 | 0.92388 | −0.38268 | 14 | 0.92388 | 0.38268 |
| 15 | −0.99518 | 0.098017 | 15 | −0.098017 | 0.99518 | 15 | 0.098017 | 0.99518 | 15 | 0.99518 | 0.098017 |
| 16 | 1 | 0 | 16 | 1 | 0 | 16 | 1 | 0 | 16 | 1 | 0 |
| 17 | −0.99518 | 0.098017 | 17 | −0.098017 | 0.99518 | 17 | 0.098017 | 0.99518 | 17 | 0.99518 | 0.098017 |
| 18 | 0.92388 | −0.38268 | 18 | 0.92388 | 0.38268 | 18 | 0.92388 | −0.38268 | 18 | 0.92388 | 0.38268 |
| 19 | −0.63439 | 0.77301 | 19 | −0.77301 | 0.63439 | 19 | 0.77301 | 0.63439 | 19 | 0.63439 | 0.77301 |
| 20 | 0 | −1 | 20 | 0 | 1 | 20 | 0 | −1 | 20 | 0 | 1 |
| 21 | 0.77301 | 0.63439 | 21 | −0.63439 | −0.77301 | 21 | 0.63439 | −0.77301 | 21 | −0.77301 | 0.63439 |
| 22 | −0.92388 | 0.38268 | 22 | −0.92388 | −0.38268 | 22 | −0.92388 | 0.38268 | 22 | −0.92388 | −0.38268 |
| 23 | −0.098017 | −0.99518 | 23 | 0.99518 | 0.098017 | 23 | −0.99518 | 0.098017 | 23 | 0.098017 | −0.99518 |
| 24 | 1 | 0 | 24 | 1 | 0 | 24 | 1 | 0 | 24 | 1 | 0 |
| 25 | 0.098017 | 0.99518 | 25 | −0.99518 | −0.098017 | 25 | 0.99518 | −0.098017 | 25 | −0.098017 | 0.99518 |
| 26 | −0.92388 | 0.38268 | 26 | −0.92388 | −0.38268 | 26 | −0.92388 | 0.38268 | 26 | −0.92388 | −0.38268 |
| 27 | −0.77301 | −0.63439 | 27 | 0.63439 | 0.77301 | 27 | −0.63439 | 0.77301 | 27 | 0.77301 | −0.63439 |
| 28 | 0 | −1 | 28 | 0 | 1 | 28 | 0 | −1 | 28 | 0 | 1 |
| 29 | 0.63439 | −0.77301 | 29 | 0.77301 | −0.63439 | 29 | −0.77301 | −0.63439 | 29 | −0.63439 | −0.77301 |
| 30 | 0.92388 | −0.38268 | 30 | 0.92388 | 0.38268 | 30 | 0.92388 | −0.38268 | 30 | 0.92388 | 0.38268 |
| 31 | 0.99518 | −0.098017 | 31 | 0.098017 | −0.99518 | 31 | −0.098017 | −0.99518 | 31 | −0.99518 | −0.098017 |
| 32 | 1 | 0 | 32 | 1 | 0 | 32 | 1 | 0 | 32 | 1 | 0 |

TABLE 14

| $m_0 = 1$ | Real | Imag | $m_1 = 15$ | Real | Imag | $m_2 = 17$ | Real | Imag | $m_3 = 31$ | Real | Imag |
|---|---|---|---|---|---|---|---|---|---|---|---|
| 33 | 0.99518 | −0.098017 | 33 | 0.098017 | −0.99518 | 33 | −0.098017 | −0.99518 | 33 | −0.99518 | −0.098017 |
| 34 | 0.92388 | −0.38268 | 34 | 0.92388 | 0.38268 | 34 | 0.92388 | −0.38268 | 34 | 0.92388 | 0.38268 |
| 35 | 0.63439 | −0.77301 | 35 | 0.77301 | −0.63439 | 35 | −0.77301 | −0.63439 | 35 | −0.63439 | −0.77301 |
| 36 | 0 | −1 | 36 | 0 | 1 | 36 | 0 | −1 | 36 | 0 | 1 |
| 37 | −0.77301 | −0.63439 | 37 | 0.63439 | 0.77301 | 37 | −0.63439 | 0.77301 | 37 | 0.77301 | −0.63439 |
| 38 | −0.92388 | 0.38268 | 38 | −0.92388 | −0.38268 | 38 | −0.92388 | 0.38268 | 38 | −0.92388 | −0.38268 |

TABLE 14-continued

| $m_0 = 1$ | Real | Imag | $m_1 = 15$ | Real | Imag | $m_2 = 17$ | Real | Imag | $m_3 = 31$ | Real | Imag |
|---|---|---|---|---|---|---|---|---|---|---|---|
| 39 | 0.098017 | 0.99518 | 39 | −0.99518 | −0.098017 | 39 | 0.99518 | −0.098017 | 39 | −0.098017 | 0.99518 |
| 40 | 1 | 0 | 40 | 1 | 0 | 40 | 1 | 0 | 40 | 1 | 0 |
| 41 | −0.098017 | −0.99518 | 41 | 0.99518 | 0.098017 | 41 | −0.99518 | 0.098017 | 41 | 0.098017 | −0.99518 |
| 42 | −0.92388 | 0.38268 | 42 | −0.92388 | −0.38268 | 42 | −0.92388 | 0.38268 | 42 | −0.92388 | −0.38268 |
| 43 | 0.77301 | 0.63439 | 43 | −0.63439 | −0.77301 | 43 | 0.63439 | −0.77301 | 43 | −0.77301 | 0.63439 |
| 44 | 0 | −1 | 44 | 0 | 1 | 44 | 0 | −1 | 44 | 0 | 1 |
| 45 | −0.63439 | 0.77301 | 45 | −0.77301 | 0.63439 | 45 | 0.77301 | 0.63439 | 45 | 0.63439 | 0.77301 |
| 46 | 0.92388 | −0.38268 | 46 | 0.92388 | 0.38268 | 46 | 0.92388 | −0.38268 | 46 | 0.92388 | 0.38268 |
| 47 | −0.99518 | 0.098017 | 47 | −0.098017 | 0.99518 | 47 | 0.098017 | 0.99518 | 47 | 0.99518 | 0.098017 |
| 48 | 1 | 0 | 48 | 1 | 0 | 48 | 1 | 0 | 48 | 1 | 0 |
| 49 | −0.99518 | 0.098017 | 49 | −0.098017 | 0.99518 | 49 | 0.098017 | 0.99518 | 49 | 0.99518 | 0.098017 |
| 50 | 0.92388 | −0.38268 | 50 | 0.92388 | 0.38268 | 50 | 0.92388 | −0.38268 | 50 | 0.92388 | 0.38268 |
| 51 | −0.63439 | 0.77301 | 51 | −0.77301 | 0.63439 | 51 | 0.77301 | 0.63439 | 51 | 0.63439 | 0.77301 |
| 52 | 0 | −1 | 52 | 0 | 1 | 52 | 0 | −1 | 52 | 0 | 1 |
| 53 | 0.77301 | 0.63439 | 53 | −0.63439 | −0.77301 | 53 | 0.63439 | −0.77301 | 53 | −0.77301 | 0.63439 |
| 54 | −0.92388 | 0.38268 | 54 | −0.92388 | −0.38268 | 54 | −0.92388 | 0.38268 | 54 | −0.92388 | −0.38268 |
| 55 | −0.098017 | −0.99518 | 55 | 0.99518 | 0.098017 | 55 | −0.99518 | 0.098017 | 55 | 0.098017 | −0.99518 |
| 56 | 1 | 0 | 56 | 1 | 0 | 56 | 1 | 0 | 56 | 1 | 0 |
| 57 | 0.098017 | 0.99518 | 57 | −0.99518 | −0.098017 | 57 | 0.99518 | −0.098017 | 57 | −0.098017 | 0.99518 |
| 58 | −0.92388 | 0.38268 | 58 | −0.92388 | −0.38268 | 58 | −0.92388 | 0.38268 | 58 | −0.92388 | −0.38268 |
| 59 | −0.77301 | −0.63439 | 59 | 0.63439 | 0.77301 | 59 | −0.63439 | 0.77301 | 59 | 0.77301 | −0.63439 |
| 60 | 0 | −1 | 60 | 0 | 1 | 60 | 0 | −1 | 60 | 0 | 1 |
| 61 | 0.63439 | −0.77301 | 61 | 0.77301 | −0.63439 | 61 | −0.77301 | −0.63439 | 61 | −0.63439 | −0.77301 |
| 62 | 0.92388 | −0.38268 | 62 | 0.92388 | 0.38268 | 62 | 0.92388 | −0.38268 | 62 | 0.92388 | 0.38268 |
| 63 | 0.99518 | −0.098017 | 63 | 0.098017 | −0.99518 | 63 | −0.098017 | −0.99518 | 63 | −0.99518 | −0.098017 |

Next, Step S40 for mapping the time-domain sequence to a frequency domain in FIG. 16 will hereinafter be described. However, it should be noted that the sequence according to the present invention may be generated from the frequency domain, so that it may be directly mapped to the frequency resource element as necessary.

If the sequence with the 2×-repetition structure is mapped to the frequency domain, a specific sequence is generated in the frequent domain. In this case, this specific sequence has a frequency component at only even-th frequency indexes of the frequency domain due to the DFT-operation characteristics.

In more detail, if the sequences of Tables 11 and 12 are mapped to the frequency domain, the following sequences shown in Tables 15 and 16 can be acquired.

If the sequences of Tables 13 and 14 are mapped to the frequency domain, the following sequences shown in Tables 17 and 18 can be acquired.

TABLE 15

| $m_0 = 1$ | Real | Imag | $m_1 = 17$ | Real | Imag | $m_2 = 19$ | Real | Imag | $m_3 = 35$ | Real | Imag |
|---|---|---|---|---|---|---|---|---|---|---|---|
| 0 | 1 | −1 | 0 | 1 | −1 | 0 | −1 | −1 | 0 | −1 | −1 |
| 1 | 0 | 0 | 1 | 0 | 0 | 1 | 0 | 0 | 1 | 0 | 0 |
| 2 | 1.0834 | −0.90904 | 2 | 1.0834 | 0.90904 | 2 | 1.0834 | −0.90904 | 2 | 1.0834 | 0.90904 |
| 3 | 0 | 0 | 3 | 0 | 0 | 3 | 0 | 0 | 3 | 0 | 0 |
| 4 | 1.2817 | −0.59767 | 4 | 0.59767 | −1.2817 | 4 | −0.59767 | −1.2817 | 4 | −1.2817 | −0.59767 |
| 5 | 0 | 0 | 5 | 0 | 0 | 5 | 0 | 0 | 5 | 0 | 0 |
| 6 | 1.4142 | 0 | 6 | 1.4142 | 0 | 6 | 1.4142 | 0 | 6 | 1.4142 | 0 |
| 7 | 0 | 0 | 7 | 0 | 0 | 7 | 0 | 0 | 7 | 0 | 0 |
| 8 | 1.1585 | 0.81116 | 8 | −0.81116 | −1.1585 | 8 | 0.81116 | −1.1585 | 8 | −1.1585 | 0.81116 |
| 9 | 0 | 0 | 9 | 0 | 0 | 9 | 0 | 0 | 9 | 0 | 0 |
| 10 | 0.24558 | 1.3927 | 10 | 0.24558 | −1.3927 | 10 | 0.24558 | 1.3927 | 10 | 0.24558 | −1.3927 |
| 11 | 0 | 0 | 11 | 0 | 0 | 11 | 0 | 0 | 11 | 0 | 0 |
| 12 | −1 | 1 | 12 | −1 | 1 | 12 | 1 | 1 | 12 | 1 | 1 |
| 13 | 0 | 0 | 13 | 0 | 0 | 13 | 0 | 0 | 13 | 0 | 0 |
| 14 | −1.3289 | −0.48369 | 14 | −1.3289 | 0.48369 | 14 | −1.3289 | −0.48369 | 14 | −1.3289 | 0.48369 |
| 15 | 0 | 0 | 15 | 0 | 0 | 15 | 0 | 0 | 15 | 0 | 0 |
| 16 | 0.12326 | −1.4088 | 16 | 1.4088 | −0.12326 | 16 | −1.4088 | −0.12326 | 16 | −0.12326 | −1.4088 |
| 17 | 0 | 0 | 17 | 0 | 0 | 17 | 0 | 0 | 17 | 0 | 0 |
| 18 | 1.4142 | 0 | 18 | 1.4142 | 0 | 18 | 1.4142 | 0 | 18 | 1.4142 | 0 |
| 19 | 0 | 0 | 19 | 0 | 0 | 19 | 0 | 0 | 19 | 0 | 0 |
| 20 | −0.12326 | 1.4088 | 20 | −1.4088 | 0.12326 | 20 | 1.4088 | 0.12326 | 20 | 0.12326 | 1.4088 |
| 21 | 0 | 0 | 21 | 0 | 0 | 21 | 0 | 0 | 21 | 0 | 0 |
| 22 | −1.3289 | −0.48369 | 22 | −1.3289 | 0.48369 | 22 | −1.3289 | −0.48369 | 22 | −1.3289 | 0.48369 |
| 23 | 0 | 0 | 23 | 0 | 0 | 23 | 0 | 0 | 23 | 0 | 0 |
| 24 | 1 | −1 | 24 | 1 | −1 | 24 | −1 | −1 | 24 | −1 | −1 |
| 25 | 0 | 0 | 25 | 0 | 0 | 25 | 0 | 0 | 25 | 0 | 0 |
| 26 | 0.24558 | 1.3927 | 26 | 0.24558 | −1.3927 | 26 | 0.24558 | 1.3927 | 26 | 0.24558 | −1.3927 |
| 27 | 0 | 0 | 27 | 0 | 0 | 27 | 0 | 0 | 27 | 0 | 0 |
| 28 | −1.1585 | −0.81116 | 28 | 0.81116 | 1.1585 | 28 | −0.81116 | 1.1585 | 28 | 1.1585 | −0.81116 |
| 29 | 0 | 0 | 29 | 0 | 0 | 29 | 0 | 0 | 29 | 0 | 0 |
| 30 | 1.4142 | 0 | 30 | 1.4142 | 0 | 30 | 1.4142 | 0 | 30 | 1.4142 | 0 |
| 31 | 0 | 0 | 31 | 0 | 0 | 31 | 0 | 0 | 31 | 0 | 0 |
| 32 | −1.2817 | 0.59767 | 32 | −0.59767 | 1.2817 | 32 | 0.59767 | 1.2817 | 32 | 1.2817 | 0.59767 |
| 33 | 0 | 0 | 33 | 0 | 0 | 33 | 0 | 0 | 33 | 0 | 0 |

TABLE 15-continued

| $m_0 = 1$ | Real | Imag | $m_1 = 17$ | Real | Imag | $m_2 = 19$ | Real | Imag | $m_3 = 35$ | Real | Imag |
|---|---|---|---|---|---|---|---|---|---|---|---|
| 34 | 1.0834 | −0.90904 | 34 | 1.0834 | 0.90904 | 34 | 1.0834 | −0.90904 | 34 | 1.0834 | 0.90904 |
| 35 | 0 | 0 | 35 | 0 | 0 | 35 | 0 | 0 | 35 | 0 | 0 |

TABLE 16

| $m_0 = 1$ | Real | Imag | $m_1 = 17$ | Real | Imag | $m_2 = 19$ | Real | Imag | $m_3 = 35$ | Real | Imag |
|---|---|---|---|---|---|---|---|---|---|---|---|
| 36 | −1 | 1 | 36 | −1 | 1 | 36 | 1 | 1 | 36 | 1 | 1 |
| 37 | 0 | 0 | 37 | 0 | 0 | 37 | 0 | 0 | 37 | 0 | 0 |
| 38 | 1.0834 | −0.90904 | 38 | 1.0834 | 0.90904 | 38 | 1.0834 | −0.90904 | 38 | 1.0834 | 0.90904 |
| 39 | 0 | 0 | 39 | 0 | 0 | 39 | 0 | 0 | 39 | 0 | 0 |
| 40 | −1.2817 | 0.59767 | 40 | −0.59767 | 1.2817 | 40 | 0.59767 | 1.2817 | 40 | 1.2817 | 0.59767 |
| 41 | 0 | 0 | 41 | 0 | 0 | 41 | 0 | 0 | 41 | 0 | 0 |
| 42 | 1.4142 | 0 | 42 | 1.4142 | 0 | 42 | 1.4142 | 0 | 42 | 1.4142 | 0 |
| 43 | 0 | 0 | 43 | 0 | 0 | 43 | 0 | 0 | 43 | 0 | 0 |
| 44 | −1.1585 | −0.81116 | 44 | 0.81116 | 1.1585 | 44 | −0.81116 | 1.1585 | 44 | 1.1585 | −0.81116 |
| 45 | 0 | 0 | 45 | 0 | 0 | 45 | 0 | 0 | 45 | 0 | 0 |
| 46 | 0.24558 | 1.3927 | 46 | 0.24558 | −1.3927 | 46 | 0.24558 | 1.3927 | 46 | 0.24558 | −1.3927 |
| 47 | 0 | 0 | 47 | 0 | 0 | 47 | 0 | 0 | 47 | 0 | 0 |
| 48 | 1 | −1 | 48 | 1 | −1 | 48 | −1 | −1 | 48 | −1 | −1 |
| 49 | 0 | 0 | 49 | 0 | 0 | 49 | 0 | 0 | 49 | 0 | 0 |
| 50 | −1.3289 | −0.48369 | 50 | −1.3289 | 0.48369 | 50 | −1.3289 | −0.48369 | 50 | −1.3289 | 0.48369 |
| 51 | 0 | 0 | 51 | 0 | 0 | 51 | 0 | 0 | 51 | 0 | 0 |
| 52 | −0.12326 | 1.4088 | 52 | −1.4088 | 0.12326 | 52 | 1.4088 | 0.12326 | 52 | 0.12326 | 1.4088 |
| 53 | 0 | 0 | 53 | 0 | 0 | 53 | 0 | 0 | 53 | 0 | 0 |
| 54 | 1.4142 | 0 | 54 | 1.4142 | 0 | 54 | 1.4142 | 0 | 54 | 1.4142 | 0 |
| 55 | 0 | 0 | 55 | 0 | 0 | 55 | 0 | 0 | 55 | 0 | 0 |
| 56 | 0.12326 | −1.4088 | 56 | 1.4088 | −0.12326 | 56 | −1.4088 | −0.12326 | 56 | −0.12326 | −1.4088 |
| 57 | 0 | 0 | 57 | 0 | 0 | 57 | 0 | 0 | 57 | 0 | 0 |
| 58 | −1.3289 | −0.48369 | 58 | −1.3289 | 0.48369 | 58 | −1.3289 | −0.48369 | 58 | −1.3289 | 0.48369 |
| 59 | 0 | 0 | 59 | 0 | 0 | 59 | 0 | 0 | 59 | 0 | 0 |
| 60 | −1 | 1 | 60 | −1 | 1 | 60 | 1 | 1 | 60 | 1 | 1 |
| 61 | 0 | 0 | 61 | 0 | 0 | 61 | 0 | 0 | 61 | 0 | 0 |
| 62 | 0.24558 | 1.3927 | 62 | 0.24558 | −1.3927 | 62 | 0.24558 | 1.3927 | 62 | 0.24558 | −1.3927 |
| 63 | 0 | 0 | 63 | 0 | 0 | 63 | 0 | 0 | 63 | 0 | 0 |
| 64 | 1.1585 | 0.81116 | 64 | −0.81116 | −1.1585 | 64 | 0.81116 | −1.1585 | 64 | −1.1585 | 0.81116 |
| 65 | 0 | 0 | 65 | 0 | 0 | 65 | 0 | 0 | 65 | 0 | 0 |
| 66 | 1.4142 | 0 | 66 | 1.4142 | 0 | 66 | 1.4142 | 0 | 66 | 1.4142 | 0 |
| 67 | 0 | 0 | 67 | 0 | 0 | 67 | 0 | 0 | 67 | 0 | 0 |
| 68 | 1.2817 | −0.59767 | 68 | 0.59767 | −1.2817 | 68 | −0.59767 | −1.2817 | 68 | −1.2817 | −0.59767 |
| 69 | 0 | 0 | 69 | 0 | 0 | 69 | 0 | 0 | 69 | 0 | 0 |
| 70 | 1.0834 | −0.90904 | 70 | 1.0834 | 0.90904 | 70 | 1.0834 | −0.90904 | 70 | 1.0834 | 0.90904 |
| 71 | 0 | 0 | 71 | 0 | 0 | 71 | 0 | 0 | 71 | 0 | 0 |

TABLE 17

| $m_0 = 1$ | Real | Imag | $m_1 = 15$ | Real | Imag | $m_2 = 17$ | Real | Imag | $m_3 = 31$ | Real | Imag |
|---|---|---|---|---|---|---|---|---|---|---|---|
| 0 | 1 | −1 | 0 | 1 | 1 | 0 | 1 | −1 | 0 | 1 | 1 |
| 1 | 0 | 0 | 1 | 0 | 0 | 1 | 0 | 0 | 1 | 0 | 0 |
| 2 | 1.0932 | −0.89717 | 2 | 0.89717 | −1.0932 | 2 | −0.89717 | −1.0932 | 2 | −1.0932 | −0.89717 |
| 3 | 0 | 0 | 3 | 0 | 0 | 3 | 0 | 0 | 3 | 0 | 0 |
| 4 | 1.3066 | −0.5412 | 4 | 1.3066 | 0.5412 | 4 | 1.3066 | −0.5412 | 4 | 1.3066 | 0.5412 |
| 5 | 0 | 0 | 5 | 0 | 0 | 5 | 0 | 0 | 5 | 0 | 0 |
| 6 | 1.4074 | 0.13862 | 6 | −0.13862 | −1.4074 | 6 | 0.13862 | −1.4074 | 6 | −1.4074 | 0.13862 |
| 7 | 0 | 0 | 7 | 0 | 0 | 7 | 0 | 0 | 7 | 0 | 0 |
| 8 | 1 | 1 | 8 | 1 | −1 | 8 | 1 | 1 | 8 | 1 | −1 |
| 9 | 0 | 0 | 9 | 0 | 0 | 9 | 0 | 0 | 9 | 0 | 0 |
| 10 | −0.13862 | 1.4074 | 10 | −1.4074 | 0.13862 | 10 | 1.4074 | 0.13862 | 10 | 0.13862 | 1.4074 |
| 11 | 0 | 0 | 11 | 0 | 0 | 11 | 0 | 0 | 11 | 0 | 0 |
| 12 | −1.3066 | 0.5412 | 12 | −1.3066 | −0.5412 | 12 | −1.3066 | 0.5412 | 12 | −1.3066 | −0.5412 |
| 13 | 0 | 0 | 13 | 0 | 0 | 13 | 0 | 0 | 13 | 0 | 0 |
| 14 | −0.89717 | −1.0932 | 14 | 1.0932 | 0.89717 | 14 | −1.0932 | 0.89717 | 14 | 0.89717 | −1.0932 |
| 15 | 0 | 0 | 15 | 0 | 0 | 15 | 0 | 0 | 15 | 0 | 0 |
| 16 | 1 | −1 | 16 | 1 | 1 | 16 | 1 | −1 | 16 | 1 | 1 |
| 17 | 0 | 0 | 17 | 0 | 0 | 17 | 0 | 0 | 17 | 0 | 0 |
| 18 | 0.89717 | 1.0932 | 18 | −1.0932 | −0.89717 | 18 | 1.0932 | −0.89717 | 18 | −0.89717 | 1.0932 |
| 19 | 0 | 0 | 19 | 0 | 0 | 19 | 0 | 0 | 19 | 0 | 0 |
| 20 | −1.3066 | 0.5412 | 20 | −1.3066 | −0.5412 | 20 | −1.3066 | 0.5412 | 20 | −1.3066 | −0.5412 |

TABLE 17-continued

| $m_0 = 1$ | Real | Imag | $m_1 = 15$ | Real | Imag | $m_2 = 17$ | Real | Imag | $m_3 = 31$ | Real | Imag |
|---|---|---|---|---|---|---|---|---|---|---|---|
| 21 | 0 | 0 | 21 | 0 | 0 | 21 | 0 | 0 | 21 | 0 | 0 |
| 22 | 0.13862 | −1.4074 | 22 | 1.4074 | −0.13862 | 22 | −1.4074 | −0.13862 | 22 | −0.13862 | −1.4074 |
| 23 | 0 | 0 | 23 | 0 | 0 | 23 | 0 | 0 | 23 | 0 | 0 |
| 24 | 1 | 1 | 24 | 1 | −1 | 24 | 1 | 1 | 24 | 1 | −1 |
| 25 | 0 | 0 | 25 | 0 | 0 | 25 | 0 | 0 | 25 | 0 | 0 |
| 26 | −1.4074 | −0.13862 | 26 | 0.13862 | 1.4074 | 26 | −0.13862 | 1.4074 | 26 | 1.4074 | −0.13862 |
| 27 | 0 | 0 | 27 | 0 | 0 | 27 | 0 | 0 | 27 | 0 | 0 |
| 28 | 1.3066 | −0.5412 | 28 | 1.3066 | 0.5412 | 28 | 1.3066 | −0.5412 | 28 | 1.3066 | 0.5412 |
| 29 | 0 | 0 | 29 | 0 | 0 | 29 | 0 | 0 | 29 | 0 | 0 |
| 30 | −1.0932 | 0.89717 | 30 | −0.89717 | 1.0932 | 30 | 0.89717 | 1.0932 | 30 | 1.0932 | 0.89717 |
| 31 | 0 | 0 | 31 | 0 | 0 | 31 | 0 | 0 | 31 | 0 | 0 |

TABLE 18

| $m_0 = 1$ | Real | Imag | $m_1 = 15$ | Real | Imag | $m_2 = 17$ | Real | Imag | $m_3 = 31$ | Real | Imag |
|---|---|---|---|---|---|---|---|---|---|---|---|
| 32 | 1 | −1 | 32 | 1 | 1 | 32 | 1 | −1 | 32 | 1 | 1 |
| 33 | 0 | 0 | 33 | 0 | 0 | 33 | 0 | 0 | 33 | 0 | 0 |
| 34 | −1.0932 | 0.89717 | 34 | −0.89717 | 1.0932 | 34 | 0.89717 | 1.0932 | 34 | 1.0932 | 0.89717 |
| 35 | 0 | 0 | 35 | 0 | 0 | 35 | 0 | 0 | 35 | 0 | 0 |
| 36 | 1.3066 | −0.5412 | 36 | 1.3066 | 0.5412 | 36 | 1.3066 | −0.5412 | 36 | 1.3066 | 0.5412 |
| 37 | 0 | 0 | 37 | 0 | 0 | 37 | 0 | 0 | 37 | 0 | 0 |
| 38 | −1.4074 | −0.13862 | 38 | 0.13862 | 1.4074 | 38 | −0.13862 | 1.4074 | 38 | 1.4074 | −0.13862 |
| 39 | 0 | 0 | 39 | 0 | 0 | 39 | 0 | 0 | 39 | 0 | 0 |
| 40 | 1 | 1 | 40 | 1 | −1 | 40 | 1 | 1 | 40 | 1 | −1 |
| 41 | 0 | 0 | 41 | 0 | 0 | 41 | 0 | 0 | 41 | 0 | 0 |
| 42 | 0.13862 | −1.4074 | 42 | 1.4074 | −0.13862 | 42 | −1.4074 | −0.13862 | 42 | −0.13862 | −1.4074 |
| 43 | 0 | 0 | 43 | 0 | 0 | 43 | 0 | 0 | 43 | 0 | 0 |
| 44 | −1.3066 | 0.5412 | 44 | −1.3066 | −0.5412 | 44 | −1.3066 | 0.5412 | 44 | −1.3066 | −0.5412 |
| 45 | 0 | 0 | 45 | 0 | 0 | 45 | 0 | 0 | 45 | 0 | 0 |
| 46 | 0.89717 | 1.0932 | 46 | −1.0932 | −0.89717 | 46 | 1.0932 | −0.89717 | 46 | −0.89717 | 1.0932 |
| 47 | 0 | 0 | 47 | 0 | 0 | 47 | 0 | 0 | 47 | 0 | 0 |
| 48 | 1 | −1 | 48 | 1 | 1 | 48 | 1 | −1 | 48 | 1 | 1 |
| 49 | 0 | 0 | 49 | 0 | 0 | 49 | 0 | 0 | 49 | 0 | 0 |
| 50 | −0.89717 | −1.0932 | 50 | 1.0932 | 0.89717 | 50 | −1.0932 | 0.89717 | 50 | 0.89717 | −1.0932 |
| 51 | 0 | 0 | 51 | 0 | 0 | 51 | 0 | 0 | 51 | 0 | 0 |
| 52 | −1.3066 | 0.5412 | 52 | −1.3066 | −0.5412 | 52 | −1.3066 | 0.5412 | 52 | −1.3066 | −0.5412 |
| 53 | 0 | 0 | 53 | 0 | 0 | 53 | 0 | 0 | 53 | 0 | 0 |
| 54 | −0.13862 | 1.4074 | 54 | −1.4074 | 0.13862 | 54 | 1.4074 | 0.13862 | 54 | 0.13862 | 1.4074 |
| 55 | 0 | 0 | 55 | 0 | 0 | 55 | 0 | 0 | 55 | 0 | 0 |
| 56 | 1 | 1 | 56 | 1 | −1 | 56 | 1 | 1 | 56 | 1 | −1 |
| 57 | 0 | 0 | 57 | 0 | 0 | 57 | 0 | 0 | 57 | 0 | 0 |
| 58 | 1.4074 | 0.13862 | 58 | −0.13862 | −1.4074 | 58 | 0.13862 | −1.4074 | 58 | −1.4074 | 0.13862 |
| 59 | 0 | 0 | 59 | 0 | 0 | 59 | 0 | 0 | 59 | 0 | 0 |
| 60 | 1.3066 | −0.5412 | 60 | 1.3066 | 0.5412 | 60 | 1.3066 | −0.5412 | 60 | 1.3066 | 0.5412 |
| 61 | 0 | 0 | 61 | 0 | 0 | 61 | 0 | 0 | 61 | 0 | 0 |
| 62 | 1.0932 | −0.89717 | 62 | 0.89717 | −1.0932 | 62 | −0.89717 | −1.0932 | 62 | −1.0932 | −0.89717 |
| 63 | 0 | 0 | 63 | 0 | 0 | 63 | 0 | 0 | 63 | 0 | 0 |

Next, Step S51 or S52 for removing the DC component from the frequency domain in FIG. 16 will hereinafter be described.

Step S51 is used to perform puncturing of the DC component. Only the DC component in Table 15 is changed to the value of 0. In other words, the result of Tables 15 and 16 is shown in the following Table 19, and the result of Tables 17 and 18 is shown in the following Table 20.

For the convenience of description, the following Tables 19 and 20 indicate only the DC components, and the remaining components other than the DC components are omitted from Tables 19 and 20.

TABLE 19

| $m_0 = 1$ | Real | Imag | $m_1 = 17$ | Real | Imag | $m_2 = 19$ | Real | Imag | $m_3 = 35$ | Real | Imag |
|---|---|---|---|---|---|---|---|---|---|---|---|
| 0 | 0 | 0 | 0 | 0 | 0 | 0 | 0 | 0 | 0 | 0 | 0 |

TABLE 20

| $m_0 = 1$ | Real | Imag | $m_1 = 15$ | Real | Imag | $m_2 = 17$ | Real | Imag | $m_3 = 31$ | Real | Imag |
|---|---|---|---|---|---|---|---|---|---|---|---|
| 0 | 0 | 0 | 0 | 0 | 0 | 0 | 0 | 0 | 0 | 0 | 0 |

Step S51 may be explained on the basis of the frequency domain as described above, or may also be explained on the basis of the time domain.

For example, according to this embodiment of the present invention, the sequence with the length of 35 may be denoted by c(n). This "c(n)" sequence corresponds to the time-domain sequence. The DC-puncturing result of the "c(n)" sequence may be denoted by "d(n)".

In this case, the "c(n)" sequence can be represented by $$c(n) = \exp\left(-j\pi M \frac{n(n+1)}{35}\right),$$

and the "d(n)" sequence can be represented by $$\frac{35}{34}\left(c(n) - \sum_{k=0}^{34} c(k)\exp(-j2\pi k \cdot 0/35)\right).$$

If the sequence has the repetition structure in the time domain at step S52, a frequency component alternately occurs in the frequency indexes of the frequency domain. At step S52, in order to prevent the frequency component from existing in the DC component during the sub-carrier mapping, a corresponding sequence is shifted or CS-processed to remove the DC component.

The resultant indexes of Tables 15~18 are adjusted by the above step S52, and the detailed result will herein be omitted for the convenience of description.

After the data process for removing the DC component is completed, another data process S60 for converting the resultant sequence into the time-domain sequence is conducted. If the result of Table 19 is processed by the above step S60, the results of Tables 21 and 22 are acquired. If the result of Table 20 is processed, the results of Tables 23 and 24 can be acquired.

TABLE 21

| $m_0 = 1$ | Real | Imag | $m_1 = 17$ | Real | Imag | $m_2 = 19$ | Real | Imag | $m_3 = 35$ | Real | Imag |
|---|---|---|---|---|---|---|---|---|---|---|---|
| 0 | 0.88215 | 0.11785 | 0 | 0.88215 | 0.11785 | 0 | 1.1179 | 0.11785 | 0 | 1.1179 | 0.11785 |
| 1 | 0.87834 | 0.030695 | 1 | −0.0307 | −0.87834 | 1 | 0.030695 | −0.87834 | 1 | −0.87834 | 0.030695 |
| 2 | 0.82184 | −0.22417 | 2 | 0.82184 | 0.45987 | 2 | 1.0575 | −0.22417 | 2 | 1.0575 | 0.45987 |
| 3 | 0.58926 | −0.58926 | 3 | 0.58926 | −0.58926 | 3 | −0.58926 | −0.58926 | 3 | −0.58926 | −0.58926 |
| 4 | 0.055797 | −0.86696 | 4 | 0.055797 | 1.1027 | 4 | 0.2915 | −0.86696 | 4 | 0.2915 | 1.1027 |
| 5 | −0.69143 | −0.7013 | 5 | 0.7013 | 0.69143 | 5 | −0.7013 | 0.69143 | 5 | 0.69143 | −0.7013 |
| 6 | −1.1179 | 0.11785 | 6 | −1.1179 | 0.11785 | 6 | −0.88215 | 0.11785 | 6 | −0.88215 | 0.11785 |
| 7 | −0.54047 | 1.0242 | 7 | −1.0242 | 0.54047 | 7 | 1.0242 | 0.54047 | 7 | 0.54047 | 1.0242 |
| 8 | 0.64819 | 0.76064 | 8 | 0.64819 | −0.52494 | 8 | 0.8839 | 0.76064 | 8 | 0.8839 | −0.52494 |
| 9 | 0.58926 | −0.58926 | 9 | 0.58926 | −0.58926 | 9 | −0.58926 | −0.58926 | 9 | −0.58926 | −0.58926 |
| 10 | −0.8839 | −0.52494 | 10 | −0.8839 | 0.76064 | 10 | −0.64819 | −0.52494 | 10 | −0.64819 | 0.76064 |
| 11 | −0.54047 | 1.0242 | 11 | −1.0242 | 0.54047 | 11 | 1.0242 | 0.54047 | 11 | 0.54047 | 1.0242 |
| 12 | 0.88215 | 0.11785 | 12 | 0.88215 | 0.11785 | 12 | 1.1179 | 0.11785 | 12 | 1.1179 | 0.11785 |
| 13 | −0.69143 | −0.7013 | 13 | 0.7013 | 0.69143 | 13 | −0.7013 | 0.69143 | 13 | 0.69143 | −0.7013 |
| 14 | −0.2915 | 1.1027 | 14 | −0.2915 | −0.86696 | 14 | −0.0558 | 1.1027 | 14 | −0.0558 | −0.86696 |
| 15 | 0.58926 | −0.58926 | 15 | 0.58926 | −0.58926 | 15 | −0.58926 | −0.58926 | 15 | −0.58926 | −0.58926 |
| 16 | −1.0575 | 0.45987 | 16 | −1.0575 | −0.22417 | 16 | −0.82184 | 0.45987 | 16 | −0.82184 | −0.22417 |
| 17 | 0.87834 | 0.030695 | 17 | −0.0307 | −0.87834 | 17 | 0.030695 | −0.87834 | 17 | −0.87834 | 0.030695 |
| 18 | −1.1179 | 0.11785 | 18 | −1.1179 | 0.11785 | 18 | −0.88215 | 0.11785 | 18 | −0.88215 | 0.11785 |
| 19 | 0.87834 | 0.030695 | 19 | −0.0307 | −0.87834 | 19 | 0.030695 | −0.87834 | 19 | −0.87834 | 0.030695 |
| 20 | −1.0575 | 0.45987 | 20 | −1.0575 | −0.22417 | 20 | −0.82184 | 0.45987 | 20 | −0.82184 | −0.22417 |
| 21 | 0.58926 | −0.58926 | 21 | 0.58926 | −0.58926 | 21 | −0.58926 | −0.58926 | 21 | −0.58926 | −0.58926 |
| 22 | −0.2915 | 1.1027 | 22 | −0.2915 | −0.86696 | 22 | −0.0558 | 1.1027 | 22 | −0.0558 | −0.86696 |
| 23 | −0.69143 | −0.7013 | 23 | 0.7013 | 0.69143 | 23 | −0.7013 | 0.69143 | 23 | 0.69143 | −0.7013 |
| 24 | 0.88215 | 0.11785 | 24 | 0.88215 | 0.11785 | 24 | 1.1179 | 0.11785 | 24 | 1.1179 | 0.11785 |
| 25 | −0.54047 | 1.0242 | 25 | −1.0242 | 0.54047 | 25 | 1.0242 | 0.54047 | 25 | 0.54047 | 1.0242 |
| 26 | −0.8839 | −0.52494 | 26 | −0.8839 | 0.76064 | 26 | −0.64819 | −0.52494 | 26 | −0.64819 | 0.76064 |
| 27 | 0.58926 | −0.58926 | 27 | 0.58926 | −0.58926 | 27 | −0.58926 | −0.58926 | 27 | −0.58926 | −0.58926 |
| 28 | 0.64819 | 0.76064 | 28 | 0.64819 | −0.52494 | 28 | 0.8839 | 0.76064 | 28 | 0.8839 | −0.52494 |
| 29 | −0.54047 | 1.0242 | 29 | −1.0242 | 0.54047 | 29 | 1.0242 | 0.54047 | 29 | 0.54047 | 1.0242 |
| 30 | −1.1179 | 0.11785 | 30 | −1.1179 | 0.11785 | 30 | −0.88215 | 0.11785 | 30 | −0.88215 | 0.11785 |
| 31 | −0.69143 | −0.7013 | 31 | 0.7013 | 0.69143 | 31 | −0.7013 | 0.69143 | 31 | 0.69143 | −0.7013 |
| 32 | 0.055797 | −0.86696 | 32 | 0.055797 | 1.1027 | 32 | 0.2915 | −0.86696 | 32 | 0.2915 | 1.1027 |
| 33 | 0.58926 | −0.58926 | 33 | 0.58926 | −0.58926 | 33 | −0.58926 | −0.58926 | 33 | −0.58926 | −0.58926 |
| 34 | 0.82184 | −0.22417 | 34 | 0.82184 | 0.45987 | 34 | 1.0575 | −0.22417 | 34 | 1.0575 | 0.45987 |
| 35 | 0.87834 | 0.030695 | 35 | −0.0307 | −0.87834 | 35 | 0.030695 | −0.87834 | 35 | −0.87834 | 0.030695 |

TABLE 22

| $m_0 = 1$ | Real | Imag | $m_1 = 17$ | Real | Imag | $m_2 = 19$ | Real | Imag | $m_3 = 35$ | Real | Imag |
|---|---|---|---|---|---|---|---|---|---|---|---|
| 36 | 0.88215 | 0.11785 | 36 | 0.88215 | 0.11785 | 36 | 1.1179 | 0.11785 | 36 | 1.1179 | 0.11785 |
| 37 | 0.87834 | 0.030695 | 37 | −0.0307 | −0.87834 | 37 | 0.030695 | −0.87834 | 37 | −0.87834 | 0.030695 |
| 38 | 0.82184 | −0.22417 | 38 | 0.82184 | 0.45987 | 38 | 1.0575 | −0.22417 | 38 | 1.0575 | 0.45987 |
| 39 | 0.58926 | −0.58926 | 39 | 0.58926 | −0.58926 | 39 | −0.58926 | −0.58926 | 39 | −0.58926 | −0.58926 |
| 40 | 0.055797 | −0.86696 | 40 | 0.055797 | 1.1027 | 40 | 0.2915 | −0.86696 | 40 | 0.2915 | 1.1027 |
| 41 | −0.69143 | −0.7013 | 41 | 0.7013 | 0.69143 | 41 | −0.7013 | 0.69143 | 41 | 0.69143 | −0.7013 |

TABLE 22-continued

| $m_0 = 1$ | Real | Imag | $m_1 = 17$ | Real | Imag | $m_2 = 19$ | Real | Imag | $m_3 = 35$ | Real | Imag |
|---|---|---|---|---|---|---|---|---|---|---|---|
| 42 | −1.1179 | 0.11785 | 42 | −1.1179 | 0.11785 | 42 | −0.88215 | 0.11785 | 42 | −0.88215 | 0.11785 |
| 43 | −0.54047 | 1.0242 | 43 | −1.0242 | 0.54047 | 43 | 1.0242 | 0.54047 | 43 | 0.54047 | 1.0242 |
| 44 | 0.64819 | 0.76064 | 44 | 0.64819 | −0.52494 | 44 | 0.8839 | 0.76064 | 44 | 0.8839 | −0.52494 |
| 45 | 0.58926 | −0.58926 | 45 | 0.58926 | −0.58926 | 45 | −0.58926 | −0.58926 | 45 | −0.58926 | −0.58926 |
| 46 | −0.8839 | −0.52494 | 46 | −0.8839 | 0.76064 | 46 | −0.64819 | −0.52494 | 46 | −0.64819 | 0.76064 |
| 47 | −0.54047 | 1.0242 | 47 | −1.0242 | 0.54047 | 47 | 1.0242 | 0.54047 | 47 | 0.54047 | 1.0242 |
| 48 | 0.88215 | 0.11785 | 48 | 0.88215 | 0.11785 | 48 | 1.1179 | 0.11785 | 48 | 1.1179 | 0.11785 |
| 49 | −0.69143 | −0.7013 | 49 | 0.7013 | 0.69143 | 49 | −0.7013 | 0.69143 | 49 | 0.69143 | −0.7013 |
| 50 | −0.2915 | 1.1027 | 50 | −0.2915 | −0.86696 | 50 | −0.0558 | 1.1027 | 50 | −0.0558 | −0.86696 |
| 51 | 0.58926 | −0.58926 | 51 | 0.58926 | −0.58926 | 51 | −0.58926 | −0.58926 | 51 | −0.58926 | −0.58926 |
| 52 | −1.0575 | 0.45987 | 52 | −1.0575 | −0.22417 | 52 | −0.82184 | 0.45987 | 52 | −0.82184 | −0.22417 |
| 53 | 0.87834 | 0.030695 | 53 | −0.0307 | −0.87834 | 53 | 0.030695 | −0.87834 | 53 | −0.87834 | 0.030695 |
| 54 | −1.1179 | 0.11785 | 54 | −1.1179 | 0.11785 | 54 | −0.88215 | 0.11785 | 54 | −0.88215 | 0.11785 |
| 55 | 0.87834 | 0.030695 | 55 | −0.0307 | −0.87834 | 55 | 0.030695 | −0.87834 | 55 | −0.87834 | 0.030695 |
| 56 | −1.0575 | 0.45987 | 56 | −1.0575 | −0.22417 | 56 | −0.82184 | 0.45987 | 56 | −0.82184 | −0.22417 |
| 57 | 0.58926 | −0.58926 | 57 | 0.58926 | −0.58926 | 57 | −0.58926 | −0.58926 | 57 | −0.58926 | −0.58926 |
| 58 | −0.2915 | 1.1027 | 58 | −0.2915 | −0.86696 | 58 | −0.0558 | 1.1027 | 58 | −0.0558 | −0.86696 |
| 59 | −0.69143 | −0.7013 | 59 | 0.7013 | 0.69143 | 59 | −0.7013 | 0.69143 | 59 | 0.69143 | −0.7013 |
| 60 | 0.88215 | 0.11785 | 60 | 0.88215 | 0.11785 | 60 | 1.1179 | 0.11785 | 60 | 1.1179 | 0.11785 |
| 61 | −0.54047 | 1.0242 | 61 | −1.0242 | 0.54047 | 61 | 1.0242 | 0.54047 | 61 | 0.54047 | 1.0242 |
| 62 | −0.8839 | −0.52494 | 62 | −0.8839 | 0.76064 | 62 | −0.64819 | −0.52494 | 62 | −0.64819 | 0.76064 |
| 63 | 0.58926 | −0.58926 | 63 | 0.58926 | −0.58926 | 63 | −0.58926 | −0.58926 | 63 | −0.58926 | −0.58926 |
| 64 | 0.64819 | 0.76064 | 64 | 0.64819 | −0.52494 | 64 | 0.8839 | 0.76064 | 64 | 0.8839 | −0.52494 |
| 65 | −0.54047 | 1.0242 | 65 | −1.0242 | 0.54047 | 65 | 1.0242 | 0.54047 | 65 | 0.54047 | 1.0242 |
| 66 | −1.1179 | 0.11785 | 66 | −1.1179 | 0.11785 | 66 | −0.88215 | 0.11785 | 66 | −0.88215 | 0.11785 |
| 67 | −0.69143 | −0.7013 | 67 | 0.7013 | 0.69143 | 67 | −0.7013 | 0.69143 | 67 | 0.69143 | −0.7013 |
| 68 | 0.055797 | −0.86696 | 68 | 0.055797 | 1.1027 | 68 | 0.2915 | −0.86696 | 68 | 0.2915 | 1.1027 |
| 69 | 0.58926 | −0.58926 | 69 | 0.58926 | −0.58926 | 69 | −0.58926 | −0.58926 | 69 | −0.58926 | −0.58926 |
| 70 | 0.82184 | −0.22417 | 70 | 0.82184 | 0.45987 | 70 | 1.0575 | −0.22417 | 70 | 1.0575 | 0.45987 |
| 71 | 0.87834 | 0.030695 | 71 | −0.0307 | −0.87834 | 71 | 0.030695 | −0.87834 | 71 | −0.87834 | 0.030695 |

TABLE 23

| $m_0 = 1$ | Real | Imag | $m_1 = 15$ | Real | Imag | $m_2 = 17$ | Real | Imag | $m_3 = 31$ | Real | Imag |
|---|---|---|---|---|---|---|---|---|---|---|---|
| 0 | 0.875 | 0.125 | 0 | 0.875 | −0.125 | 0 | 0.875 | 0.125 | 0 | 0.875 | −0.125 |
| 1 | 0.87018 | 0.026983 | 1 | −0.02698 | −1.1202 | 1 | −0.22302 | −0.87018 | 1 | −1.1202 | −0.22302 |
| 2 | 0.79888 | −0.25768 | 2 | 0.79888 | 0.25768 | 2 | 0.79888 | −0.25768 | 2 | 0.79888 | 0.25768 |
| 3 | 0.50939 | −0.64801 | 3 | 0.64801 | −0.75939 | 3 | −0.89801 | −0.50939 | 3 | −0.75939 | −0.89801 |
| 4 | −0.125 | −0.875 | 4 | −0.125 | 0.875 | 4 | −0.125 | −0.875 | 4 | −0.125 | 0.875 |
| 5 | −0.89801 | −0.50939 | 5 | 0.50939 | 0.64801 | 5 | −0.75939 | 0.89801 | 5 | 0.64801 | −0.75939 |
| 6 | −1.0489 | 0.50768 | 6 | −1.0489 | −0.50768 | 6 | −1.0489 | 0.50768 | 6 | −1.0489 | −0.50768 |
| 7 | −0.02698 | 1.1202 | 7 | −1.1202 | −0.22302 | 7 | 0.87018 | 0.026983 | 7 | −0.22302 | 0.87018 |
| 8 | 0.875 | 0.125 | 8 | 0.875 | −0.125 | 8 | 0.875 | 0.125 | 8 | 0.875 | −0.125 |
| 9 | −0.22302 | −0.87018 | 9 | 0.87018 | −0.02698 | 9 | −1.1202 | 0.22302 | 9 | −0.02698 | −1.1202 |
| 10 | −1.0489 | 0.50768 | 10 | −1.0489 | −0.50768 | 10 | −1.0489 | 0.50768 | 10 | −1.0489 | −0.50768 |
| 11 | 0.64801 | 0.75939 | 11 | −0.75939 | −0.89801 | 11 | 0.50939 | −0.64801 | 11 | −0.89801 | 0.50939 |
| 12 | −0.125 | −0.875 | 12 | −0.125 | 0.875 | 12 | −0.125 | −0.875 | 12 | −0.125 | 0.875 |
| 13 | −0.75939 | 0.89801 | 13 | −0.89801 | 0.50939 | 13 | 0.64801 | 0.75939 | 13 | 0.50939 | 0.64801 |
| 14 | 0.79888 | −0.25768 | 14 | 0.79888 | 0.25768 | 14 | 0.79888 | −0.25768 | 14 | 0.79888 | 0.25768 |
| 15 | −1.1202 | 0.22302 | 15 | −0.22302 | 0.87018 | 15 | −0.02698 | 1.1202 | 15 | 0.87018 | −0.02698 |
| 16 | 0.875 | 0.125 | 16 | 0.875 | −0.125 | 16 | 0.875 | 0.125 | 16 | 0.875 | −0.125 |
| 17 | −1.1202 | 0.22302 | 17 | −0.22302 | 0.87018 | 17 | −0.02698 | 1.1202 | 17 | 0.87018 | −0.02698 |
| 18 | 0.79888 | −0.25768 | 18 | 0.79888 | 0.25768 | 18 | 0.79888 | −0.25768 | 18 | 0.79888 | 0.25768 |
| 19 | −0.75939 | 0.89801 | 19 | −0.89801 | 0.50939 | 19 | 0.64801 | 0.75939 | 19 | 0.50939 | 0.64801 |
| 20 | −0.125 | −0.875 | 20 | −0.125 | 0.875 | 20 | −0.125 | −0.875 | 20 | −0.125 | 0.875 |
| 21 | 0.64801 | 0.75939 | 21 | −0.75939 | −0.89801 | 21 | 0.50939 | −0.64801 | 21 | −0.89801 | 0.50939 |
| 22 | −1.0489 | 0.50768 | 22 | −1.0489 | −0.50768 | 22 | −1.0489 | 0.50768 | 22 | −1.0489 | −0.50768 |
| 23 | −0.22302 | −0.87018 | 23 | 0.87018 | −0.02698 | 23 | −1.1202 | 0.22302 | 23 | −0.02698 | −1.1202 |
| 24 | 0.875 | 0.125 | 24 | 0.875 | −0.125 | 24 | 0.875 | 0.125 | 24 | 0.875 | −0.125 |
| 25 | −0.02698 | 1.1202 | 25 | −1.1202 | −0.22302 | 25 | 0.87018 | 0.026983 | 25 | −0.22302 | 0.87018 |
| 26 | −1.0489 | 0.50768 | 26 | −1.0489 | −0.50768 | 26 | −1.0489 | 0.50768 | 26 | −1.0489 | −0.50768 |
| 27 | −0.89801 | −0.50939 | 27 | 0.50939 | 0.64801 | 27 | −0.75939 | 0.89801 | 27 | 0.64801 | −0.75939 |
| 28 | −0.125 | −0.875 | 28 | −0.125 | 0.875 | 28 | −0.125 | −0.875 | 28 | −0.125 | 0.875 |
| 29 | 0.50939 | −0.64801 | 29 | 0.64801 | −0.75939 | 29 | −0.89801 | −0.50939 | 29 | −0.75939 | −0.89801 |
| 30 | 0.79888 | −0.25768 | 30 | 0.79888 | 0.25768 | 30 | 0.79888 | −0.25768 | 30 | 0.79888 | 0.25768 |
| 31 | 0.87018 | 0.026983 | 31 | −0.02698 | −1.1202 | 31 | −0.22302 | −0.87018 | 31 | −1.1202 | −0.22302 |

TABLE 24

| $m_0 = 1$ | Real | Imag | $m_1 = 15$ | Real | Imag | $m_2 = 17$ | Real | Imag | $m_3 = 31$ | Real | Imag |
|---|---|---|---|---|---|---|---|---|---|---|---|
| 32 | 0.875 | 0.125 | 32 | 0.875 | −0.125 | 32 | 0.875 | 0.125 | 32 | 0.875 | −0.125 |
| 33 | 0.87018 | 0.026983 | 33 | −0.02698 | −1.1202 | 33 | −0.22302 | −0.87018 | 33 | −1.1202 | −0.22302 |
| 34 | 0.79888 | −0.25768 | 34 | 0.79888 | 0.25768 | 34 | 0.79888 | −0.25768 | 34 | 0.79888 | 0.25768 |
| 35 | 0.50939 | −0.64801 | 35 | 0.64801 | −0.75939 | 35 | −0.89801 | −0.50939 | 35 | −0.75939 | −0.89801 |
| 36 | −0.125 | −0.875 | 36 | −0.125 | 0.875 | 36 | −0.125 | −0.875 | 36 | −0.125 | 0.875 |
| 37 | −0.89801 | −0.50939 | 37 | 0.50939 | 0.64801 | 37 | −0.75939 | 0.89801 | 37 | 0.64801 | −0.75939 |
| 38 | −1.0489 | 0.50768 | 38 | −1.0489 | −0.50768 | 38 | −1.0489 | 0.50768 | 38 | −1.0489 | −0.50768 |
| 39 | −0.02698 | 1.1202 | 39 | −1.1202 | −0.22302 | 39 | 0.87018 | 0.026983 | 39 | −0.22302 | 0.87018 |
| 40 | 0.875 | 0.125 | 40 | 0.875 | −0.125 | 40 | 0.875 | 0.125 | 40 | 0.875 | −0.125 |
| 41 | −0.22302 | −0.87018 | 41 | 0.87018 | −0.02698 | 41 | −1.1202 | 0.22302 | 41 | −0.02698 | −1.1202 |
| 42 | −1.0489 | 0.50768 | 42 | −1.0489 | −0.50768 | 42 | −1.0489 | 0.50768 | 42 | −1.0489 | −0.50768 |
| 43 | 0.64801 | 0.75939 | 43 | −0.75939 | −0.89801 | 43 | 0.50939 | −0.64801 | 43 | −0.89801 | 0.50939 |
| 44 | −0.125 | −0.875 | 44 | −0.125 | 0.875 | 44 | −0.125 | −0.875 | 44 | −0.125 | 0.875 |
| 45 | −0.75939 | 0.89801 | 45 | −0.89801 | 0.50939 | 45 | 0.64801 | 0.75939 | 45 | 0.50939 | 0.64801 |
| 46 | 0.79888 | −0.25768 | 46 | 0.79888 | 0.25768 | 46 | 0.79888 | −0.25768 | 46 | 0.79888 | 0.25768 |
| 47 | −1.1202 | 0.22302 | 47 | −0.22302 | 0.87018 | 47 | −0.02698 | 1.1202 | 47 | 0.87018 | −0.02698 |
| 48 | 0.875 | 0.125 | 48 | 0.875 | −0.125 | 48 | 0.875 | 0.125 | 48 | 0.875 | −0.125 |
| 49 | −1.1202 | 0.22302 | 49 | −0.22302 | 0.87018 | 49 | −0.02698 | 1.1202 | 49 | 0.87018 | −0.02698 |
| 50 | 0.79888 | −0.25768 | 50 | 0.79888 | 0.25768 | 50 | 0.79888 | −0.25768 | 50 | 0.79888 | 0.25768 |
| 51 | −0.75939 | 0.89801 | 51 | −0.89801 | 0.50939 | 51 | 0.64801 | 0.75939 | 51 | 0.50939 | 0.64801 |
| 52 | −0.125 | −0.875 | 52 | −0.125 | 0.875 | 52 | −0.125 | −0.875 | 52 | −0.125 | 0.875 |
| 53 | 0.64801 | 0.75939 | 53 | −0.75939 | −0.89801 | 53 | 0.50939 | −0.64801 | 53 | −0.89801 | 0.50939 |
| 54 | −1.0489 | 0.50768 | 54 | −1.0489 | −0.50768 | 54 | −1.0489 | 0.50768 | 54 | −1.0489 | −0.50768 |
| 55 | −0.22302 | −0.87018 | 55 | 0.87018 | −0.02698 | 55 | −1.1202 | 0.22302 | 55 | −0.02698 | −1.1202 |
| 56 | 0.875 | 0.125 | 56 | 0.875 | −0.125 | 56 | 0.875 | 0.125 | 56 | 0.875 | −0.125 |
| 57 | −0.02698 | 1.1202 | 57 | −1.1202 | −0.22302 | 57 | 0.87018 | 0.026983 | 57 | −0.22302 | 0.87018 |
| 58 | −1.0489 | 0.50768 | 58 | −1.0489 | −0.50768 | 58 | −1.0489 | 0.50768 | 58 | −1.0489 | −0.50768 |
| 59 | −0.89801 | −0.50939 | 59 | 0.50939 | 0.64801 | 59 | −0.75939 | 0.89801 | 59 | 0.64801 | −0.75939 |
| 60 | −0.125 | −0.875 | 60 | −0.125 | 0.875 | 60 | −0.125 | −0.875 | 60 | −0.125 | 0.875 |
| 61 | 0.50939 | −0.64801 | 61 | 0.64801 | −0.75939 | 61 | −0.89801 | −0.50939 | 61 | −0.75939 | −0.89801 |
| 62 | 0.79888 | −0.25768 | 62 | 0.79888 | 0.25768 | 62 | 0.79888 | −0.25768 | 62 | 0.79888 | 0.25768 |
| 63 | 0.87018 | 0.026983 | 63 | −0.02698 | −1.1202 | 63 | −0.22302 | −0.87018 | 63 | −1.1202 | −0.22302 |

FIG. 17 shows the comparison in constellation map between a sequence having no DC component and the other sequence having the DC component according to the present invention.

In more detail, if the mother sequence index ($m_0$) is "1", the 2×-repetition result of the sequence with the length of 36 is shown in FIG. 17(a), and the 2×-repetition result of the sequence with the length of 32 is shown in FIG. 17(b).

In this case, each of the above-mentioned two cases FIG. 17(a) and FIG. 17(b) includes only 12 constellations. Although the DC puncturing is performed, the constellation location is shifted by the punctured value, so that 12 fixed constellations are maintained.

The above-mentioned characteristics with the less number of constellations can greatly reduce the number of calculations associated with the correlation function of the reception end.

Figure 18:
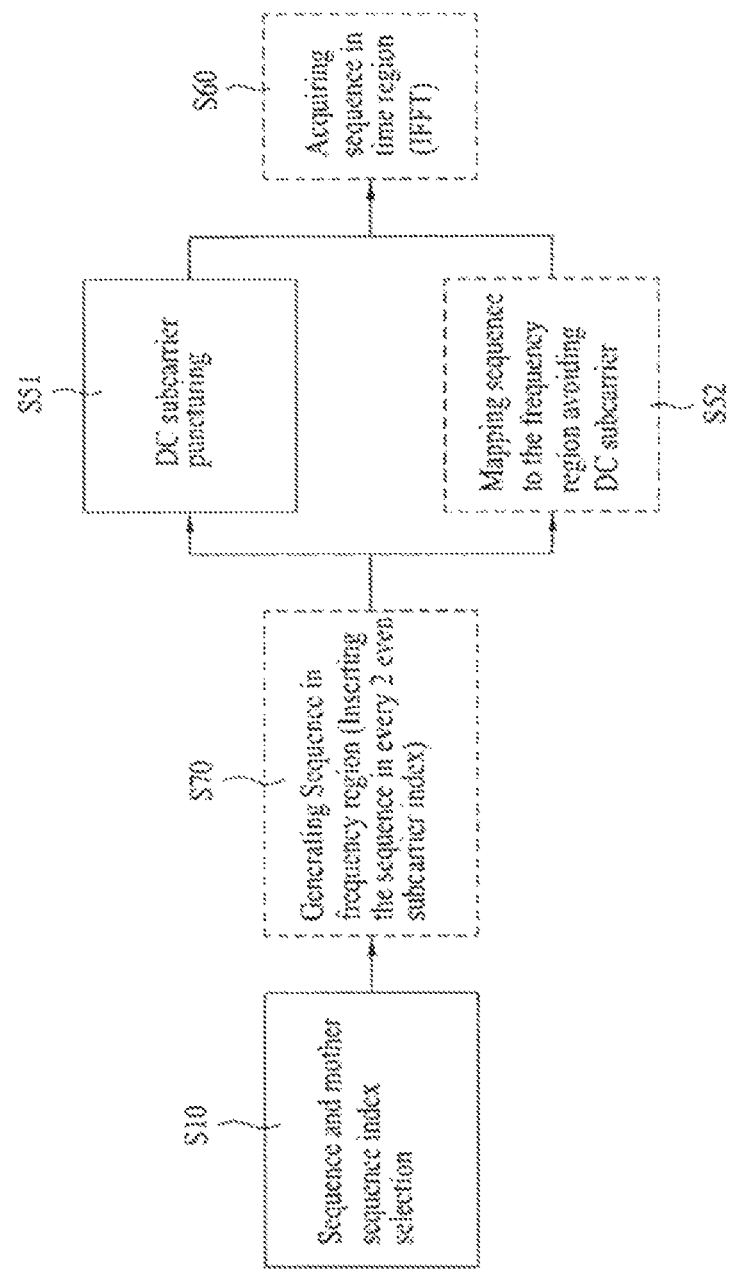
FIG. 18 is a conceptual diagram illustrating a method for designing a sequence in a frequency domain so that the 2× repetition structure in a time domain is formed according to the present invention.

FIG. 18 is a conceptual diagram illustrating a method for designing a sequence in a frequency domain so that the 2×-repetition structure in a time domain is formed according to the present invention.

The Zadoff-Chu sequence maintains ideal correlation characteristics in the time domain and the frequency domain. Therefore, the sequence may be generated in the time domain, or may also be generated in the frequency domain.

In other words, if the Zadoff-Chu sequence is inserted into the frequency domain, and the sequence is inserted into the even-th frequency index at intervals of two partitions (i.e., two spaces), there is acquired the same result as in the above case in which the sequence generated in the time domain is mapped to the time domain.

Additional description of the step S10 of FIG. 16 will hereinafter be described. The method for selecting multiple sequence indexes is equal to a method for easily calculating the cross-correlation using the reception end.

However, the Zadoff-Chu sequence basically serves as the polyphase sequence, so that it is vulnerable to the frequency offset.

Therefore, it is preferable that the sequence may be selected in consideration of the frequency offset in the sequence selection step.

In other words, if three sequences are selected without consideration of the frequency offset according to Equation 18, the present invention may have difficulty in searching for a correct correlation value according to the frequency offset. In this case, two sequence indexes from among three sequence indexes may be decided by Equation 18, and the remaining one sequence index may be decided in consideration of the frequency-offset characteristics.

In conclusion, in the case of selecting a plurality of sequence indexes, only Equation 18 may be considered, and the frequency-offset characteristics may also be considered along with Equation 18.

The above-mentioned concept relates to a plurality of sequence indexes in consideration of the frequency offset. A method for additionally considering other criterions other than the frequency offset will hereinafter be described.

Next, a method for considering the sequence index in additionally considering the correlation characteristics will hereinafter be described.

Figure 19:
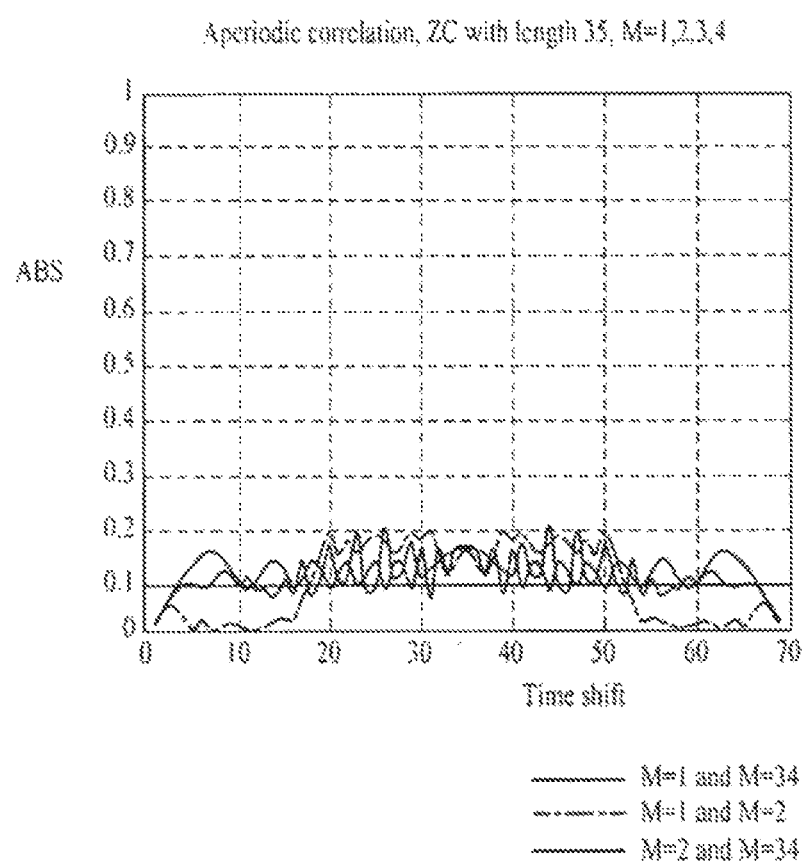
FIGS. 19 and 20 are graphs illustrating cross-correlation characteristics of the set of (1, 2, 34) indexes according to the present invention.

For example, the Zadoff-Chu sequence serves as a CAZAC sequence, so that it is preferable that a specific sequence having ideal auto-correlation characteristics and superior cross-correlation characteristics may be selected. For example, if the length is 35, the set of three sequences (1, 2, 34) or (1, 33, 34) may be selected in consideration of Equation 19, the frequency-offset characteristics, and the PAPR characteristics. The cross-correlation characteristics of the index set (1, 2, 34) is shown in FIG. 19.

Next, the characteristics of the sequence with the length of 35 according to the present invention will hereinafter be described.

Preferably, the sequence with the length 35 may be used for the LTE system.

It is assumed that the SCH signal is transferred to six radio blocks (corresponding to 73 sub-carriers including the DC component).

If the 2×-repetition structure is made in the time domain using the 73 sub-carriers, the sequence with the length 36 can be used. All the cases of the frequency or time domain can be made available. For example, although the sequence is not repeated in the time domain or is repeated three times, all the cases of the frequency or time domain can also be made available.

In this case, the present invention requires the reception end of the (1.08×MHz) interpolator.

However, based on the above-mentioned criterions (i.e., references), an optimum index group is (1, 2, 35). In this case, the cross-correlation is shown in FIG. 20.

Figure 20:
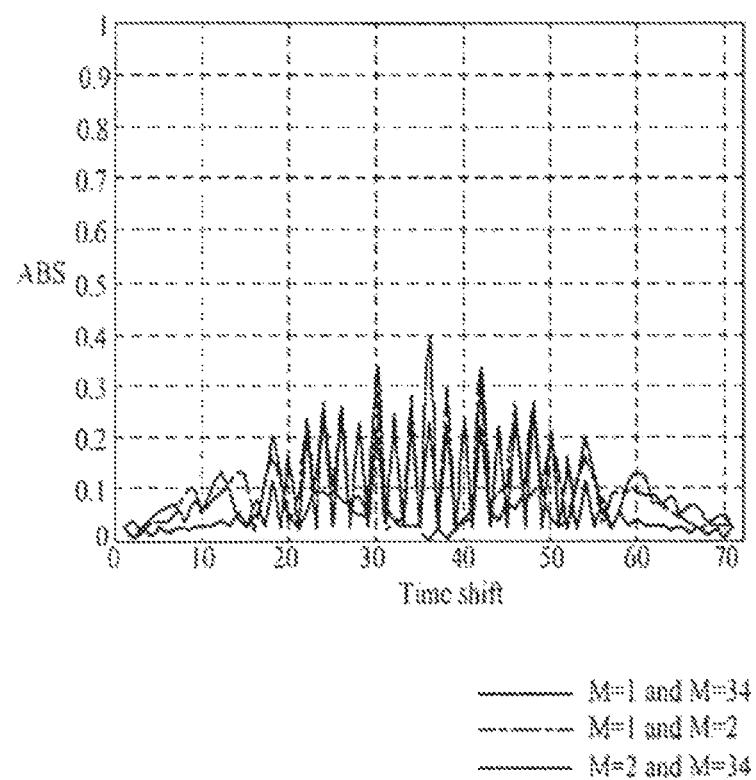

If the worst happens, the index group of FIG. 20 may have the cross-correlation of 40%.

In this case, it is preferable that the present invention may use a sequence with the length shorter than "36".

In this case, it is preferable that the present invention approaches a desired length to be originally generated and at the same time selects the odd-length sequence, so that it is more preferable that the length may be set to 35.

The sequence with the length of 35 may search for the set having correlation characteristics superior to those of the even-length sequence.

For reference, the selection of the sequence index (1,2,34) in FIGS. 19 and 20 relates to the 2×-repetition of the sequence.

When the PSC for the P-SCH is generated, the present invention may use a corresponding sequence without repetition of the sequence after generating the sequence.

It is assumed that the present invention uses three Zadoff-Chu sequences as multiple sequences for the PSC. In this case, the present invention must select two root indexes from among three Zadoff-Chu sequences so that the sum of the two root indexes satisfies "63" in the case of using the sequence with the length 63. As a result, the conjugate symmetry property between corresponding sequences can be satisfied.

And, the remaining one root index other than the two root indexes may be selected using other conditions, and it is preferable that the remaining one root index may be selected in consideration of the above-mentioned frequency offset problem (and/or PAPR (CM)).

Under the above-mentioned assumption, if the frequency-offset sensitivity and/or the PAPR degree for each root index are (is) expressed according to a variety of conditions, the following result can be acquired.

FIG. 21 is a graph illustrating the frequency-offset sensitivity and the CM under a variety of conditions according to the present invention.

Referring to FIG. 21, "Nzc" is indicative of the length of the Zadoff-Chu (ZC) sequence. Case 1 indicates that the ZC sequence with the length 63 is used. Case 2 indicates that the ZC sequence with the length 63 is used according to the circular-extending scheme.

Case 3 indicates that the ZC sequence with the length 64 is used. Case 4 indicates that the ZC sequence with the length 64 is used by a truncated scheme.

In more detail, FIG. 21(a) shows the frequency-offset sensitivity of the above-mentioned cases 1~4, and FIG. 21(b) shows the CM of each of the aforementioned cases 1~4.

Based on the above-mentioned result, the present invention provides a method for selecting the root index set as shown in the following Table 25.

TABLE 25

|  | Case 1 | | | Case 2 | | | Case 3 | | | Case 4 | | |
| --- | --- | --- | --- | --- | --- | --- | --- | --- | --- | --- | --- | --- |
|  | Root index | | | | | | | | | | | |
|  | 34 | 29 | 25 | 34 | 29 | 25 | 29 | 31 | 27 | 31 | 34 | 38 |
| FO sensitivity | 0.20204 | 0.20204 | 0.22885 | 0.18631 | 0.18631 | 0.21613 | 0.37447 | 0.37564 | 0.38151 | 0.16547 | 0.16547 | 0.17942 |
| Raw CM[dB] | 2.2763 | 2.2763 | 2.3062 | 2.2318 | 2.2318 | 2.2179 | 2.9416 | 4.6762 | 4.2103 | 4.2067 | 4.2067 | 2.6442 |
| Mean value of cross-correlation |  | 0.015622 |  |  | 0.015569 |  |  | 0.015185 |  |  | 0.015019 |  |
| Root symmetry with 0.96 MHz sampling rate |  | ○ |  |  | ○ |  |  | X |  |  | ○ |  |

In other words, if the root index of the first sequence, the root index of the second sequence, and the root index of the third sequence are denoted by (x,y,z), (34,29,25) is selected under the Case 1, and (34,29,25) is selected under the Case 2. In the meantime, (29, 31, 27) is selected under the Case 3, and (31, 34, 38) is selected under the Case 4. Except for the root-index set of the Case 3 from among the root-index sets, all the sets, each of which has the above-mentioned conjugate symmetry property, are contained in the sequence selection process.

When the selected root-index set is used as described above, the auto-correlation profile is as follows.

FIGS. 22~25 are graphs illustrating auto-correlation profiles of the individual sets when a root-index set is selected according to the present invention;

In FIGS. 22~25, it is assumed that the 1-part correlation indicates the frequency offset situation of 0.1 ppm, and the 2-part correlation indicates the frequency offset situation of 5.0 ppm. In the case of using the root-index set according to the present invention, it can be recognized that the superior auto-correlation characteristics can be acquired.

In the meantime, a method for transmitting the signal using sequences generated when the root-index set of Case 1 and the ZC sequence with the length of 63 are used will hereinafter be described. In this case, in the root-index set of Case 1, the root index of the first sequence is 34, the root index of the second sequence is 29, and the root index of the third sequence is 25.

If "34", "29", and "25" are used as the root indexes of three sequence combinations, the sum of the root index "34" and "29" is 63 corresponding to the length of the corresponding ZC sequence, so that the above-mentioned conjugate symmetry property is satisfied. Therefore, if the sequence generated by the above root indexes is transmitted as a communication signal, the reception end can easily calculate the cross-correlation operation using the generated sequence.

In the meantime, provided that either one of root indexes from among the above-mentioned root-index set is selected so that the sequence with the length 62 is generated, a method for mapping the generated sequence to the frequency-domain resource element will hereinafter be described.

Figure 26:
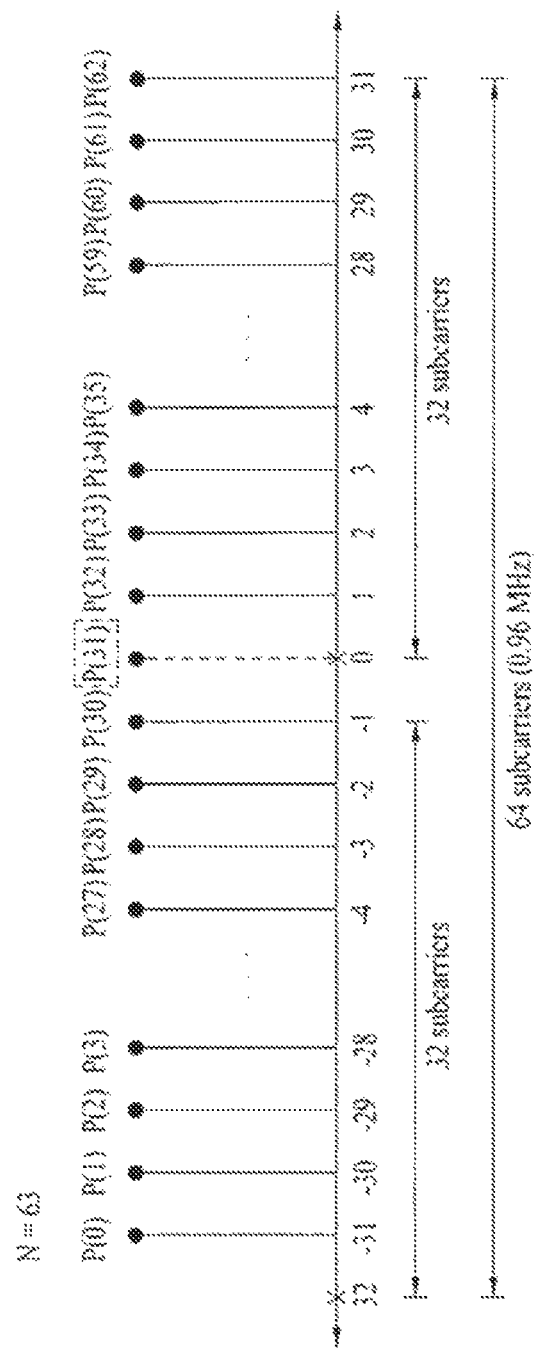
FIG. 26 is a conceptual diagram illustrating a method for mapping the sequence with the length of 63 to a frequency-domain resource element according to the present invention.

FIG. 26 is a conceptual diagram illustrating a method for mapping the sequence with the length of 63 to a frequency-domain resource element according to the present invention.

After the sequence with the length 63 is generated, the present invention continuously maps the generated sequence to the frequency resource element in order to maintain the ZC-sequence characteristics, as much as possible, indicating that the ZC sequence has a constant amplitude in the time and frequency domains, and a detailed description thereof will hereinafter be described.

As can be seen from FIG. 26, in the Zadoff-Chu (ZC) sequence with the length of 63, components corresponding to "P(0)~P(30)" are continuously mapped to resource elements from a frequency resource element with a frequency resource element index of "−31" to a frequency resource element with a frequency resource element index of "−1", and components corresponding to "P(32)~P(62)" are continuously mapped to resource elements from a frequency resource element with a frequency resource element index of "1" to a frequency resource element with a frequency resource element index of "31". Under the above-mentioned mapping operation, the 32-th element (i.e., P(31)) of the generated sequence is mapped to the part of the frequency "0".

Therefore, this embodiment provides a method for puncturing the "P(31)" part mapped to the part having the frequency "0" as shown in FIG. 26. However, if required, the present invention may also use another method capable of puncturing the part having the frequency "0" during the time-domain transmission.

The sequence mapped to the frequency domain may be converted into the time-domain signal by the IFFT or equivalent operation (e.g., IDFT or IFT), so that it may also be transmitted as the OFDM symbol signal.

The signal transmitted by the above-mentioned embodiments may be received in the reception end, so that the reception end may detect a corresponding signal using the cross-correlation operation. In this case, in the case of using the sequence set having the above-mentioned conjugate symmetry property, the reception end can more easily detect the signal.

Next, the signal detection process of the reception end, i.e. a method for calculating the cross-correlation value, will hereinafter be described.

The Aspect of Reception End

Operations of the reception end will hereinafter be described.

There is a predetermined rule among the Tx sequences generated by the above-mentioned embodiments. So, the reception end can acquire the correlation values of sequences corresponding to the remaining root-sequence indexes using a correlation value of a specific sequence corresponding to a single root-sequence index, instead of calculating the cross-correlation value of all the sequences.

A method for calculating the cross-correlation value according to this embodiment will hereinafter be described. This embodiment calculates the cross-correlation value between the Rx signal and each of the multiple sequences. In this case, the present invention determines several intermediate values generated while the cross-correlation value between the Rx signal and the specific sequence (i.e., the first sequence) is calculated. And, the present invention can calculate not only the cross-correlation value between the Rx signal and the first sequence by the addition or subtraction of the intermediate values, but also another cross-correlation value between the Rx signal and another sequence (i.e., a second sequence).

A variety of cases in which multiple available sequences are selected will be described in detail.

<Case 1>

This example shows a method for calculating the cross-correlation value of the selected sequences, which have the length of 36 and the values $m_0=1$, $m_1=17$, $m_2=19$, $m_3=35$.

The reception end stores the sequence having a sequence index of "1", and calculates the cross-correlation value between the stored sequence and the received sequence. In this case, in the case of using the intermediate results generated when the cross-correlation value between the Rx signal and the sequence having a sequence index "1" is calculated, the cross-correlation value between the Rx signal and the sequence having the sequence index "17" can be calculated, the cross-correlation value between the Rx signal and the sequence having the sequence index "19" can be calculated, and at the same time the cross-correlation value between the Rx signal and the sequence having the sequence index "35" can be calculated.

This example will be described on the basis of a specific case in which the cross-correlation value of the τ-th delay is calculated. In other words, if the Rx signal is denoted by r(n), this example will get described on the basis of the cross-correlation value associated with the d-th delayed sample r(n+d).

In this case, the result of the correlation value of the sequence index "m" is shown in the following equation 22:

$$R^m(d) = \frac{1}{LN} \sum_{n=0}^{LN-1} r(n+d)(a^M(n))^* \quad \text{[Equation 22]}$$

where $m_0=1$, $m_1=17$, $m_2=19$, and $m_3=35$, so that the following relationship can be provided.

$$a^{m0=1}(k) = \exp\left(-j\pi \cdot 1 \cdot \frac{k^2}{36}\right) \quad \text{[Equation 23]}$$

$$a^{m1=17}(k) = \exp\left(-j\pi \cdot 17 \cdot \frac{k^2}{36}\right)$$

$$= \exp\left(-j\pi \cdot (18-1) \cdot \frac{k^2}{36}\right)$$

$$= \exp\left(-j\left(\frac{\pi}{2}k^2 - \frac{\pi}{36}k^2\right)\right)$$

$$= \begin{cases} (a_{even}^{m0=1}(k))^*, & \text{when } k \text{ is even} \\ -j \cdot (a_{odd}^{m0=1}(k))^*, & \text{otherwise} \end{cases}$$

$$a^{m2=19}(k) = \exp\left(-j\pi \cdot 19 \cdot \frac{k^2}{36}\right)$$

$$= \exp\left(-j\pi \cdot (18+1) \cdot \frac{k^2}{36}\right)$$

$$= \exp\left(-j\left(\frac{\pi}{2}k^2 + \frac{\pi}{36}k^2\right)\right)$$

$$= \begin{cases} a_{even}^{m0=1}(k), & \text{when } k \text{ is even} \\ -j \cdot a_{odd}^{m0=1}(k), & \text{otherwise} \end{cases}$$

$$a^{m3=35}(k) = \exp\left(-j\pi \cdot 35 \cdot \frac{k^2}{36}\right)$$

$$= \exp\left(-j\pi \cdot (36-1) \cdot \frac{k^2}{36}\right)$$

$$= \exp\left(-j\left(\pi k^2 - \frac{\pi}{36}k^2\right)\right)$$

$$= \begin{cases} (a_{even}^{m0=1}(k))^*, & \text{when } k \text{ is even} \\ -(a_{odd}^{m0=1}(k))^*, & \text{otherwise} \end{cases}$$

In addition, $a^{m1=17}(k)$ is indicative of a conjugate of $a^{m0=1}(k)$ on the condition that the "k" value is an even number. If the "k" value is an odd number, the real part of $a^{m0=1}(k)$ is replaced with the imaginary part of the same, and the replaced result is multiplied by the value "−1".

Also, $a^{m2=19}(k)$ is indicative of a conjugate of $a^{m0=1}(k)$ on the condition that the "k" value is an even number. If the "k" value is an odd number, $a^{m2=19}(k)$ is indicative of a conjugate of the result acquired when the real part is replaced with the imaginary part.

$a^{m3=35}(k)$ is acquired when the value "−1" is multiplied by only the real part of $a^{m0=1}(k)$ on the condition that the "k" value is an even number. If the "k" value is an odd number, $a^{m3=35}(k)$ is equal to a conjugate symmetry property of $a^{m0=1}(k)$.

The Rx signal r(k+d) can be calculated using an instantaneous correlation value of each sequence in association with "r_i(k+d)+jr_q(k+d)". In this case, "r_i( )" is indicative of a real part of the Rx signal, and the "r_q( )" is indicative of an imaginary part of the Rx signal.

For the convenience of description, the cross-correlation value of the Rx signal (i.e., the cross-correlation value between the Rx signal and the known sequence of the reception end) can be defined as follows.

For the convenience of description, the cross-correlation value $\Sigma r(2l+d)(a^{m0=1}(k)(2l))^*$ between the known sequence of the reception end and the even-th sequence of the Rx signal is divided into a real part and an imaginary part, as represented by the following equation 24:

$$\sum_{l=0}^{17} r(2l+d)(a^{m0=1}(2l))^* = \quad \text{[Equation 24]}$$

$$(\text{Reven\_i\_i} + \text{Reven\_q\_q}) + j(-\text{Ieven\_i\_q} + \text{Ieven\_q\_i}) =$$

$$Reven^0 + jIeven^0$$

The result of Equation 24 may be divided into a real part (hereinafter referred to as "Reven(0)") and an imaginary part (hereinafter referred to as "Ieven(0)").

If the cross-correlation value associated with the odd-th sequence of the Rx signal is divided into a real part and an imaginary part, the following equation 25 can be acquired:

$$\sum_{l=0}^{17} r(2l+1+d)(a^{m0=1}(2l+1))^* = \quad \text{[Equation 25]}$$

$$(\text{Rodd\_i\_i} + \text{Rodd\_q\_q}) + j(-\text{Iodd\_i\_q} + \text{Iodd\_q\_i}) =$$

$$Rodd^0 + jIodd^0$$

The result of Equation 25 may be divided into a real part (hereinafter referred to as "Rodd(0)") and an imaginary part (hereinafter referred to as "Iodd(0)").

If the cross-correlation value $\Sigma r(2l+d)(a^{m0=1}(k)(2l))$ associated with the even-th sequence of the Rx signal's conjugate is divided into a real part and an imaginary part, the following equation 26 can be acquired:

$$\sum_{l=0}^{17} r(2l+d)a^{m\,0=1}(2l) = \quad \text{[Equation 26]}$$

$$(\text{Reven\_i\_i} - \text{Reven\_q\_q}) + j(\text{Ieven\_i\_q} + \text{Ieven\_q\_i}) =$$

$$Reven^1 + jIeven^1$$

The result of Equation 26 may be divided into a real part (hereinafter referred to as "Reven(1)") and an imaginary part (hereinafter referred to as "Ieven(1)").

If the cross-correlation value $\Sigma r(2l+d)(a^{m0=1}(2l+1))$ associated with the odd-th sequence of the Rx signal's conjugate is divided into a real part and an imaginary part, the following equation 27 can be acquired:

$$\sum_{l=0}^{17} r(2l+1+d)a^{m\,0=1}(2l+1) = \quad \text{[Equation 27]}$$

$$(\text{Rodd\_i\_i} - \text{Rodd\_q\_q}) + j(\text{Iodd\_i\_q} + \text{Iodd\_q\_i}) =$$

$$Rodd^1 + jIodd^1$$

The result of Equation 27 may be divided into a real part (hereinafter referred to as "Rodd(1)") and an imaginary part (hereinafter referred to as "Iodd(1)").

In this case, the calculation of the values "Reven0", "Ieven0", "Rodd0", "Iodd0", "Reven1", "Ieven1", "Rodd1", and "Iodd1" may be considered to be equal to the calculation of the values "Reven_i_i", "Revenq_q", "Ieven_i_q", "Ieven_q_i", "Rodd_i_i", "Rodd_q_q", "Iodd_i_q", and "Iodd_q_i" shown in Equations 24-27.

The method for calculating the above-mentioned values "Reven_i_i", "Revenq_q", "Ieven_i_q", "Ieven_q_i", "Rodd_i_i", "Rodd_q_q", "Iodd_i_q", and "Iodd_q_i" will hereinafter be described with reference to the following equation 28:

[Equation 28]

$$\begin{aligned}
Reven\_i\_i =\ & r\_i(0+d)*1 + r\_i(2+d)*0.93969 + \\
& r\_i(4+d)*0.17365 + r\_i(6+d)*(-1) + \\
& r\_i(8+d)*0.76604 + r\_i(10+d)*(-0.76604) + \\
& r\_i(12+d)*1 + r\_i(14+d)*(-0.17365) + \\
& r\_i(16+d)*(-0.93969) + r\_i(18+d)*(-1) + \\
& r\_i(20+d)*(-0.93969) + r\_i(22+d)*(-0.17365) + \\
& r\_i(24+d)*1 + r\_i(26+d)*(-0.76604) + \\
& r\_i(28+d)*0.76604 + r\_i(30+d)*(-1) + \\
& r\_i(32+d)*0.17365 + r\_i(34+d)*0.93969 = \\
& \{r\_i(0+d) - r\_i(6+d) + r\_i(12+d) - \\
& r\_i(18+d) + r\_i(24+d) - r\_i(30+d)\} + \\
& \{r\_i(2+d) - r\_i(16+d) - r\_i(20+d) + r\_i(34+d)\}* \\
& 0.93969 + \\
& \{r\_i(4+d) - r\_i(14+d) - r\_i(22+d) + r\_i(32+d)\}* \\
& 0.17365 + \{r\_i(8+d) - r\_i(10+d) - \\
& r\_i(26+d) + r\_i(28+d)\}*0.76604
\end{aligned}$$

$$\begin{aligned}
Reven\_q\_q =\ & r\_q(0+d)*0 + r\_q(2+d)*(-0.34202) + \\
& r\_q(4+d)*(-0.98481) + r\_q(6+d)*0 + \\
& r\_q(8+d)*0.64279 + r\_q(10+d)*(-0.64279) + \\
& r\_q(12+d)*0 + r\_q(14+d)*0.98481 + \\
& r\_q(16+d)*0.34202 + r\_q(18+d)*0 + \\
& r\_q(20+d)*0.34202 + r\_q(22+d)*0.98481 + \\
& r\_q(24+d)*0 + r\_q(26+d)*(-0.64279) + \\
& r\_q(28+d)*0.64279 + r\_q(30+d)*0 + \\
& r\_q(32+d)*(-0.98481) + \\
& r\_q(34+d)*(-0.34202) = \\
& \{-r\_q(2+d) + r\_q(16+d) + r\_q(20+d) - \\
& r\_q(34+d)\}*0.34202 + \\
& \{-r\_q(4+d) + r\_q(14+d) + r\_q(22+d) - \\
& r\_q(32+d)\}*0.98481 + \\
& \{r\_q(8+d) - r\_q(10+d) - r\_q(26+d) + \\
& r\_q(28+d)\}*0.64279
\end{aligned}$$

$$\begin{aligned}
Ieven\_i\_q =\ & r\_i(0+d)*0 + r\_i(2+d)*(-0.34202) + \\
& r\_i(4+d)*(-0.98481) + r\_i(6+d)*0 + \\
& r\_i(8+d)*0.64279 + r\_i(10+d)*(-0.64279) + \\
& r\_i(12+d)*0 + r\_i(14+d)*0.98481 + \\
& r\_i(16+d)*0.34202 + r\_i(18+d)*0 + \\
& r\_i(20+d)*0.34202 + r\_i(22+d)*0.98481 + \\
& r\_i(24+d)*0 + r\_i(26+d)*(-0.64279) + \\
& r\_i(28+d)*0.64279 + r\_i(30+d)*r\_i(32+d)* \\
& (-0.98481) + r\_i(34+d)*(-0.34202) = \\
& \{-r\_i(2+d) + r\_i(16+d) + r\_i(20+d) - r\_i(34+d)\}* \\
& 0.34202 + \{-r\_i(4+d) + r\_i(14+d) + \\
& r\_i(22+d) - r\_i(32+d)\}*0.98481 + \\
& \{r\_i(8+d) - r\_i(10+d) - r\_i(26+d) + r\_i(28+d)\}* \\
& 0.64279
\end{aligned}$$

$$\begin{aligned}
Ieven\_q\_i =\ & r\_q(0+d)*1 + r\_q(2+d)*0.93969 + \\
& r\_q(4+d)*0.17365 + r\_q(6+d)*(-1) + \\
& r\_q(8+d)*0.76604 + r\_q(10+d)*(-0.76604) + \\
& r\_q(12+d)*1 + r\_q(14+d)*(-0.17365) + \\
& r\_q(16+d)*(-0.93969) + \\
& r\_q(18+d)*(-1) + r\_q(20+d)*(-0.93969) + \\
& r\_q(22+d)*(-0.17365) + \\
& r\_q(24+d)*1 + r\_q(26+d)*(-0.76604) + \\
& r\_q(28+d)*0.76604 + r\_q(30+d)*(-1) + \\
& r\_q(32+d)*0.17365 + r\_q(34+d)*0.93969 = \\
& \{r\_q(0+d) - r\_q(6+d) + r\_q(12+d) - \\
& r\_q(18+d) + r\_q(24+d) - r\_q(30+d)\} + \\
& \{r\_q(2+d) - r\_q(16+d) - r\_q(20+d) + \\
& r\_q(34+d)\}*0.93969 + \\
& \{r\_q(4+d) - r\_q(14+d) - r\_q(22+d) + \\
& r\_q(32+d)\}*0.17365 + \\
& \{r\_q(8+d) - r\_q(10+d) - r\_q(26+d) + \\
& r\_q(28+d)\}*0.76604
\end{aligned}$$

$$\begin{aligned}
Rodd\_i\_i =\ & r\_i(1+d)*0.99619 + r\_i(3+d)*0.70711 + \\
& r\_i(5+d)*(-0.57358) + r\_i(7+d)*(-0.42262) + \\
& r\_i(9+d)*0.70711 + r\_i(11+d)*(-0.42262) + \\
& r\_i(13+d)*(-0.57358) + r\_i(15+d)*0.70711 + \\
& r\_i(17+d)*0.99619 + r\_i(19+d)*0.99619 + \\
& r\_i(21+d)*0.70711 + r\_i(23+d)*(-0.57358) + \\
& r\_i(25+d)*(-0.42262) + r\_i(27+d)*0.70711 + \\
& r\_i(29+d)*(-0.42262) + r\_i(31+d)*(-0.57358) + \\
& r\_i(33+d)*0.70711 + r\_i(35+d)*0.99619 = \\
& \{r\_i(1+d) + r\_i(17+d) + r\_i(19+d) + r\_i(35+d)\}* \\
& 0.99619 + \\
& \{r\_i(3+d) + r\_i(9+d) + r\_i(15+d) + r\_i(21+d) + \\
& r\_i(27+d) + r\_i(33+d)\}*0.70711 + \\
& \{-r\_i(5+d) - r\_i(13+d) - r\_i(23+d) - r\_i(31+d)\}* \\
& 0.57358 + \{-r\_i(7+d) - r\_i(11+d) - \\
& r\_i(25+d) - r\_i(29+d)\}*0.42262
\end{aligned}$$

$$\begin{aligned}
Rodd\_q\_q =\ & r\_q(1+d)*(-0.087156) + \\
& r\_q(3+d)*(-0.70711) + r\_q(5+d)*(-0.81915) + \\
& r\_q(7+d)*0.90631 + r\_q(9+d)*(-0.70711) + \\
& r\_q(11+d)*0.90631 + r\_q(13+d)*(-0.81915) + \\
& r\_q(15+d)*(-0.70711) + \\
& r\_q(17+d)*(-0.087156) + r\_q(19+d)* \\
& (-0.087156) + r\_q(21+d)*(-0.70711) + \\
& r\_q(23+d)*(-0.81915) + r\_q(25+d)*0.90631 +
\end{aligned}$$

-continued $$r\_q(27+d)*(-0.70711) + r\_q(29+d)*0.90631 +$$
$$r\_q(31+d)*(-0.81915) + r\_q(33+d)*(-0.70711) +$$
$$r\_q(35+d)*(-0.087156) =$$
$$\{-r\_q(1+d) - r\_q(17+d) - r\_q(19+d) - r\_q(35+d)\}*$$
$$0.087156 +$$
$$\{-r\_q(3+d) - r\_q(9+d) - r\_q(15+d) -$$
$$r\_q(21+d) - r\_q(27+d) - r\_q(33+d)\}*$$
$$0.70711 + \{-r\_q(5+d) - r\_q(13+d) -$$
$$r\_q(23+d) - r\_q(31+d)\}*0.81915 +$$
$$\{r\_q(7+d) + r\_q(11+d) + r\_q(25+d) +$$
$$r\_q(29+d)\}*0.90631$$

$$Iodd\_i\_q = r\_i(1+d)*(-0.087156) +$$
$$r\_i(3+d)*(-0.70711) + r\_i(5+d)*(-0.81915) +$$
$$r\_i(7+d)*0.90631 + r\_i(9+d)*(-0.70711) +$$
$$r\_i(11+d)*0.90631 + r\_i(13+d)*(-0.81915) +$$
$$r\_i(15+d)*(-0.70711) + r\_i(17+d)*(-0.87156) +$$
$$r\_i(19+d)*(-0.087156) + r\_i(21+d)*(-0.70711) +$$
$$r\_i(23+d)*(-0.81915) + r\_i(25+d)*0.90631 +$$
$$r\_i(27+d)*(-0.70711) + r\_i(29+d)*0.90631 +$$
$$r\_i(31+d)*(-0.81915) + r\_i(33+d)*(-0.70711) +$$
$$r\_i(35+d)*(-0.087156) =$$
$$\{-r\_i(1+d) - r\_i(17+d) - r\_i(19+d) - r\_i(35+d)\}*$$
$$0.087156 +$$
$$\{-r\_i(3+d) - r\_i(9+d) - r\_i(15+d) - r\_i(21+d) -$$
$$r\_i(27+d) - r\_i(33+d)\}*0.70711 +$$
$$\{-r\_i(5+d) - r\_i(13+d) - r\_i(23+d) - r\_i(31+d)\}*$$
$$0.81915 + \{r\_i(7+d) + r\_i(11+d) +$$
$$r\_i(25+d) + r\_i(29+d)\}*0.90631$$

$$Iodd\_q\_i = r\_q(1+d)*0.99619 + r\_q(3+d)*0.70711 +$$
$$r\_q(5+d)*(-0.57358) + r\_q(7+d)*(-0.42262) +$$
$$r\_q(9+d)*0.70711 + r\_q(11+d)*(-0.42262) +$$
$$r\_q(13+d)*(-0.57358) + r\_q(15+d)*0.70711 +$$
$$r\_q(17+d)*0.99619 + r\_q(19+d)*0.99619 +$$
$$r\_q(21+d)*0.70711 + r\_q(23+d)*(-0.57358) +$$
$$r\_q(25+d)*(-0.42262) + r\_q(27+d)*0.70711 +$$
$$r\_i(29+d)*(-0.42262) + r\_q(31+d)*(-0.57358) +$$
$$r\_q(33+d)*0.70711 + r\_q(35+d)*0.99619 =$$
$$\{r\_q(1+d) + r\_q(17+d) + r\_q(19+d) + r\_q(35+d)\}*$$
$$0.99619 + \{r\_q(3+d) + r\_q(9+d) + r\_q(15+d) +$$
$$r\_q(21+d) + r\_q(27+d) + r\_q(33+d)\}*$$
$$0.70711 + \{-r\_q(5+d) - r\_q(13+d) -$$
$$r\_q(23+d) - r\_q(31+d)\}*0.57358 +$$
$$\{-r\_q(7+d) - r\_q(11+d) - r\_q(25+d) -$$

-continued $$r\_q(29+d)\}*0.42262$$

The process of Equation 28 can be calculated by approximation. In other words, the calculation of Equation 28 can be easily conducted by quantization.

For example, it is preferable that the above approximation may be conducted in the form of 0.93969→1, 0.17365→0.125(=⅛), 0.76604→0.75(=½+¼), 0.34202→0.375(=¼+⅛), 0.98481→1, 0.64279→0.625(=½+⅛), 0.99619→1, 0.70711→0.75(=½+¼), 0.57358→0.625(=½+⅛), 0.42262→0.375(=¼+⅛), 0.087156→0.125(=⅛), 0.81915→0.875(=1⅛), and 0.90631→0.875(=1⅛).

If the concept of Equation 28 is approximated, the following equation 29 can be acquired:

$$Reven\_i\_i = r\_i(0+d) - r\_i(6+d) + r\_i(12+d) - \quad [\text{Equation 29}]$$
$$r\_i(18+d) + r\_i(24+d) - r\_i(30+d) +$$
$$r\_i(2+d) - r\_i(16+d) - r\_i(20+d) + r\_i(34+d) +$$
$$\{r\_i(4+d) - r\_i(14+d) - r\_i(22+d) + r\_i(32+d)\}*$$
$$0.125 + \{r\_i(8+d) - r\_i(10+d) -$$
$$r\_i(26+d) + r\_i(28+d)\}*0.75$$

$$Reven\_q\_q = \{-r\_q(2+d) + r\_q(16+d) +$$
$$r\_q(20+d) - r\_q(34+d)\}*0.375 +$$
$$\{-r\_q(4+d) + r\_q(14+d) + r\_q(22+d) -$$
$$r\_q(32+d)\} + \{r\_q(8+d) - r\_q(10+d) -$$
$$r\_q(26+d) + r\_q(28+d)\}*0.625$$

$$Ieven\_i\_q = \{-r\_i(2+d) + r\_i(16+d) +$$
$$r\_i(20+d) - r\_i(34+d)\}*0.375 +$$
$$\{-r\_i(4+d) + r\_i(14+d) + r\_i(22+d) -$$
$$r\_i(32+d)\} + \{r\_i(8+d) - r\_i(10+d) -$$
$$r\_i(26+d) + r\_i(28+d)\}*0.625$$

$$Ieven\_q\_i = r\_q(0+d) - r\_q(6+d) + r\_q(12+d) -$$
$$r\_q(18+d) + r\_q(24+d) - r\_q(30+d) +$$
$$r\_q(2+d) - r\_q(16+d) - r\_q(20+d) + r\_q(34+d) +$$
$$\{r\_q(4+d) - r\_q(14+d) - r\_q(22+d) + r\_q(32+d)\}*$$
$$0.125 + \{r\_q(8+d) - r\_q(10+d) -$$
$$r\_q(26+d) + r\_q(28+d)\}*0.75$$

$$Rodd\_i\_i = \{r\_i(1+d) + r\_i(17+d) +$$
$$r\_i(19+d) + r\_i(35+d)\} +$$
$$\{r\_i(3+d) + r\_i(9+d) + r\_i(15+d) + r\_i(21+d) +$$
$$r\_i(27+d) + r\_i(33+d)\}*0.75 +$$
$$\{-r\_i(5+d) - r\_i(13+d) - r\_i(23+d) - r\_i(31+d)\}*$$
$$0.625 + \{-r\_i(7+d) - r\_i(11+d) -$$
$$r\_i(25+d) - r\_i(29+d)\}*0.375$$

$$Rodd\_q\_q = \{-r\_q(1+d) - r\_q(17+d) -$$
$$r\_q(19+d) - r\_q(35+d)\}*0.125 +$$
$$\{-r\_q(3+d) - r\_q(9+d) - r\_q(15+d) -$$

-continued $$r\_q(21+d) - r\_q(27+d) - r\_q(33+d)\} * 0.75 +$$

$$\{-r\_q(5+d) - r\_q(13+d) - r\_q(23+d) -$$

$$r\_q(31+d)\} + \{r\_q(7+d) + r\_q(11+d) +$$

$$r\_q(25+d) + r\_q(29+d)\} * 0.875$$

$$\text{Iodd\_i\_q} = \{-r\_i(1+d) - r\_i(17+d) -$$

$$r\_i(19+d) - r\_i(35+d)\} * 0.125 +$$

$$\{-r\_i(3+d) - r\_i(9+d) - r\_i(15+d) - r\_i(21+d) -$$

$$r\_i(27+d) - r\_i(33+d)\} * 0.75 +$$

$$\{-r\_i(5+d) - r\_i(13+d) - r\_i(23+d) -$$

$$r\_i(31+d) + r\_i(7+d) + r\_i(11+d) +$$

$$r\_i(25+d) + r\_i(29+d)\} * 0.875$$

$$\text{Iodd\_q\_i} = \{r\_q(1+d) + r\_q(17+d) +$$

$$r\_q(19+d) + r\_q(35+d)\} +$$

$$\{r\_q(3+d) + r\_q(9+d) + r\_q(15+d) + r\_q(21+d) +$$

$$r\_q(27+d) + r\_q(33+d)\} * 0.75 +$$

$$\{-r\_q(5+d) - r\_q(13+d) - r\_q(23+d) - r\_q(31+d)\} *$$

$$0.625 +$$

$$\{-r\_q(7+d) - r\_q(11+d) - r\_q(25+d) - r\_q(29+d)\} *$$

$$0.375$$

In this case, it should be noted that the result of Equation 29 is generated by a single known sequence (i.e., a sequence corresponding to the mother sequence index) of the reception end and the Rx signal. Although the reception end must perform the correlation operation associated with all the four PSCs on the condition that a cell transmits either one of the four PSCs, the reception end calculates the values of Equation 29 using only one sequence corresponding to the mother sequence index. Also, the cross-correlation value of all the four PSCs can be calculated using the values of Equation 29.

A method for calculating the cross-correlation value associated with all the four PSCs using the result of Equation 29 is as follows.

$$R^{m0=1}(d) = \qquad \text{[Equation 30]}$$

$$R^{m0=1}_{even}(d) + R^{m0=1}_{odd}(d) = \sum_{l=0}^{17} r(2l+d)(a^{m0=1}(2l))^* +$$

$$\sum_{l=0}^{17} r(2l+1+d)(a^{m0=1}(2l+1))^* =$$

$$(Reven^0 + Rodd^0) + j(Ieven^0 + Iodd^0)$$

$$R^{m1=17}(d) = R^{m1=17}_{even}(d) + R^{m1=17}_{odd}(d) \qquad \text{[Equation 31]}$$

$$= \sum_{l=0}^{17} r(2l+d)(a^{m1=17}(2l))^* +$$

$$\sum_{l=0}^{17} r(2l+1+d)(a^{m1=17}(2l+1))^*$$

$$= \sum_{l=0}^{17} r(2l+d)((a^{m0=1}(2l))^*)^* +$$

$$\sum_{l=0}^{17} r(2l+1+d)(-j(a^{m0=1}(2l+1))^*)^*$$

$$= \sum_{l=0}^{17} r(2l+d)a^{m0=1}(2l) +$$

$$\sum_{l=0}^{17} r(2l+1+d)(j \cdot a^{m0=1}(2l+1))$$

$$= (Reven^1 - Iodd^1) + j(Ieven^1 + Rodd^1)$$

$$R^{m2=19}(d) = R^{m2=19}_{even}(d) + R^{m2=19}_{odd}(d) \qquad \text{[Equation 32]}$$

$$= \sum_{l=0}^{17} r(2l+d)(a^{m2=19}(2l))^* +$$

$$\sum_{l=0}^{17} r(2l+1+d)(a^{m2=19}(2l+1))^*$$

$$= \sum_{l=0}^{17} r(2l+d)(a^{m0=1}(2l))^* +$$

$$\sum_{l=0}^{17} r(2l+1+d)(-j \cdot a^{m0=1}(2l+1))^*$$

$$= (Reven^0 - Iodd^0) + j(Ieven^0 + Rodd^0)$$

$$R^{m3=35}(d) = R^{m3=35}_{even}(d) + R^{m3=35}_{odd}(d) \qquad \text{[Equation 33]}$$

$$= \sum_{l=0}^{17} r(2l+d)(a^{m3=35}(2l))^* +$$

$$\sum_{l=0}^{17} r(2l+1+d)(a^{m3=35}(2l+1))^*$$

$$= \sum_{l=0}^{17} r(2l+d)((a^{m0=1}(2l))^*)^* +$$

$$\sum_{l=0}^{17} r(2l+1+d)(-(a^{m0=1}(2l+1))^*)^*$$

$$= \sum_{l=0}^{17} r(2l+d)(a^{m0=1}(2l)) +$$

$$\sum_{l=0}^{17} r(2l+1+d)(-a^{m0=1}(2l+1))$$

$$= (Reven^1 - Rodd^1) + j(Ieven^1 - Iodd^1)$$

Equation 30 is indicative of a cross-correlation value between a sequence corresponding to the mother sequence index ($m_0$) and the Rx signal. Equation 31 is indicative of a cross-correlation value between a sequence corresponding to the remaining sequence index ($m_1$) and the Rx signal. Equation 32 is indicative of a cross-correlation value between a sequence corresponding to the remaining sequence index ($m_2$) and the Rx signal. Equation 33 is indicative of a cross-correlation value between a sequence corresponding to the remaining sequence index ($m_3$) and the Rx signal.

In brief, if multiple sequences are generated according to the inventive methods of the above-mentioned embodiments, the present invention can calculate the cross-correlation value of multiple sequences corresponding to multiple sequence indexes using both the sequence corresponding to a single sequence index and the Rx signal.

Figure 27:
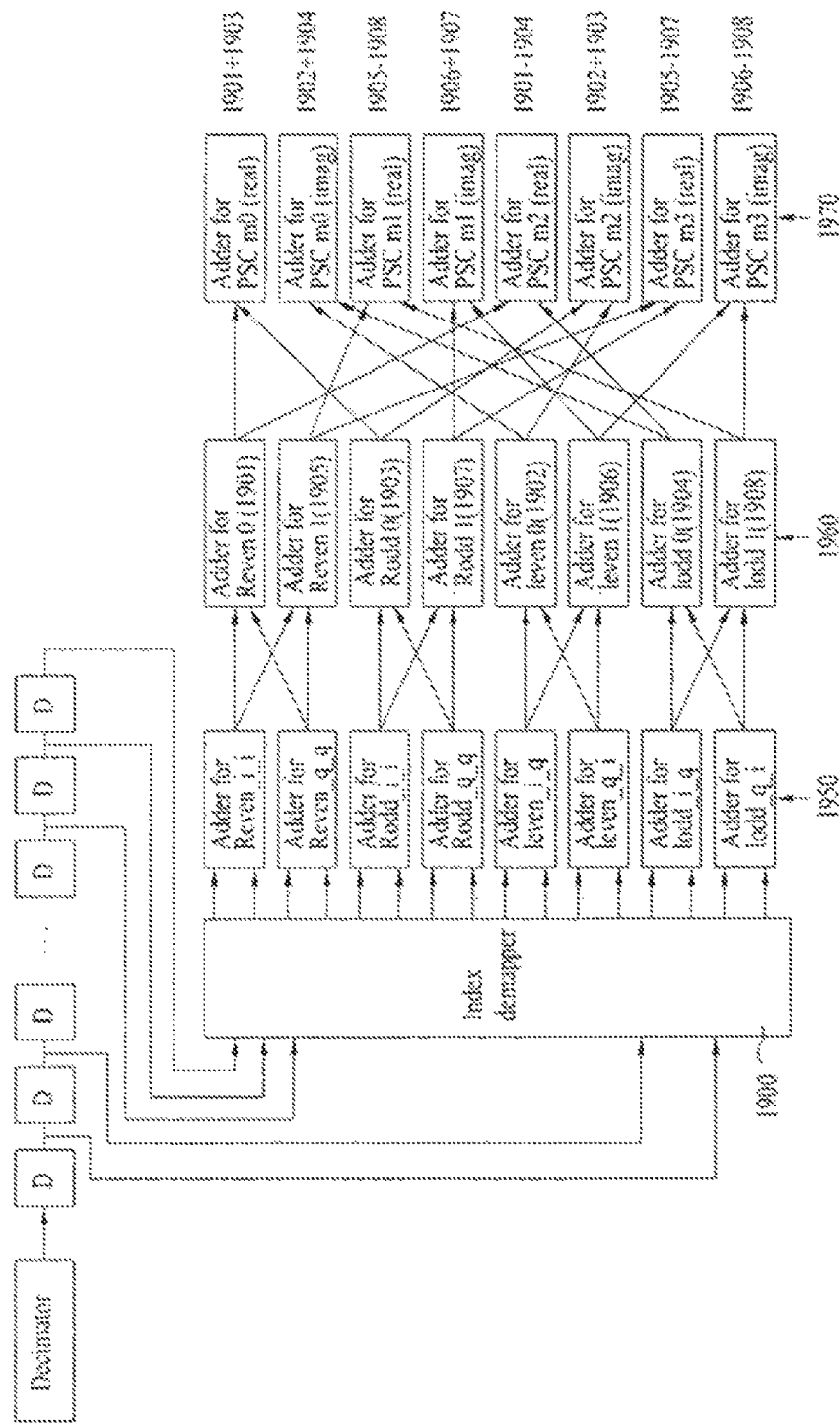
FIGS. 27 and 28 are block diagrams illustrating reception ends according to the present invention.

FIG. 27 is a structural diagram illustrating the reception end according to the present invention.

Referring to FIG. 27, the Rx signal of the reception end and the known sequence of the reception end are applied to the index demapper 1900. The unit 1950 of the reception end of FIG. 27 can calculate "Reven_i_i", "Revenq_q", "Ieven_i_q", "Ieven_q_i", "Rodd_i_i", "Rodd_q_q", "Iodd_i_q", and "Iodd_q_i" using Equation 29 or 29.

The values "Reven_i_i", "Revenq_q", "Ieven_i_q", "Ieven_q_i", "Rodd_i_i", "Rodd_q_q", "Iodd_i_q", and "Iodd_q_i" are calculated as "Reven0", "Ieven0", "Rodd0", "Iodd0", "Reven1", "Ieven1", "Rodd1", and "Iodd1", respectively, using Equations 24~27.

For example, "Reven_i_i+Reve_q_q" is calculated as "Reven$^0$", "–Ieven_i_q+Ieven_q_i" is calculated as "Ieven$^0$".

The operations of Equations 24 to 27 are conducted by the unit 1960.

If the addition or subtraction of Equations 30~33 is applied to the 1960-unit's result of Reven0, Ieven0, Rodd0, Iodd0, Reven1, Ieven1, Rodd1, and Iodd1, four correlation values of the individual sequence indexes ($m_0$, $m_1$, $m_2$, $m_3$) can be calculated.

For example, the correlation value of the $m_0$ value is calculated by Equation 30. In more detail, the sum of Reven$^0$ and Rodd$^0$ is used as a real part of the correlation value of the $m_0$ value, and the sum of Ieven$^0$ and Iodd$^0$ is used as an imaginary part of the $m_0$ value.

Referring to Equations 24~33 and FIG. 27, the final result can be acquired by the 1850-unit's result although the "1960" unit does not independently exist, and it can be recognized that the final result can be acquired using only the "1960" unit without using the "1950" unit.

The concept of FIG. 27 will also be described according to another scheme, and a detailed description thereof will hereinafter be described.

In the case of calculating the cross-correlation value between the Rx signal and the sequence corresponding to the "$m_0$" value, provided that the real part of the cross-correlation value associated with the even-th "$m_0$" sequence is set to a first result, the first result may be denoted by Reven$^0$ according to Equation 24. In FIG. 27, the reference number "1901" of FIG. 27 indicates the first result.

Provided that the imaginary part of the cross-correlation value associated with the even-th "$m_0$" sequence is set to a second result, the second result may be denoted by Ieven$^0$ according to Equation 24. In FIG. 27, the reference number "1902" of FIG. 27 indicates the second result.

Provided that the real part of the cross-correlation value associated with the odd-th "$m_0$" sequence is set to a third result, the third result may be denoted by Rodd$^0$ according to Equation 25. In FIG. 27, the reference number "1903" of FIG. 27 indicates the third result.

Provided that the imaginary part of the cross-correlation value associated with the odd-th "$m_0$" sequence is set to a fourth result, the fourth result may be denoted by Iodd$^0$ according to Equation 25. In FIG. 27, the reference number "1904" of FIG. 27 indicates the fourth result.

Provided that the real part of the cross-correlation value associated with a conjugate of the even-th "$m_0$" sequence is set to a fifth result, the fifth result may be denoted by Reven$^1$ according to Equation 26. In FIG. 27, the reference number "1905" of FIG. 27 indicates the fifth result.

Provided that the imaginary part of the cross-correlation value associated with a conjugate of the even-th "$m_0$" sequence is set to a sixth result, the sixth result may be denoted by Ieven$^1$ according to Equation 26. In FIG. 27, the reference number "1906" of FIG. 27 indicates the sixth result.

Provided that the real part of the cross-correlation value associated with a conjugate of the odd-th "$m_0$" sequence is set to a seventh result, the seventh result may be denoted by Rodd$^1$ according to Equation 27. In FIG. 27, the reference number "1907" of FIG. 27 indicates the seventh result.

Provided that the imaginary part of the cross-correlation value associated with a conjugate of the odd-th "$m_0$" sequence is set to an eighth result, the eighth result may be denoted by Iodd$^1$ according to Equation 27. In FIG. 27, the reference number "1908" of FIG. 27 indicates the eighth result.

According to the above-mentioned method, the first to eighth results are decided. If two results of the aforementioned eight results are added or subtracted from each other, the calculation value of the "1970" unit is acquired.

For example, the real part of the correlation value of the "$m_0$" sequence is equal to the sum of the "1901" unit and the "1903" unit. The imaginary part of the correlation value of the "$m_0$" sequence is equal to the sum of the "1906" unit and the "1906" unit.

In brief, the reception end calculates the above-mentioned first to eighth results, and may perform the addition or subtraction between two different results from among the first to eighth results, so that it can calculate the cross-correlation value of the "$m_0$~$m_3$" sequences.

FIG. 27 shows a specific case in which the sequence length is denoted by an even number. It is obvious to those skilled in the art that the above-mentioned concept may also be applied to not only the even number but also the odd number.

Next, a receiver of the odd-length sequence will hereinafter be described with reference to FIG. 18 and the following equations.

Firstly, if the sequence length is 35, two sequence indexes can be selected.

For example, the length of the mother sequence index may be set to "1" and the length of the remaining sequence index may be set to "34".

In this case, the expression corresponding to Equation 23 is represented by the following equation 34:

$$a^{m0=1}(k) = \exp\left(-j\pi \cdot 1 \cdot \frac{k(k+1)}{35}\right)$$ [Equation 34]

$$a^{m1=34}(k) = \exp\left(-j\pi \cdot 34 \cdot \frac{k(k+1)}{35}\right)$$

$$= \exp\left(-j\pi \cdot (35-1) \cdot \frac{k(k+1)}{35}\right)$$

$$= \exp\left(-j\left(\pi k(k+1) + \pi \cdot \frac{k(k+1)}{35}\right)\right)$$

$$= (a^{m0=1}(k))^*$$

In this case, the cross-correlation value can be represented by the following equation 35:

$$R^{m0=1}(d) = \frac{1}{N}\sum_{n=0}^{N-1} r(n+d)(a^{m0=1}(n))^* =$$ [Equation 35]

-continued $$\frac{1}{N}\sum_{n=0}^{N-1}((r_I(n+d)a_I^{m0=1}(n)+r_Q(n+d)a_Q^{m0=1}(n))+$$

$$j(r_Q(n+d)a_I^{m0=1}(n)-r_I(n+d)a_Q^{m0=1}(n))) \quad 5$$

$$R^{m2=34}(d)=\frac{1}{N}\sum_{n=0}^{N-1}r(n+d)(a^{m0=1}(n)^*)^*=$$

$$\frac{1}{N}\sum_{n=0}^{N-1}((r_I(n+d)a_I^{m0=1}(n)-r_Q(n+d)a_Q^{m0=1}(n))+$$

$$j(r_Q(n+d)a_I^{m0=1}(n)+r_I(n+d)a_Q^{m0=1}(n)))$$

In order to briefly express the result of Equation 35, the variables shown in the following equation 36 are defined as follows:

$$R_{II}=\frac{1}{N}\sum_{n=0}^{N-1}(r_I(n+d)a_I^{m0=1}(n)) \quad \text{[Equation 36]}$$

$$R_{QQ}=\frac{1}{N}\sum_{n=0}^{N-1}(r_Q(n+d)a_Q^{m0=1}(n))$$

$$I_{QI}=\frac{1}{N}\sum_{n=0}^{N-1}(r_Q(n+d)a_I^{m0=1}(n))$$

$$I_{IQ}=\frac{1}{N}\sum_{n=0}^{N-1}(r_I(n+d)a_Q^{m0=1}(n))$$

Based on the above Equation 36, the result of Equation 35 can be represented by the following equation 37:

$$R^{m0=1}(d)=(R_{II}+R_{QQ})+j(I_{QI}-I_{IQ})$$

$$R^{m2=34}(d)=(R_{II}-R_{QQ})+j(I_{QI}+I_{IQ}) \quad \text{[Equation 37]}$$

Figure 28:
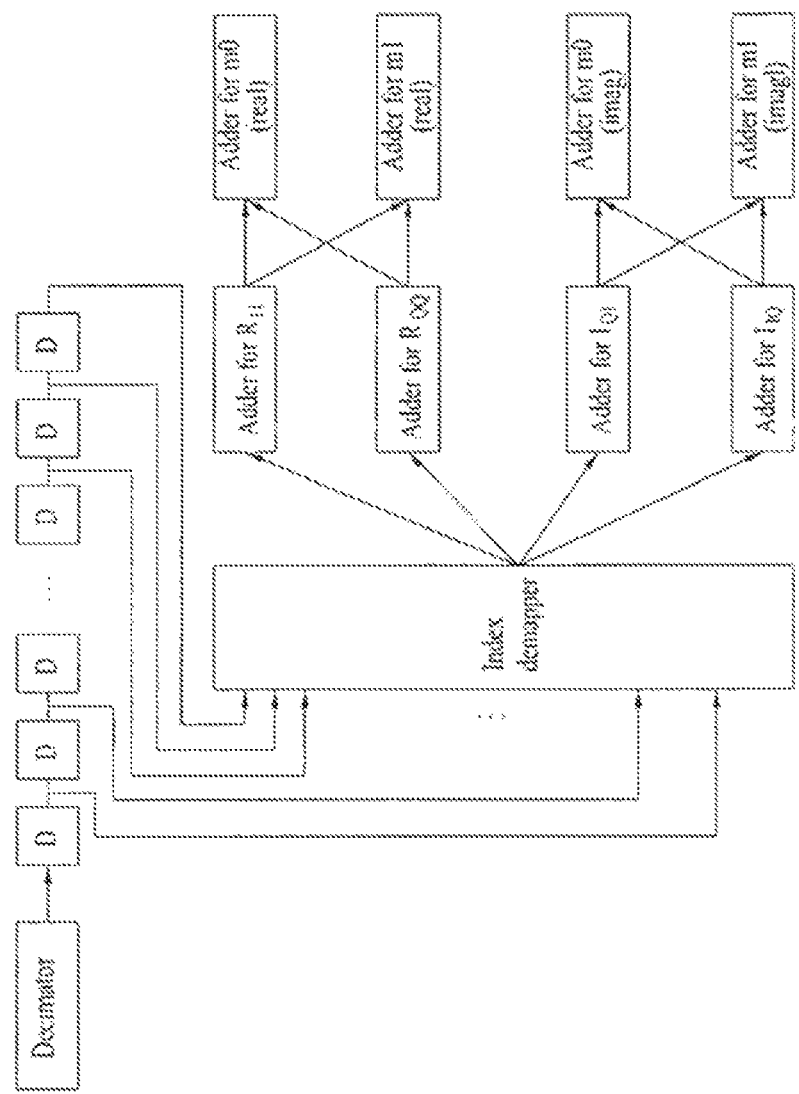

The exemplary reception end for calculating Equation 37 is shown in FIG. 28.

In FIG. 28, four variables are calculated by Equation 36, so that the correlation value of the odd-length sequence is calculated at one time. Therefore, in the case of using the above-mentioned structure, the present invention can properly process the reception case of the sequence with the length 63.

As described above, the reception end associated with sequences having various lengths can be designed.

<Case 2>

This example shows a method for calculating the cross-correlation value of the selected sequences, which have the length of 32 and the values $m_o=1$, $m_1=15$, $m_2=17$, $m_3=32$.

Figure 1:
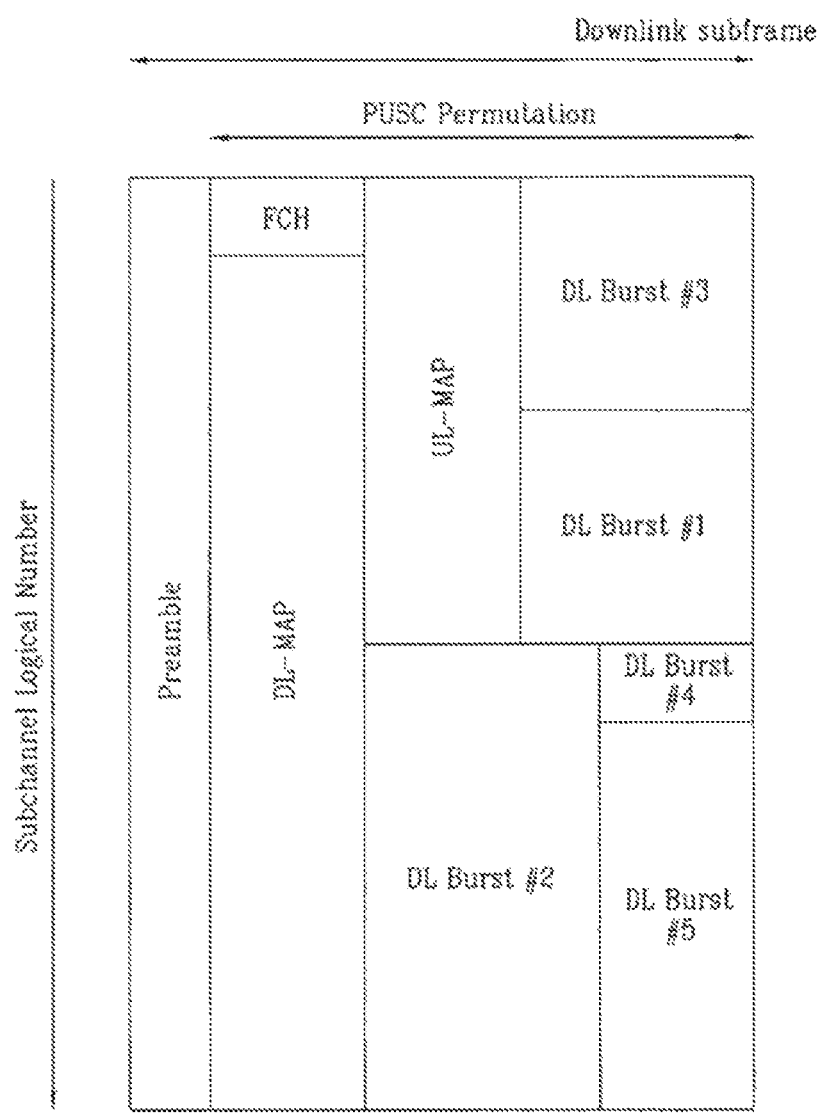
FIG. 1 is a structural diagram illustrating a downlink sub-frame of the IEEE 802.16 system.
Figure 2:
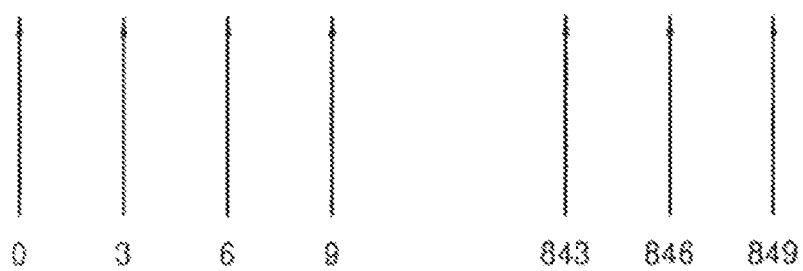
FIG. 2 shows the set of sub-carriers transmitted from the 0-th sector of the IEEE 802.16 system.
Figure 3:
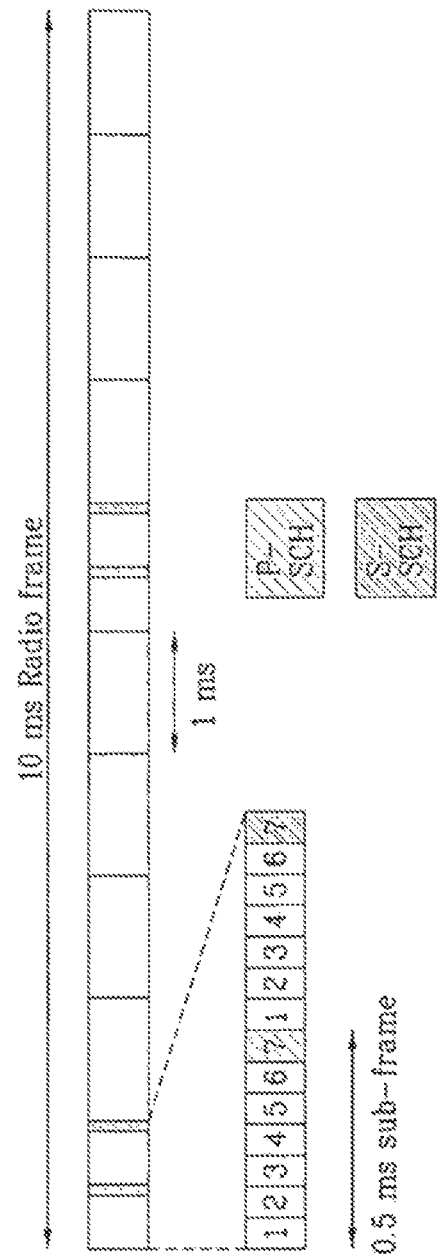
FIGS. 3 and 4 are conceptual diagrams illustrating a variety of methods including the P-SCH and the S-SCH in a radio frame.
Figure 4:
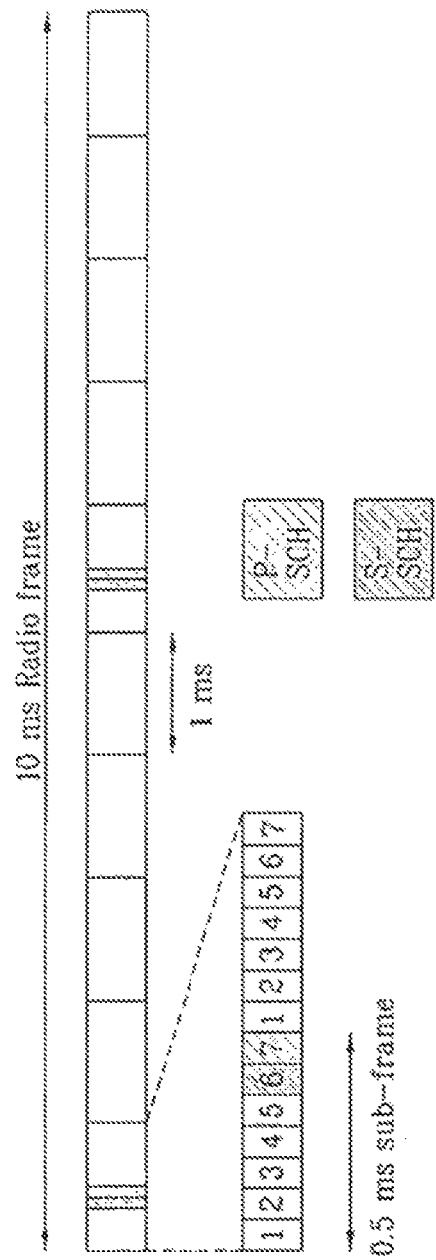

This embodiment of Case 2 will show detailed equations because the Case 1 has already described the detailed methods. And, it can be recognized that which one of equations shown in FIG. 1 is considered to be equal to each equation of Case 2.

As well known to those skilled in the art, the Case 2 and a method for receiving various sequence indexes can be conducted on the basis of the explanation of Case 1.

$$R^m(d)=\frac{1}{LN}\sum_{n=0}^{LN-1}r(n+d)(a^m(n))^* \quad \text{[Equation 38]}$$

Equation 38 is equal to Equation 22.

$$a^{m0=1}(k)=\exp\left(-j\pi\cdot 1\cdot\frac{k^2}{32}\right) \quad \text{[Equation 39]}$$

$$a^{m1=15}(k)=\exp\left(-j\pi\cdot 15\cdot\frac{k^2}{32}\right)$$

$$=\exp\left(-j\pi\cdot(16-1)\cdot\frac{k^2}{32}\right)$$

$$=\exp\left(-j\left(\frac{\pi}{2}k^2-\frac{\pi}{32}k^2\right)\right)$$

$$=\begin{cases}(a_{even}^{m0=1}(k))^*, & \text{when } k \text{ is even} \\ -j\cdot(a_{odd}^{m0=1}(k))^*, & \text{otherwise}\end{cases}$$

$$a^{m2=17}(k)=\exp\left(-j\pi\cdot 17\cdot\frac{k^2}{32}\right)$$

$$=\exp\left(-j\pi\cdot(16+1)\cdot\frac{k^2}{32}\right)$$

$$=\exp\left(-j\left(\frac{\pi}{2}k^2+\frac{\pi}{32}k^2\right)\right)$$

$$=\begin{cases}a_{even}^{m0=1}(k), & \text{when } k \text{ is even} \\ -j\cdot a_{odd}^{m0=1}(k), & \text{otherwise}\end{cases}$$

$$a^{m3=31}(k)=\exp\left(-j\pi\cdot 31\cdot\frac{k^2}{32}\right)$$

$$=\exp\left(-j\pi\cdot(32-1)\cdot\frac{k^2}{32}\right)$$

$$=\exp\left(-j\left(\pi k^2-\frac{\pi}{32}k^2\right)\right)$$

$$=\begin{cases}(a_{even}^{m0=1}(k))^*, & \text{when } k \text{ is even} \\ -(a_{odd}^{m0=1}(k))^*, & \text{otherwise}\end{cases}$$

Equation 39 is equal to Equation 23.

$$\sum_{l=0}^{15}r(2l+d)(a^{m0=1}(2l))^*= \quad \text{[Equation 40]}$$

$$(\text{Reven\_i\_i}+\text{Reven\_q\_q})+j(-\text{Ieven\_i\_q}+\text{Ieven\_q\_i})=$$

$$\text{Reven}^0+j\text{Ieven}^0$$

Equation 40 corresponds to Equation 24.

$$\sum_{l=0}^{15}r(2l+1+d)(a^{m0=1}(2l+1))^*= \quad \text{[Equation 41]}$$

$$(\text{Rodd\_i\_i}+\text{Rodd\_q\_q})+j(-\text{Iodd\_i\_q}+\text{Iodd\_q\_i})=$$

$$\text{Rodd}^0+j\text{Iodd}^0$$

Equation 40 corresponds to Equation 25.

$$\sum_{l=0}^{15}r(2l+d)a^{m0=1}(2l)= \quad \text{[Equation 42]}$$

$$(\text{Reven\_i\_i}-\text{Reven\_q\_q})+j(\text{Ieven\_i\_q}+\text{Ieven\_q\_i})=$$

$$\text{Reven}^1+j\text{Ieven}^1$$

Equation 42 corresponds to Equation 26.

$$\sum_{l=0}^{15} r(2l+1+d)a^{m0=1}(2l+1) =$$ [Equation 43]

$$(Rodd\_i\_i - Rodd\_q\_q) + j(-Iodd\_i\_q + Iodd\_q\_i) =$$

$$Rodd^l + jIodd^l$$

Equation 43 corresponds to Equation 27.

Reven_i_i = [Equation 44]

r_i(0 + d) * 1 + r_i(2 + d) * 0.92388 + r_i(4 + d) * 0 + r_i(6 + d) * (−0.92388) + r_i(8 + d) * 1 + r_i(10 + d) * (−0.92388) + r_i(12 + d) * 0 + r_i(14 + d) * 0.92388 + r_i(16 + d) * 1 + r_i(18 + d) * 0.92388 + r_i(20 + d) * 0 + r_i(22 + d) * (−0.92388) + r_i(24 + d) * 1 + r_i(26 + d) * (−0.92388) + r_i(28 + d) * 0 + r_i(30 + d) * 0.92388 =

{r_i(0 + d) + r_i(8 + d) + r_i(16 + d) + r_i(24 + d)} +

$$\left\{\begin{array}{l} r\_i(2+d) - r\_i(6+d) - r\_i(10+d) + \\ r\_i(14+d) + r\_i(18+d) - r\_i(22+d) - \\ r\_i(26+d) + r\_i(30+d) \end{array}\right\} *$$

0.92388

Reven_q_q = r_q(0 + d) * 0 + r_q(2 + d) * (−0.38268) + r_q(4 + d) * (−1) + r_q(6 + d) * 0.38268 + r_q(8 + d) * 0 + r_q(10 + d) * 0.38268 + r_q(12 + d) * (−1) + r_q(14 + d) * (−0.38268) + r_q(16 + d) * 0 + r_q(18 + d) * (−0.38268) + r_q(20 + d) * (−1) + r_q(22 + d) * 0.38268 + r_q(24 + d) * 0 + r_q(26 + d) * 0.38268 + r_q(28 + d) * (−1) + r_q(30 + d) * (−0.38268) =

$$\left\{\begin{array}{l} -r\_q(2+d) + r\_q(6+d) + r\_q(10+d) - \\ r\_q(14+d) - r\_q(18+d) + r\_q(22+d) + \\ r\_q(26+d) - r\_q(30+d) \end{array}\right\} *$$

0.38268 + {−r_q(4 + d) − r_q(12 + d) − r_q(20 + d) − r_q(28 + d)}

Ieven_i_q = r_i(0 + d) * 0 + r_i(2 + d) * (−0.38268) + r_i(4 + d) * (−1) + r_i(6 + d) * 0.38268 + r_i(8 + d) * 0 + r_i(10 + d) * 0.38268 + r_i(12 + d) * (−1) + r_i(14 + d) * (−0.38268) + r_i(16 + d) * 0 + r_i(18 + d) * (−0.38268) + r_i(20 + d) * (−1) + r_i(22 + d) * 0.38268 + r_i(24 + d) * 0 + r_i(26 + d) * 0.38268 + r_i(28 + d) * (−1) + r_i(30 + d) * (−0.38268) =

$$\left\{\begin{array}{l} -r\_i(2+d) + r\_i(6+d) + r\_i(10+d) - \\ r\_i(14+d) - r\_i(18+d) + r\_i(22+d) + \\ r\_i(26+d) - r\_i(30+d) \end{array}\right\} * 0.38268 +$$

-continued

{−r_i(4 + d) − r_i(12 + d) − r_i(20 + d) − r_i(28 + d)}

Ieven_q_i = r_q(0 + d) * 1 + r_q(2 + d) * 0.92388 + r_q(4 + d) * 0 + r_q(6 + d) * (−0.92388) + r_q(8 + d) * 1 + r_q(10 + d) * (−0.92388) + r_q(12 + d) * 0 + r_q(14 + d) * 0.92388 + r_q(16 + d) * 1 + r_q(18 + d) * 0.92388 + r_q(20 + d) * 0 + r_q(22 + d) * (−0.92388) + r_q(24 + d) * 1 + r_q(26 + d) * (−0.92388) + r_q(28 + d) * 0 + r_q(30 + d) * 0.92388 =

{r_q(0 + d) + r_q(8 + d) + r_q(16 + d) + r_q(24 + d)} +

$$\left\{\begin{array}{l} -r\_q(2+d) - r\_q(6+d) + r\_q(10+d) + \\ r\_q(14+d) + r\_q(18+d) - r\_q(22+d) - \\ r\_q(26+d) + r\_q(30+d) \end{array}\right\} *$$

0.92388

Rodd_i_i = r_i(1 + d) * (−0.098017) + r_i(3 + d) * (−0.77301) + r_i(5 + d) * (−0.63439) + r_i(7 + d) * 0.99518 + r_i(9 + d) * (−0.99518) + r_i(11 + d) * 0.63439 + r_i(13 + d) * 0.77301 + r_i(15 + d) * 0.098017 + r_i(17 + d) * 0.098017 + r_i(19 + d) * 0.77301 + r_i(21 + d) * 0.63439 + r_i(23 + d) * (−0.99518) + r_i(25 + d) * 0.99518 + r_i(27 + d) * (−0.63439) + r_i(29 + d) * (−0.77301) + r_i(31 + d) * (−0.098017) =

{−r_i(1 + d) + r_i(15 + d) + r_i(17 + d) − r_i(31 + d)} *

0.098017 +

{−r_i(3 + d) + r_i(13 + d) + r_i(19 + d) − r_i(29 + d)} *

0.77301 + {−r_i(5 + d) + r_i(11 + d) + r_i(21 + d) − r_i(27 + d)} * 0.63439 +

{r_i(7 + d) − r_i(9 + d) − r_i(23 + d) + r_i(25 + d)} *

0.99518

Rodd_q_q = r_q(1 + d) * (−0.098017) + r_q(3 + d) * (−0.77301) + r_q(5 + d) * (−0.63439) + r_q(7 + d) * 0.99518 + r_q(9 + d) * (−0.99518) + r_q(11 + d) * 0.63439 + r_q(13 + d) * 0.77301 + r_q(15 + d) * 0.098017 + r_q(17 + d) * 0.098017 + r_q(19 + d) * 0.77301 + r_q(21 + d) * 0.63439 + r_q(23 + d) * (−0.99518) + r_q(25 + d) * 0.99518 + r_q(27 + d) * (−0.63439) + r_q(29 + d) * (−0.77301) + r_q(31 + d) * (−0.098017) =

{−r_q(1 + d) + r_q(15 + d) + r_q(17 + d) − r_q(31 + d)} *

0.098017 + {−r_q(3 + d) + r_q(13 + d) + r_q(19 + d) − r_q(29 + d)} * 0.77301 +

{−r_q(5 + d) + r_q(11 + d) + r_q(21 + d) − r_q(27 + d)} * 0.63439 +

-continued $$\{r\_q(7+d) - r\_q(9+d) - r\_q(23+d) +$$
$$r\_q(25+d)\} * 0.99518$$

$\text{Iodd\_i\_q} = r\_i(1+d) * (-0.098017) +$
$\quad r\_i(3+d) * (-0.77301) +$
$\quad r\_i(5+d) * (-0.63439) + r\_i(7+d) * 0.99518 +$
$\quad r\_i(9+d) * (-0.99518) + r\_i(11+d) * 0.63439 +$
$\quad r\_i(13+d) * 0.77301 + r\_i(15+d) * 0.098017 +$
$\quad r\_i(17+d) * 0.098017 + r\_i(19+d) * 0.77301 +$
$\quad r\_i(21+d) * 0.63439 + r\_i(23+d) * (-0.99518) +$
$\quad r\_i(25+d) * 0.99518 + r\_i(27+d) * (-0.63439) +$
$\quad r\_i(29+d) * (-0.77301) +$
$\quad r\_i(31+d) * (-0.098017) =$
$\quad \{-r\_i(1+d) + r\_i(15+d) + r\_i(17+d) -$
$\quad r\_i(31+d)\} * 0.098017 +$
$\quad \{-r\_i(3+d) + r\_i(13+d) + r\_i(19+d) -$
$\quad r\_i(29+d)\} * 0.77301 +$
$\quad \{-r\_i(5+d) + r\_i(11+d) + r\_i(21+d) -$
$\quad r\_i(27+d)\} * 0.63439 +$
$\quad \{r\_i(7+d) - r\_i(9+d) - r\_i(23+d) +$
$\quad r\_i(25+d)\} * 0.99518$ $\text{Iodd\_q\_i} = r\_q(1+d) * (-0.098017) +$
$\quad r\_q(3+d) * (-0.77301) +$
$\quad r\_q(5+d) * (-0.63439) + r\_q(7+d) * 0.99518 +$
$\quad r\_q(9+d) * (-0.99518) + r\_q(11+d) * 0.63439 +$
$\quad r\_q(13+d) * 0.77301 + r\_q(15+d) * 0.098017 +$
$\quad r\_q(17+d) * 0.098017 + r\_q(19+d) * 0.77301 +$
$\quad r\_q(21+d) * 0.63439 + r\_q(23+d) *$
$\quad (-0.99518) + r\_q(25+d) * 0.99518 +$
$\quad r\_q(27+d) * (-0.63439) + r\_q(29+d) *$
$\quad (-0.77301) + r\_q(31+d) * (-0.098017) =$
$\quad \{-r\_q(1+d) + r\_q(15+d) + r\_q(17+d) -$
$\quad r\_q(31+d)\} * 0.098017 +$
$\quad \{-r\_q(3+d) + r\_q(13+d) + r\_q(19+d) -$
$\quad r\_q(29+d)\} * 0.77301 +$
$\quad \{-r\_q(5+d) + r\_q(11+d) + r\_q(21+d) -$
$\quad r\_q(27+d)\} * 0.63439 +$
$\quad \{r\_q(7+d) - r\_q(9+d) - r\_q(23+d) +$
$\quad r\_q(25+d)\} * 0.99518$ Equation 44 corresponds to Equation 28.

$\text{Reven\_i\_i} =$
$\quad \{r\_i(0+d) + r\_i(8+d) + r\_i(16+d) + r\_i(24+d)\} +$

[Equation 45]

$$\left\{\begin{array}{c} r\_i(2+d) - r\_i(6+d) - r\_i(10+d) + \\ r\_i(14+d) + r\_i(18+d) - r\_i(22+d) - \\ r\_i(26+d) + r\_i(30+d) \end{array}\right\} * 0.875$$

$\text{Reven\_q\_q} =$ $$\left\{\begin{array}{c} -r\_q(2+d) + r\_q(6+d) + r\_q(10+d) - \\ r\_q(14+d) - r\_q(18+d) + r\_q(22+d) + \\ r\_q(26+d) - r\_q(30+d) \end{array}\right\} * 0.375 +$$

$$\{-r\_q(4+d) - r\_q(12+d) - r\_q(20+d) -$$
$$r\_q(28+d)\}$$

$\text{Ieven\_i\_q} = \left\{\begin{array}{c} -r\_i(2+d) + r\_i(6+d) + r\_i(10+d) - \\ r\_i(14+d) - r\_i(18+d) + r\_i(22+d) + \\ r\_i(26+d) - r\_i(30+d) \end{array}\right\} *$ $\quad 0.375 + \{-r\_i(4+d) - r\_i(12+d) -$
$\quad r\_i(20+d) - r\_i(28+d)\}$ $\text{Ieven\_q\_i} = \{r\_q(0+d) + r\_q(8+d) +$
$\quad r\_q(16+d) + r\_q(24+d)\} +$ $$\left\{\begin{array}{c} r\_q(2+d) - r\_q(6+d) + r\_q(10+d) + \\ r\_q(14+d) + r\_q(18+d) - r\_q(22+d) - \\ r\_q(26+d) + r\_q(30+d) \end{array}\right\} *$$

$$0.875$$

$\text{Rodd\_i\_i} = \{-r\_i(1+d) + r\_i(15+d) +$
$\quad r\_i(17+d) - r\_i(31+d)\} * 0.125 +$
$\quad \{-r\_i(3+d) + r\_i(13+d) + r\_i(19+d) -$
$\quad r\_i(29+d)\} * 0.75 +$
$\quad \{-r\_i(5+d) + r\_i(11+d) + r\_i(21+d) -$
$\quad r\_i(27+d)\} * 0.625 + \{r\_i(7+d) -$
$\quad r\_i(9+d) - r\_i(23+d) + r\_i(25+d)\}$ $\text{Rodd\_q\_q} = \{-r\_q(1+d) + r\_q(15+d) + r\_q(17+d) -$
$\quad r\_q(31+d)\} * 0.125 +$
$\quad \{-r\_q(3+d) + r\_q(13+d) + r\_q(19+d) -$
$\quad r\_q(29+d)\} * 0.75 +$
$\quad \{-r\_q(5+d) + r\_q(11+d) + r\_q(21+d) -$
$\quad r\_q(27+d)\} * 0.625 +$
$\quad \{r\_q(7+d) - r\_q(9+d) - r\_q(23+d) +$
$\quad r\_q(25+d)\}$ $\text{Iodd\_i\_q} = \{-r\_i(1+d) + r\_i(15+d) + r\_i(17+d) -$
$\quad r\_i(31+d)\} * 0.125 +$
$\quad \{-r\_i(3+d) + r\_i(13+d) + r\_i(19+d) -$
$\quad r\_i(29+d)\} * 0.75 +$
$\quad \{-r\_i(5+d) + r\_i(11+d) + r\_i(21+d) -$
$\quad r\_i(27+d)\} * 0.625 + \{r\_i(7+d) -$
$\quad r\_i(9+d) - r\_i(23+d) + r\_i(25+d)\}$ $\text{Iodd\_q\_i} = \{-r\_q(1+d) + r\_q(15+d) + r\_q(17+d) -$
$\quad r\_q(31+d)\} * 0.125 +$
$\quad \{-r\_q(3+d) + r\_q(13+d) + r\_q(19+d) -$
$\quad r\_q(29+d)\} * 0.75 +$ -continued
$$\{-r\_q(5+d) + r\_q(11+d) + r\_q(21+d) -$$
$$r\_q(27+d)\} * 0.625 + \{r\_q(7+d) -$$
$$r\_q(9+d) - r\_q(23+d) + r\_q(25+d)\}$$

Equation 45 corresponds to Equation 29.

$$R^{m0=1}(d) = R_{even}^{m0=1}(d) + R_{odd}^{m0}(d) \quad \text{[Equation 46]}$$

$$= \sum_{l=0}^{15} r(2l+d)(a^{m0=1}(2l))^* +$$

$$\sum_{l=0}^{15} r(2l+1+d)(a^{m0=1}(2l+1))^*$$

$$= (Reven^0 + Rodd^0) + j(Ieven^0 + Iodd^0)$$

Equation 46 corresponds to Equation 30.

$$R^{m1=15}(d) = R_{even}^{m1=15}(d) + R_{odd}^{m1=15}(d) \quad \text{[Equation 47]}$$

$$= \sum_{l=0}^{15} r(2l+d)(a^{m1=15}(2l))^* +$$

$$\sum_{l=0}^{15} r(2l+1+d)(a^{m1=15}(2l+1))^*$$

$$= \sum_{l=0}^{15} r(2l+d)((a^{m0=1}(2l))^*)^* +$$

$$\sum_{l=0}^{15} r(2l+1+d)(-j(a^{m0=1}(2l+1))^*)^*$$

$$= \sum_{l=0}^{15} r(2l+d)a^{m0=1}(2l) +$$

$$\sum_{l=0}^{15} r(2l+1+d)(j \cdot a^{m0=1}(2l+1))$$

$$= (Reven^1 - Iodd^1) + j(Ieven^1 + Rodd^1)$$

Equation 47 corresponds to Equation 31.

$$R^{m2=17}(d) = R_{even}^{m2=17}(d) + R_{odd}^{m2=17}(d) \quad \text{[Equation 48]}$$

$$= \sum_{l=0}^{15} r(2l+d)(a^{m2=17}(2l))^* +$$

$$\sum_{l=0}^{15} r(2l+1+d)(a^{m2=17}(2l+1))^*$$

$$= \sum_{l=0}^{15} r(2l+d)(a^{m0=1}(2l))^* +$$

$$\sum_{l=0}^{15} r(2l+1+d)(-j \cdot a^{m0=1}(2l+1))^*$$

$$= (Reven^0 - Iodd^0) + j(Ieven^0 + Rodd^0)$$

Equation 48 corresponds to Equation 32.

$$R^{m3=31}(d) = R_{even}^{m3=31}(d) + R_{odd}^{m3=31}(d) \quad \text{[Equation 49]}$$

$$= \sum_{l=0}^{15} r(2l+d)(a^{m3=31}(2l))^* +$$

$$\sum_{l=0}^{15} r(2l+1+d)(a^{m3=31}(2l+1))^*$$

$$= \sum_{l=0}^{15} r(2l+d)((a^{m0=1}(2l))^*)^* +$$

$$\sum_{l=0}^{15} r(2l+1+d)(-(a^{m0=1}(2l+1))^*)^*$$

$$= \sum_{l=0}^{15} r(2l+d)(a^{m0=1}(2l)) +$$

$$\sum_{l=0}^{15} r(2l+1+d)(-a^{m0=1}(2l+1))$$

$$= (Reven^1 - Rodd^1) + j(Ieven^1 - Iodd^1)$$

Equation 49 corresponds to Equation 33.

This embodiment can greatly reduce the number of calculations, and a detailed description thereof will hereinafter be described.

In order to calculate the d-th correlation value associated with the PSC sequence, which has the length L=36 and is classified into four types, the conventional method requires 575 real-value multiplications and 568 real-value additions on the assumption that the calculations caused by the sign converter are ignored.

However, the present invention requires 28 real-value multiplications and 140 real-value additions. In the case of quantization, the present invention requires no real-value multiplication, 156 real-value additions, and the shift operation of 54 bits.

The sign converter and the bit-shifting operation are not contained in the number of calculations when the hardware is implemented, so that the number of calculations of each technique is shown in the following Table 20. The present invention can calculate the cross-correlation value of four PSC sequences using only 156 real-value additions.

TABLE 26

| The number of calculations | # of real multiplications | # of real additions |
|---|---|---|
| Conventional method | 576 | 568 |
| This embodiment | 28 | 140 |
| Embodiment approximated by quantization | 0 | 156 |

And, if the length (L) is set to 32, there arises a difference in performance between the conventional art and the present invention, as represented by the following Table 27:

TABLE 27

| The number of calculations | # of real multiplications | # of real additions |
|---|---|---|
| Conventional method | 512 | 504 |
| This embodiment | 20 | 120 |
| Embodiment approximated by quantization | 0 | 132 |

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The sequence generated by the present invention maintains correlation characteristics of at least a predetermined level in a time domain, and has low PAPR characteristics. Moreover, by using the sequence generated by the one embodiment of the present invention, the receiving end can easily detect the sequence by one correlation operation.

The present invention may configure a superior-performance channel on the condition that the sequence is applied to a communication standard such as the LTE system.

As apparent from the above description, the sequence generated by the present invention maintains the correlation characteristics of more than a predetermined level, and has low PAPR characteristics.

If the sequence proposed by the present invention is applied to the communication standard such as the LTE system, it can configure a channel having a superior performance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of detecting a sequence used in a primary synchronization signal by a receiver in a mobile communication system, the method comprising:
    receiving the primary synchronization signal from a transmitter; and
    detecting the sequence used in the received primary synchronization signal,
    wherein the sequence used in the primary synchronization signal corresponds to a sequence having an even number length, the sequence being mapped on a frequency domain such that one half of the sequence is mapped before a DC frequency and the other half of the sequence is mapped after the DC frequency, and
    wherein the sequence mapped on the frequency domain is generated by using Zadoff-Chu sequence having an odd number length.

2. The method of claim 1,
    wherein the sequence mapped on the frequency domain from the Zadoff-Chu sequence is generated based on a following equation:

$$\exp\left(-i\frac{M\pi n(n+1)}{N}\right),$$

and
    wherein the odd number length of the Zadoff-Chu sequence is "N", "M" is a root index of the Zadoff-Chu sequence, and "n" is an index of each of a plurality of constituent components of the generated sequence.

3. The method of claim 2, wherein N is 63, and the even number length is 62.

4. The method of claim 3,
    wherein a first 31 constituent components of the sequence that are mapped on the frequency domain are continuously mapped to a plurality of frequency resource elements corresponding to frequency resource element indices within a range of "−31" to "4," and
    wherein a last 31 constituent components of the sequence mapped on the frequency domain are continuously mapped to a plurality of frequency resource elements corresponding to frequency resource element indices within a range of "1" to "31".

5. The method of claim 1, wherein the sequence is detected by using 3 root indexes.

6. A receiver configured to detect a sequence used in a received (Rx) signal in a mobile communication system using orthogonal frequency division multiplexing (OFDM), the receiver comprising:
    a radio frequency module configured to receive the Rx signal from a transmitter; and
    a detector configured to detect the sequence used in the Rx signal,
    wherein the sequence used in the Rx signal is generated in a frequency domain by using a Zadoff-Chu sequence having an index from a predetermined index set,
    wherein the predetermined index set comprises a first index and a second index, and
    wherein a sum of the first index and the second index corresponds to a length of the Zadoff-Chu sequence.

7. The receiver according to claim 6,
    wherein the Zadoff-Chu sequence has an odd number length, and
    wherein an equation for generating the sequence from the Zadoff-Chu sequence is based on the following equation:

$$\exp\left(-i\frac{M\pi n(n+1)}{N}\right),$$

and
    wherein the length of the Zadoff-Chu sequence is "N", "M" is a root index of the Zadoff-Chu sequence, and "n" is index of each of constituent components of the generated sequence.

8. The receiver according to claim 7, wherein "N" is 63, the first index is 34, and the second index is 29, respectively.

9. The receiver according to claim 6, wherein the Rx signal is a P-SCH (Primary-SCH) signal.

10. The receiver according to claim 6, wherein the receiver is configured to perform synchronization with a transmitter based on the sequence detection performed on the Rx signal.

* * * * *